United States Patent
Futa et al.

(10) Patent No.: US 7,706,528 B2
(45) Date of Patent: Apr. 27, 2010

(54) PRIME CALCULATING APPARATUS, KEY ISSUING SYSTEM, AND PRIME CALCULATION METHOD

(75) Inventors: Yuichi Futa, Osaka (JP); Motoji Ohmori, Osaka (JP)

(73) Assignee: Panasonic Corporation, Osaka (JP)

( * ) Notice: Subject to any disclaimer, the term of this patent is extended or adjusted under 35 U.S.C. 154(b) by 976 days.

(21) Appl. No.: 10/582,999

(22) PCT Filed: Dec. 21, 2004

(86) PCT No.: PCT/JP2004/019110

§ 371 (c)(1), (2), (4) Date: Jun. 14, 2006

(87) PCT Pub. No.: WO2005/064844

PCT Pub. Date: Jul. 14, 2005

(65) Prior Publication Data

US 2007/0143388 A1 Jun. 21, 2007

(30) Foreign Application Priority Data

Dec. 26, 2003 (JP) ............................. 2003-433903
Dec. 26, 2003 (JP) ............................. 2003-433904
Jan. 30, 2004 (JP) ............................. 2004-023796

(51) Int. Cl.
H04L 9/28 (2006.01)
H04K 1/00 (2006.01)

(52) U.S. Cl. ............................. 380/28; 380/46; 708/250
(58) Field of Classification Search .................. 380/28, 380/46; 708/250
See application file for complete search history.

(56) References Cited

U.S. PATENT DOCUMENTS

| | | | |
|---|---|---|---|
| 6,404,890 B1 | 6/2002 | Lenstra | |
| 6,496,929 B2 | 12/2002 | Lenstra | |
| 6,687,375 B1 | 2/2004 | Matyas, Jr. et al. | |
| 6,940,976 B1 * | 9/2005 | Matyas et al. | 380/44 |
| 7,043,018 B1 * | 5/2006 | Kasahara et al. | 380/44 |

(Continued)

FOREIGN PATENT DOCUMENTS

EP          1 026 851          8/2000

(Continued)

OTHER PUBLICATIONS

Mohammed Peyravian et al., "Generation of RSA Keys That Are Guaranteed to be Unique for Each User", Computer & Security vol. 19, No. 3, 2000, pp. 282-288.

(Continued)

*Primary Examiner*—Minh Dieu Nguyen
(74) *Attorney, Agent, or Firm*—Wenderoth, Lind & Ponack, L.L.P.

(57) ABSTRACT

A prime calculating apparatus calculating a prime and determining whether the prime has been duly generated. The prime calculating apparatus (i) generates a random number, (ii) calculates a multiplication value R by multiplying a management identifier by the random number, and (iii) calculates a prime candidate N, according to N=2×(multiplication value R+w)×prime q+1, with respect to w satisfying an equation of 2×w×prime q+1=verification value (mod management information). Then, the prime calculating apparatus judges whether the calculated prime candidate N is a prime, and outputs the calculated prime candidate N as a prime when determining that it is a prime.

30 Claims, 46 Drawing Sheets

U.S. PATENT DOCUMENTS

2002/0176573 A1 11/2002 Futa et al.

FOREIGN PATENT DOCUMENTS

| | | |
|---|---|---|
| JP | 7-121107 | 5/1995 |
| JP | 2003-005644 | 1/2003 |
| WO | 99/52241 | 10/1999 |

OTHER PUBLICATIONS

Ueli Maurer, "Fast Generation of Secure RSA-Moduli with Almost Maximal Diversity", Lecture Notes in Computer Science, vol. 434, 1990, pp. 636-647.

Alfred Menezes et al., "Handbook of Applied Cryptography", CRC Press, 1997, pp. 144-152.

* cited by examiner

| NUMBER OF ITERATIONS | CONTROL INFORMATION |
|---|---|
| 1 | INFORMATION C |
| 2 | INFORMATION C |
| 3 | INFORMATION C |
| 4 | INFORMATION C |
| 5 | INFORMATION B |
| 6 | INFORMATION A |

FIG.7

| SERVER IDENTIFIER | 1ST VERIFICATION VALUE | 2ND VERIFICATION VALUE |
|---|---|---|
| SID A | c11 | c12 |
| SID B | c21 | c22 |
| SID C | c31 | c33 |

| SERVER IDENTIFIER | VERIFICATION VALUE |
|---|---|
| SID A | c1 |
| SID B | c2 |
| SID C | c3 |

| NUMBER OF ITERATIONS | CONTROL INFORMATION |
|---|---|
| 1 | INFORMATION C |
| 2 | INFORMATION C |
| 3 | INFORMATION C |
| 4 | INFORMATION C |
| 5 | INFORMATION C |
| 6 | INFORMATION AB |

| ISSUED PUBLIC KEY | ISSUED IDENTIFIER INFORMATION |
|---|---|
| PK 1 | IDI1 |
| PK 2 | IDI 2 |
| ⋮ | ⋮ |
| PK | IDI |

FIG.30

| SERVER IDENTIFIER | 1ST VERIFICATION VALUE | 2ND VERIFICATION VALUE |
|---|---|---|
| SID A | c11 | c12 |
| SID B | c21 | c22 |
| SID C | c31 | c33 |

T1200

PRIME CALCULATING APPARATUS, KEY ISSUING SYSTEM, AND PRIME CALCULATION METHOD

BACKGROUND OF THE INVENTION

1. Field of Invention

The present invention relates to a technology for maintaining information security that applies difficulty of prime factorization as a source of safety.

2. Description of the Related Art

Data communications based on computer technology and communication technology have become in recent years widely in use. In these data communications, a privacy communication system and a digital signature system are used. Here, the privacy communication system is a system in which communication is performed with the communication contents kept secret from any other entities except for certain communication destinations. The digital signature system is a communication system showing the validity of the communication contents to the communication destinations, or proving the sender's identity.

1. Public Key Encryption System

An encryption system called a public key encryption system is used in the privacy communication system or the digital signature system. In the privacy communications using the public key encryption system, the encryption key and the decryption key are different from each other, and the encryption key is made publicly available while the decryption key being kept secret. The decryption key kept secret is called a private key, and the encryption key made publicly available is called a public key. When there are a number of communication destinations, a key must be kept between the communication destinations in common key encryption. On the other hand, in public key encryption, communications are made possible if the communication destinations simply have a single unique key, and therefore, the number of keys required is less than in the common key encryption even if the number of communication destinations increases. Thus, the public key encryption is well suited to communications with a number of destinations, and indispensable and fundamental technology.

The safety of an RSA encryption system—a type of the public key encryption system—is based on that solving prime factorization of integers is difficult in terms of computational effort. The prime factorization is a problem to find primes p and q with respect to an integer n, when n=p×q. Here, "×" is general multiplication. In general, when p and q are as large, for example, as 1024 bits, solving the prime factorization is difficult. This therefore makes it difficult to find out a private key from a public key with the RSA encryption system, and also makes it difficult for users not having the private key to find out a plain text from an encrypted text. Note that prime factorization is discussed in detail in Non-Patent Reference 1 (pp. 144-151).

1.1 RSA Encryption System Applying Prime Factorization

Here is described the RSA encryption system applying prime factorization.

(1) Key Generation

A public key and a private key are calculated in the following manner:

Choose large primes p and q randomly, and calculate the multiplication n=p×q;

Calculate the least common multiple L=LCM(p−1, q−1) of (p−1) and (q−1);

Choose randomly a natural number e which is coprime to L and is smaller than L, $1 \leq e \leq L-1, GCD(e, L)=1,$ where "GCD(e, L)" is the greatest common divisor of e and L; and Calculate d satisfying e×d=1 mod L.

Since GCD(e, L)=1, such d exists without exception. The integers e and n obtained thus form a public key while the integer d is a private key. Here, "x mod y" is a reminder when x is divided by y.

(2) Generation of Encrypted Text

By using the integers e and n of the public key, an encrypted text c is calculated by performing encryption calculation on a plain text m.

$c = m \char`\^ e \bmod n$

Note that, in this description, an operator "^" indicates that a number following this is an exponent. For example, "A^x" means A is multiplied by itself x times when x>0.

(3) Generation of Decrypted Text

By using the integer number d of the private key, a decrypted text m' is calculated by performing decryption calculation on the encrypted text c.

$m' = c \char`\^ d \bmod n$

Note that the decrypted text m' agrees with the plain text m since $$m' = c^{\wedge}d \bmod n$$
$$= (m^{\wedge}e)^{\wedge}d \bmod n$$
$$= m^{\wedge}(e \times d \bmod L) \bmod n$$
$$= m^{\wedge}1 \bmod n$$
$$= m \bmod n.$$

RSA encryption is discussed in detail in Non-Patent Reference 2 (pp. 110-113).

The generation of primes is carries out in the public key generation step in the RSA encryption applying the prime factorization described above. The prime generation is described in detail in Non-Patent Reference 3 (pp. 145-154). There are two types of methods to generate primes: stochastic prime generation methods and deterministic prime generation methods. Primes generated by a stochastic prime generation method are numbers "likely to be primes", and they are not always primes. On the other hand, a deterministic prime generation method unfailingly generates primes. Details of stochastic and deterministic prime generation methods are described in Non-Patent Reference 2. The following gives an account of a deterministic prime generation method.

1.2 Example of Conventional Technique 1: Deterministic Prime Generation Method

Here is described a deterministic prime generation method using Maurer's method, by which primes are deterministically generated. The Maurer method is discussed in detail in Non-Patent Reference 3 (pp. 152-153).

In the deterministic prime generation method, primes are generated by repeating the following steps. A prime q having a bit size lenq is provided in advance.

<Step 1> A random number R having (lenq−1) bits is selected. Note that the beginning bit of the random number R must never fail to be 1.

<Step 2> A number N is calculated by using the following equation:

$$N = 2 \times q \times R + 1.$$

<Step 3> When the following 1st and 2nd judgments are both true, the number N is determined as a prime. Otherwise, it is determined as not being a prime.

1st judgment: $2^{(N-1)} = 1 \mod N$; and

2nd judgment: $GCD(2^{(2R)}-1, N) = 1$.

When being determined as a prime, the number N is output as a prime. When the number N is determined as not being a prime, the processing returns to Step 1 and is repeated until a prime is output.

The judging test of Step 3 is called the Pocklington's primality test, and described in detail in Non-Patent Reference 3 (p. 144). In the Pocklington's primality test, when q in "N=2×q×R+1" is a prime and the results of the 1st and 2nd judgments are true, the number N is unfailingly a prime. Therefore, it makes possible to determine and generate a prime in a deterministic manner.

In the deterministic prime generation using the Maurer's method, the prime N having a size 2×lenq is thus generated based on the prime q having a size lenq. Accordingly, in the case when a prime having a predetermined length is to be generated by using the Maurer's deterministic prime generation method, the generation of a prime having a length shorter than or the same as the predetermined length is repeated. For example, when a 512-bit length prime is to be generated, a 16-bit prime is generated based on an 8-bit prime provided in advance. Then, a 32-bit prime is generated based on the generated 16-bit prime. Next, a 64-bit prime is generated based on the generated 32-bit prime. After the repetition of the prime generation in a similar fashion, a 512-bit prime is generated.

Note that the 2nd judgment can be replaced by the following judgment.

3rd judgment: $2^{(2R)} \neq 1 \mod N$

The 3rd judgment is discussed in Non-Patent Reference 4. Hereinafter, the 3rd judgment is employed.

1.3 Key Issuing System Having Multiple Key Issuing Servers

Regarding key issuing systems for public key encryption, there are cases where a key is generated by a user and where a key is issued to a user by a key issuing server. When a key is issued by a key issuing server, it is often the case that a single server issues a key to the user. However, in order to reduce the processing load, a key issuing system may have multiple key management servers, and keys are issued by the respective key management servers.

<Patent Reference 1> Japanese Laid-Open Patent Application Publication No. 2003-5644;

<Non-Patent Reference 1> Coedited by Tatsuaki Okamoto and Kazuo Ohta, *Angou·Zero Chishiki Mondai·Suron* (Encryption·Zero Knowledge Problems·Number Theory), 1990, Kyoritsu Syuppan;

<Non-Patent Reference 2> Tatsuaki Okamoto and Hiroshi Yamamoto, *Gendai Angou* (Modern Encryption), 1997, Sangyo-Tosho;

<Non-Patent Reference 3> A. J. Menezes, P. C. van Oorschot, S. A. Vanstone, *Handbook of Applied Cryptography*, 1997, CRC Press;

<Non-Patent Reference 4> Eiji Okamoto, *Angou Riron Nyumon* (Introduction-to Encryption Theory), 1993, p. 21, Kyoritsu Syuppan; and <Non-Patent Reference 5> Henri Cohen, *A Course in Computational Algebraic Number Theory*, 1993, GTM 138, Springer-Verlag.

BRIEF SUMMARY OF THE INVENTION

[Problems that the Invention is to Solve]

Regarding a key issuing system using multiple key issuing servers, each of 1st and 2nd key issuing servers does not check an RSA key issued by the other key issuing server because a security problem occurs if the issued RSA keys are made publicly available. Therefore, there is a possibility that the 1st and 2nd key issuing servers generate the same public key and the same private key for 1st and 2nd users by chance.

Accordingly, a problem remains that security cannot be maintained when the encryption system is used.

For example, if a third user generates an encrypted text by using the public key for the 1st user and sends this to the 1st user, the 1st user can naturally decrypt the encrypted text by using its own private key; however, the 2nd user is also able to decrypt the encrypted text by using its own private key.

[Means to Solve the Problems]

In order to solve such a problem, it is effective if a generated prime allows identification of the server that has generated the prime. Since an RSA public key is computed by multiplication of two different primes, even if another key issuing server generates the same primes by chance, it is possible to eliminate these primes.

Given this factor, the present invention aims at offering a prime calculating apparatus for calculating primes whose generation source can be identified, a prime verification apparatus for performing the identification, a key issuing system, a prime calculation method, a prime verification method, and a computer program.

In order to accomplish the above objective, the present invention is a prime calculating apparatus for calculating a prime candidate N larger than a known prime q and testing primality of the calculated prime candidate N. The prime calculating apparatus comprises: an information storage unit storing the known prime q, management information that is an odd number and corresponds to a prime to be generated, and a predetermined verification value; a random number generation unit operable to generate a random number; a candidate calculation unit operable to (i) read the prime q, the management information, and the verification value, (ii) calculate a multiplication value R by multiplying the management information by the random number, and (iii) calculate the prime candidate N, according to N=2×(multiplication value R+w)×prime q+1, using w satisfying 2×w×prime q+1=the verification value (mod the management information); a primality testing unit operable to test primality of the calculated prime candidate N; and an output unit operable to output the calculated prime candidate N as a prime when the primality of the calculated prime candidate N is determined.

[Advantageous Effects of the Invention]

According to the structure above, the prime calculating apparatus calculates multiplication value R by multiplying the management information corresponding to the prime to be generated by the random number, and calculates prime candidate N, according to N=2×(multiplication value R+w)× prime q+1, using 2×w×prime q+1=the verification value(mod the management information). As a result, when the calculated prime candidate N is a prime, the generation source of the prime can be identified by judging whether (prime N−the verification value) is divisible by the management information.

Note that the generation source of the prime means, needless to say, a concept indicating the prime calculating apparatus which calculated the prime; however, it is also a concept indicating other apparatuses and groups related to the prime calculating apparatus.

Here, the verification value stored in the information storage unit may be 1. In this case, the candidate calculation unit calculates the prime candidate N according to N=2×multiplication value R×prime q+1.

According to the structure above, prime candidate N is calculated according to N=2×multiple value R×prime q+1, and therefore, the generation source of the prime can be identified by judging whether (prime N−1) is divisible by the management information.

Here, the primality testing unit may include: a 1st judging subunit operable to judge whether the prime candidate N satisfies $2^{N-1}=1 \mod N$; and a 2nd judging subunit operable to perform, when the judgment of the 1st judging subunit is affirmative, one of judgments of (i) whether the prime candidate N and the multiplication value R satisfy $2^{2R} \neq 1 \mod N$ and (ii) whether the prime candidate N and the multiplication value R satisfy $GCD(2^{2R}-1, N)=1$, and to determine the primality of the prime candidate N when the performed one of judgments is affirmative.

According to the structure above, the primality of the generated prime candidate is determined in a reliable fashion.

Here, the information storage unit may further store a known prime g and a unique issue identifier. In this case, the prime calculating apparatus further comprising: a prime generation unit operable to generate a prime gp by applying a prime generation function for generating a unique prime to the prime g and the issue identifier, and output the generated prime gp; and a writing unit operable to write the generated prime gp to the information storage unit as the management information.

In addition, the prime generation unit may (i) generate a combination of the issue identifier and a variable c that is one of 0 and a positive integer, (ii) calculate a prime candidate =2 ×prime g ×f(the combination) +1, and (iii) test primality of the calculated prime candidate, and outputs the calculated prime candidate as the prime gp when the primality of the calculated prime candidate is determined.

Here, when the primality of the calculated prime candidate is not determined, the prime generation unit may (i) add a value of 1 to the variable c, (ii) generate a 2nd combination of the issue identifier and the variable c having the value of 1 added thereto, (iii) calculate a 2nd prime candidate=2×prime g×f(the 2nd combination)+1, and (iv) test primality of the 2nd calculated prime candidate, and outputs the 2nd calculated prime candidate as the prime gp when the primality of the 2nd calculated prime candidate is determined.

According to the structures above, it is possible to generate unique management information.

Here, the prime calculating apparatus may further comprise: an iteration control unit operable to control the random number generation unit, the candidate calculation unit, and the primality testing unit to iterate the random number generation, the calculation of the prime candidate N, and the primality testing, until the primality of the calculated prime candidate N is determined by the primality testing unit.

According to the structure above, a prime is calculated without fail.

Here, the prime calculating apparatus may further comprise: a preparative prime storage unit storing a known prime p; a preparative random number calculation unit operable to calculate a random number R'; a preparative candidate calculation unit operable to calculate a prime candidate N', according to N'=2×random number R'×prime p+1, using the prime p and the calculated random number R'; a preparative primality testing unit operable to test primality of the calculated prime candidate N'; a preparative writing unit operable to write the calculated prime candidate N' to the information storage unit as a prime q when the primality of the calculated prime candidate N' is determined; and a preparative iteration control unit operable to control the preparative random number calculation unit, the preparative candidate calculation unit, and the preparative primality testing unit to iterate the calculation of the random number R', the calculation of the prime candidate N', and the primality testing, until the primality of the calculated prime candidate N' is determined by the preparative primality testing unit.

According to the structure above, it is possible to generate prime N' which is twice the known prime, and to generate prime N which is twice prime N'.

Here, the prime calculating apparatus may be a key generating apparatus for generating a public key and a private key of RSA encryption. In this case, the prime calculating further comprises: a public key generation unit operable to generate the public key using a calculated prime N; and a private key generation unit operable to generate the private key using the generated public key.

According to the structure above, it is possible to generate RSA public and private keys that use prime N, whose generation source can be identified.

Here, the public key generation unit may (i) direct the iteration control unit to newly obtain a prime N', (ii) calculate a number n, according to n=prime N×prime N', using the prime N and the newly obtained prime N', and (iii) generate a random number e. In this case, a combination of the calculated number n and the generated random number e is the public key, the private key generation unit calculates d satisfying e×d=1 mod L, L is a least common multiple of the prime N−1 and the prime N'−1, and the calculated d is the private key.

According to the structure above, public key n is calculated according to n=prime N×prime N', and therefore, it is possible to generate the public key, whose generation source can be identified by judging whether (public key n−(the verification value×the verification value)) is divisible by the management information.

Note that the generation source of the public key means, needless to say, a concept indicating the key generating apparatus which calculated the public key; however, it is also a concept indicating other apparatuses and groups related to the key generating apparatus. For example, it is a concept indicating a terminal to which the generated private key is assigned.

Here, the information storage unit may further store a different verification value from the verification value. In this case, the public key generation unit directs the iteration control unit to newly obtain a prime N'. The candidate calculation unit calculates a prime candidate N', according to N'=2× multiplication value R×prime q+the different verification value. The public key generation unit calculates a number n, according to n=prime N×prime N', using the prime N and the newly obtained prime N', and generates a random number e, a combination of the calculated number n and the generated random number e is the public key. The private key generation unit calculates d satisfying e×d=1 mod L, L is a least common multiple of the prime N−1 and the prime N'−1, and the calculated d is the private key.

According to the structure above, prime N is generated using the verification value, prime N' is generated using a different verification value, and public key n is calculated according to n=prime N×prime N'. Therefore, it is possible to generate the public key, whose generation source can be identified by judging whether (public key n −(the verification value×the different verification value)) is divisible by the management information.

Here, the prime calculating apparatus may be a key issuing server apparatus for generating and issuing the public key and the private key of RSA encryption for a terminal. In this case, the prime calculating apparatus further comprising: a key output unit operable to output the generated private key to the terminal; and a publishing unit operable to publish the generated public key.

According to the structure above, the private key generated for the terminal is output, and therefore, the terminal can obtain and use the private key.

Here, the prime calculating apparatus may further comprise: an identifier obtaining unit operable to obtain a terminal identifier uniquely identifying the terminal; a management information generation unit operable to generate the management information including the obtained terminal identifier; and a writing unit operable to write the generated management information to the information storage unit.

The management information includes a terminal identifier uniquely identifying the terminal, and therefore, it is possible to generate the public key in a manner that the terminal can be identified as the generation source of the public key.

The prime calculating apparatus may further comprise: a server identifier storage unit prestoring a server identifier uniquely identifying the prime calculating apparatus functioning as the key issuing server apparatus. Here, the management information generation unit further reads the server identifier from the server identifier storage unit, and generates the management information further including the read server identifier.

The management information includes a server identifier uniquely identifying the key issuing server apparatus, and therefore, it is possible to generate the public key in a manner that the key issuing server apparatus can be identified as the generation source of the public key.

In addition, the present invention is a prime verification apparatus for verifying the prime N output by the prime calculating apparatus. The prime verification apparatus comprises: a prime-verification-apparatus information storage unit storing the management information and the verification value; a subtraction unit operable to obtain a prime subtraction value by subtracting the verification value from the prime N; a judgment unit operable to judge whether the obtained prime subtraction value is divisible by the management information; and a control unit operable to permit use of the prime N when the judgment is affirmative, and prohibit the use of the prime N when the judgment is negative.

According to the structure above, it is possible to identify the generation source of the prime by judging whether (prime N−the verification value) is divisible by the management information.

Here, the prime calculating apparatus may store the verification value which is 1, and calculate a prime candidate N, according to N=2×multiplication value R×prime q+1. In this case, the verification value stored in the prime-verification-apparatus information storage unit is 1, and the subtraction unit obtains the prime subtraction value by subtracting 1 from the prime N.

According to the structure above, it is possible to identify the generation source of the prime by judging whether (prime N−1) is divisible by the management information.

Here, the prime calculating apparatus may further (i) store a known prime g and a unique issue identifier, (ii) generate a prime gp by applying a prime generation function for generating a unique prime using the prime g and the issue identifier, (iii) output the generated prime gp, and (iv) writes the generated prime gp to the information storage unit as the management information. In this case, the prime-verification-apparatus information storage unit further stores the prime g and the issue identifier. The prime verification apparatus further comprises: a prime generation unit operable to generate the prime gp by applying the prime generation function for generating the unique prime using the prime g and the issue identifier, and output the generated prime gp; and a writing unit operable to write the generated prime gp to the prime-verification-apparatus information storage unit as the management information.

Here, the prime calculating apparatus may (i) generate a combination of the issue identifier and a variable c that is one of 0 and a positive integer, (ii) calculate a prime candidate=2× prime g×f (the combination)+1, (iii) test primality of the calculated prime candidate, and (iv) outputs the calculated prime candidate as the prime gp when the primality is determined. In this case, the prime generation unit (i) generates the combination of the issue identifier and the variable c, (ii) calculates the prime candidate=2×prime g×f (the combination)+1, and (iii) tests primality of the calculated prime candidate, and outputs the calculated prime candidate as the prime gp when the primality is determined.

Here, when the primality is not determined, the prime calculating apparatus may (i) add a value of 1 to the variable c, (ii) generate a 2nd combination of the issue identifier and the variable c having the value of 1 added thereto, (iii) calculate a prime candidate=2×prime g×f(the 2nd combination)+1, and (iv) test primality of the calculated prime candidate and outputs the calculated prime candidate as the prime gp when the primality of the calculated prime candidate is determined. In this case, when the primality of the generated prime candidate is not determined, the prime generation unit (i) adds the value of 1 to the variable c, (ii) generates the 2nd combination of the issue identifier and the variable c having the value of 1 added thereto, and (iii) tests primality of the calculated prime candidate and outputs the calculated prime candidate as the prime gp where the primality is determined.

According to the structure above, it is possible to generate unique management information.

Here, the prime calculating apparatus may be a key generating apparatus for generating a public key and a private key of RSA encryption, and further generate the public key of RSA encryption using the output prime N and generate the private key of RSA encryption using the generated public key. In this case, the prime verification apparatus is a key verification apparatus for verifying the public key. The prime verification apparatus further comprises: an obtaining unit operable to obtain the public key; and a verifying unit operable to verify validity of the obtained public key.

According to the structure above, it is possible to identify the generation source of the RSA public key.

Here, the prime calculating apparatus may further (i) store a different verification value from the verification value, (ii) newly obtain a prime N' by calculating a prime candidate N', according to N'=2 ×multiplication value R×prime q+ the different verification value, (iii) calculate a number n, according to n=prime N×prime N', using the prime N and the newly obtained prime N' and generates a random number e, and (iv) calculate d satisfying e×d=1 mod L, where L is a least common multiple of the prime N−1 and the prime N'−1, and a combination of the calculated number n and the generated random number e is the public key while the calculated d is the private key. In this case, the prime-verification-apparatus information storage unit stores the different verification value, and the obtaining unit obtains the combination of the number n and the random number e as the public key. The verifying unit includes: a subtraction subunit operable to obtain a multiplication value by multiplying the verification value and the different verification value and to obtain a public key subtraction value by subtracting the multiplication value from the obtained number n; a judgment subunit operable to judge whether the obtained prime subtraction value is divisible by the management information; and a control subunit operable to permit output of the public key when the judgment is affirmative, and prohibit the output of the public key when the judgment is negative.

According to the structure above, public key n is calculated according to n=prime N×prime N', and therefore, it is possible to identify the generation source of the public key by judging whether (public key n—(the verification value×the verification value)) is divisible by the management information.

Here, the prime calculating apparatus may further (i) store a different verification value from the verification value, (ii) newly obtain a prime N' by calculating a prime candidate N', according to N'=2×multiplication value R×prime q+the different verification value, (iii) calculate a number n, according to n=prime N×prime N', using the prime N and the newly obtained prime N' and generates a random number e, and (iv) calculate d satisfying e×d=1 mod L, where L is a least common multiple of the prime N−1 and the prime N'−1, and a combination of the calculated number n and the generated random number e is the public key while the calculated d is the private key. In this case, the prime-verification-apparatus information storage unit stores the different verification value, the obtaining unit obtains the combination of the number n and the random number e as the public key. The verifying unit includes: a subtraction subunit operable to obtain a multiplication value by multiplying the verification value and the different verification value and to obtain a public key subtraction value by subtracting the multiplication value from the obtained number n; a judgment subunit operable to judge whether the obtained prime subtraction value is divisible by the management information; and a control subunit operable to permit output of the public key when the Judgment is affirmative, and prohibit the output of the public key when the judgment is negative.

According to the structure above, prime N is generated using the verification value, prime N' is generated using a different verification value, and public key n is calculated according to n=prime N×prime N'. Therefore, it is possible to identify the generation source of the public key by judging whether (public key n−(the verification value×the different verification value)) is divisible by the management information.

Here, the management information stored in the prime-verification-apparatus information storage unit may include a terminal identifier uniquely identifying the terminal. In this case, the judgment unit judges whether the obtained prime subtraction value is divisible by the management information including the terminal identifier.

The management information includes a terminal identifier uniquely identifying the terminal, and therefore, it is possible to identify the terminal as the generation source of the public key.

Here, the management information stored in the prime-verification-apparatus information storage unit may include a server identifier uniquely identifying the prime calculating apparatus functioning as the key issuing server apparatus. In this case, the judgment unit judges whether the obtained prime subtraction value is divisible by the management information including the server identifier.

The management information includes a server apparatus identifier uniquely identifying the key issuing server, and therefore, it is possible to identify the key issuing server apparatus as the generation source of the public key.

Here, the prime verification apparatus may be a public-key-certificate issuing server apparatus. In this case, the prime verification apparatus further comprises: a certificate generation unit operable to generate, when the verifying unit determines that the public key is valid, signature data by applying a digital signature to public key information including at least the public key, and to generate a public key certificate including at least the signature data and the public key; and a certificate output unit operable to output the generated public key certificate.

According to the structure above, when the public key is determined valid, a public key certificate is generated and output, and therefore, it is possible to generate a public key certificate which identifies the generation source of the public key.

BRIEF DESCRIPTION OF THE DRAWINGS

FIG. 4 shows an example of a data structure of a control information table T100;

FIG. 7 shows an example of a data structure of verification value table T200;

FIG. 20 shows an example of a data structure of a verification value table T250;

FIG. 23 shows an example of a data structure of a control information table T150;

FIG. 28 shows an example of a data structure of an issued key information table T1100;

FIG. 30 shows an example of a data structure of a verification value table T1200;

DETAILED DESCRIPTION OF THE INVENTION

1. First Embodiment

Here is a description of a key issuing system 1 of the first embodiment according to the present invention.

1.1 Overview of Key Issuing System 1

Figure 1:
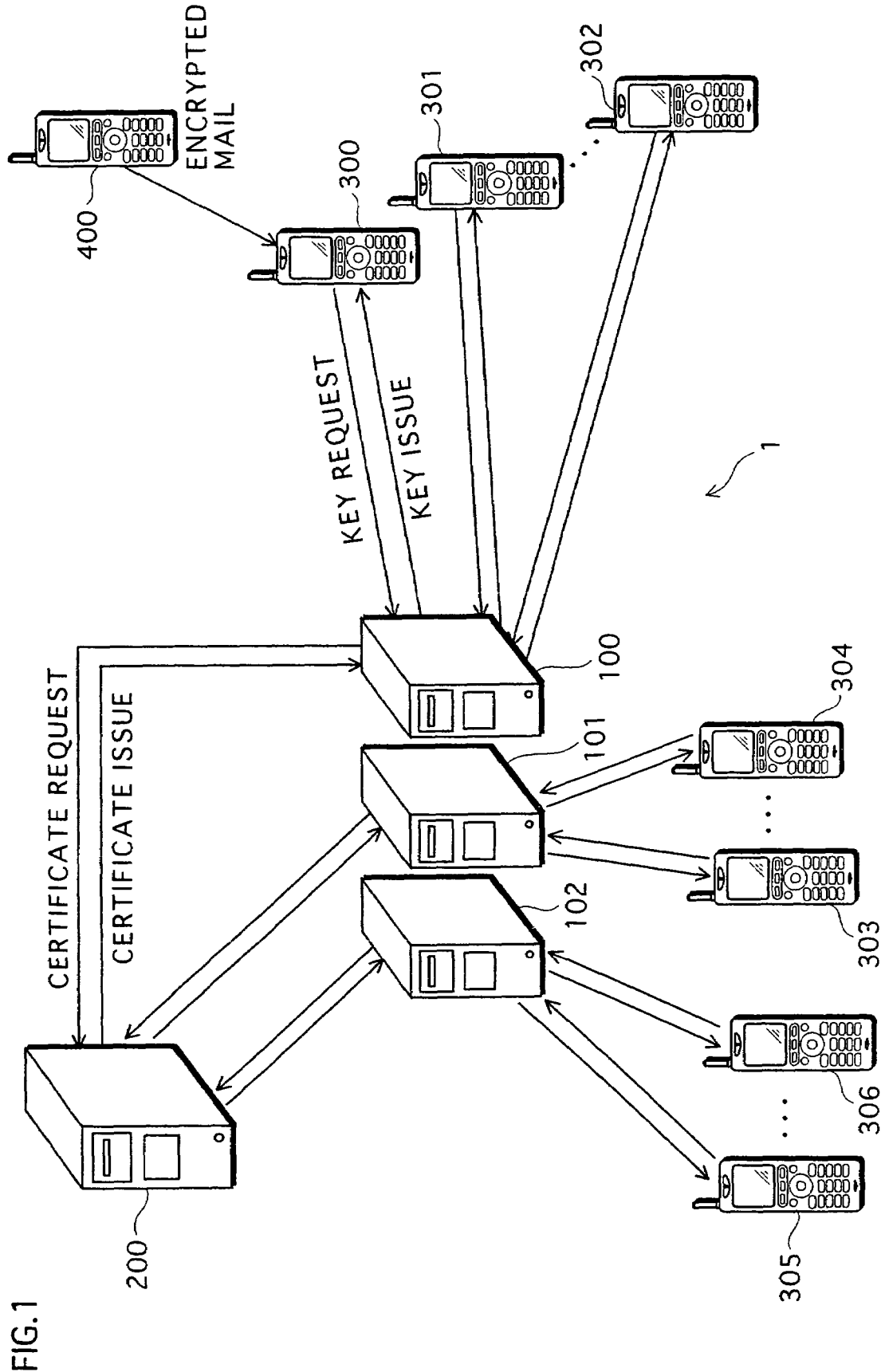
FIG. 1 is an overall schematic view of a key issuing system 1.

As shown in FIG. 1, the key issuing system 1 comprises: key issuing servers 100, 101 and 102; a certificate issuing server 200; and terminals 300, 301, ..., 302, 303, ..., 304, 305, ..., and 306. The number of the terminals is, for example, a thousand.

Each of the key issuing servers 100, 101 and 102 is managed by a different company. The terminals 300, 301, ..., and 302 individually request the key issuing server 100 to issue a key. In the same manner, the terminals 303, ..., and 304 individually request the key issuing server 101 to issue a key, while the terminals 305, ..., and 306 individually request the key issuing server 102 to issue a key. Note that the terminals 300, 301, ..., and 302 respectively have safe communication pathways with the key issuing server 100. And in the same way, safe communication pathways are established between the key issuing server 101 and the respective terminals 303, ..., and 304 as well as between the key issuing server 102 and the respective terminals 305, ..., and 306.

In like fashion, each of the key issuing servers 100, 101 and 102 also has a safe communication pathway with the certificate issuing server 200.

Note that the following describes the overview of the key issuing system 1, using the key issuing server 100, certificate issuing server 200 and terminal 300.

Receiving a key issue request from the terminal 300, the key issuing server 100 generates a private key and a public key with the RSA encryption, and requests the certificate issuing server 200 to issue a public key certificate for the generated public key. Here, assume that the key length of each key to be generated is 1024 bits.

Receiving the certificate issue request from the key issuing server 100, the certificate issuing server 200 issues a public key certificate, and then transmits the issued public key certificate to the key issuing server 100.

Receiving the public key certificate from the certificate issuing server 200, the key issuing server 100 transmits the received public key certificate and the generated private key to the terminal 300.

Receiving the public key certificate and the private key from the key issuing server 100, the terminal 300 stores the received public key certificate and private key.

Subsequently, the user of the terminal 400, for example, first obtains the public key certificate of the terminal 300 from the key issuing server 100, or from the terminal 300, and examines the validity of the public key certificate, using the public key held by the certificate issuing server 200. When the public key certificate is determined as valid, the obtained public key certificate is stored in the terminal 400. The terminal 400 encrypts an e-mail to be transmitted to the terminal 300, using the public key included in the stored public key certificate, and transmits the encrypted e-mail to the terminal 300.

Receiving the encrypted e-mail from the terminal 400, the terminal 300 decrypts the encrypted e-mail, using the stored private key, and displays the decrypted e-mail.

Herewith, a safe exchange of data can be achieved between the terminals 300 and 400.

Note that since each of the terminals 301, ..., and 302 is the same as the terminal 300, the descriptions are left out here. In addition, each of the key issuing servers 101 and 102 is the same as the key issuing server 100, the descriptions are left out here.

In the following explanation, the terminal 300 is used as a representative terminal while the key issuing server 100 being used as a representative key issuing server.

1.2 Structure of Key Issuing Server 100

Figure 2:
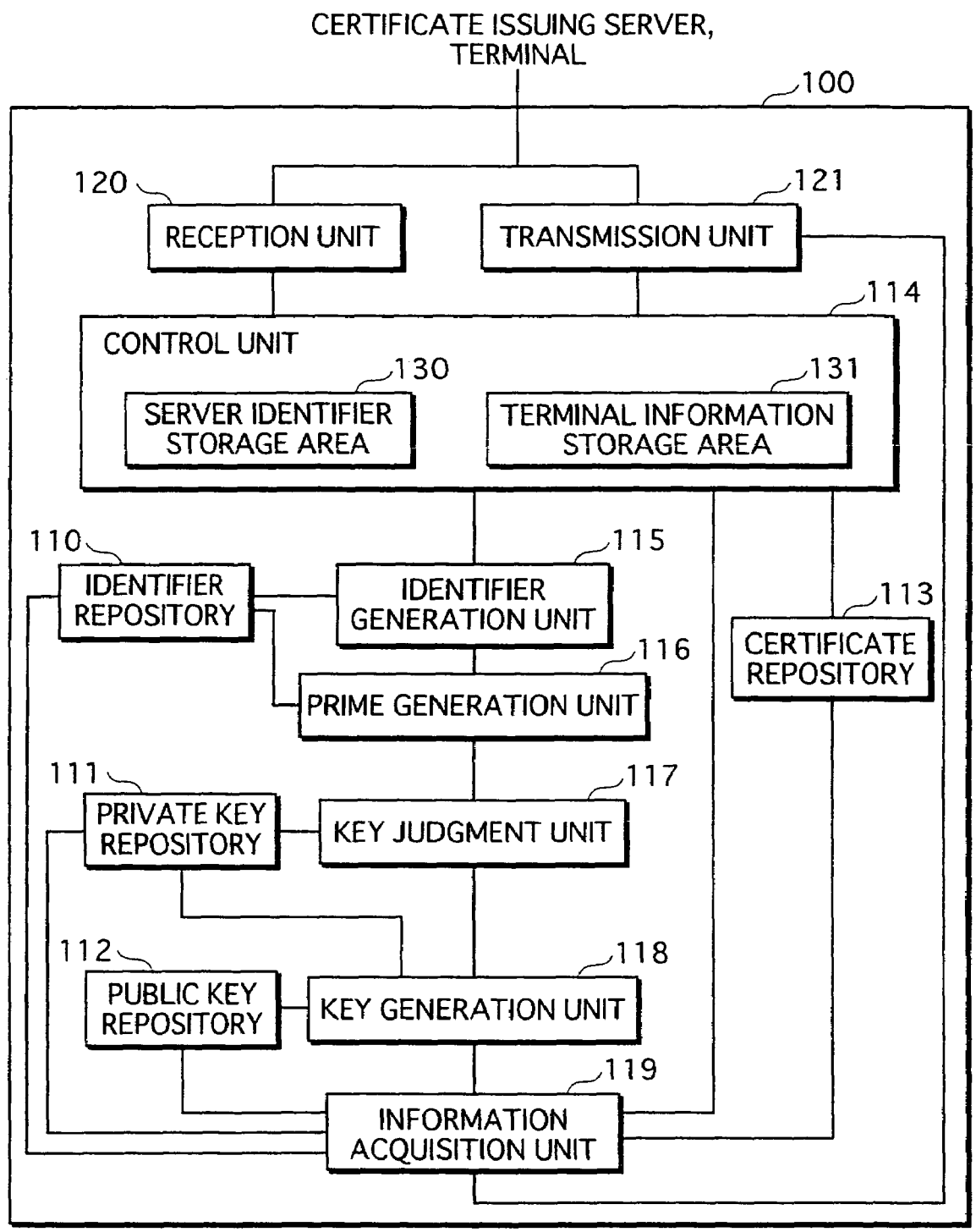
FIG. 2 is a block diagram illustrating the configuration of a key issuing server 100.

The key issuing server 100, as shown in FIG. 2, comprises: an identifier repository 110; a private key repository 111; a public key repository 112; a certificate repository 113; a control unit 114; an identifier generation unit 115; a prime generation unit 116; a key judgment unit 117; a key generation unit 118; an information acquisition unit 119; a reception unit 120; and a transmission unit 121.

The key issuing server 100 is, specifically speaking, a computer system composed of a microprocessor, ROM, RAM, a hard drive unit, a display unit, a keyboard, a mouse, and the like. A computer program is stored in the RAM or the hard drive unit. The microprocessor operates according to the computer program, and thereby the key issuing server 100 achieves the function.

Note that, since each of the key issuing servers 101 and 102 has the same structure as the key issuing server 100, the descriptions are left out here.

1.2.1 Identifier Repository 110

The identifier repository 110 has an area to store issue identifier information, having a bit size of 126 bits or less. The bit size of the issue identifier information is 64 bits, for example.

1.2.2 Private Key Repository 111

The private key repository 111 has: a prime repository area to store two primes which are used for private key generation; and a private key repository area to store a private key generated by the key generation unit 118.

1.2.3 Public Key Repository 112

The public key repository 112 has an area to store a public key generated at the key generation unit 118.

1.2.4 Certificate Repository 113

The certificate repository 113 has an area to store a public key certificate issued by a certificate issuing server.

1.2.5 Control Unit 114

The control unit 114, as shown in FIG. 2, has a server identifier storage area 130 and a terminal information storage area 131.

The server identifier storage area 130 stores in advance a sever identifier which identifies the server itself. For example, in the case of the key issuing server 100, SIDA is stored therein, while SIDB and SIDC are stored in the server identifier storage area 130 of the key issuing servers 101 and 102, respectively. Note that the following description is given with the server identifier of the key issuing server 100 being "SID". Here, the bit size of the server identifier is 31 bits.

The terminal information storage area 131 has an area to store a terminal identifier that identifies a terminal having requested a key issue. Here, the terminal identifier is, for example, a serial number of the terminal. The bit size of the serial number is here 32 bits.

Receiving, from the terminal 300 via the reception 120, key issue request information indicating a key issue request and a terminal identifier "TID" of the terminal 300, the control unit 114 writes the received terminal identifier "TID" to the terminal information storage area 131. The control unit 114 outputs an order to generate issue identifier information and the received terminal identifier "TID" to the identifier generation unit 115.

Receiving a public key certificate "Cert" from the certificate issuing server 200 via the reception unit 120, the control unit 114 writes the received public key certificate "Cert" to the certificate repository 113. The control unit 114 outputs, to the information acquisition unit 119, a distribution start order to start a process of distributing the private key and the public key certificate to the terminal 300 which has requested a key issue.

1.2.6 Identifier Generation Unit 115

Receiving the order to generate issue identifier information and the terminal identifier "TID" from the control unit 114, the identifier generation unit 115 acquires the server identifier "SID" stored in the server identifier storage area.

The identifier generation unit 115 generates issue identifier information "IDI=SID∥TID∥1" from the acquired server identifier "SID", the received terminal identifier "TID" and a number "1". Here, the symbol "∥" denotes a bit join or byte join. By setting the last bit of the issue identifier information "IDI" to "1", the issue identifier information "IDI" is always an odd number, and the bit size is 64 bits.

The identifier generation unit 115 writes the generated issue identifier information "IDI" to the identifier repository 110, and outputs an order to start prime generation to the prime generation unit 116.

1.2.7 Prime Generation Unit 116

Figure 3:
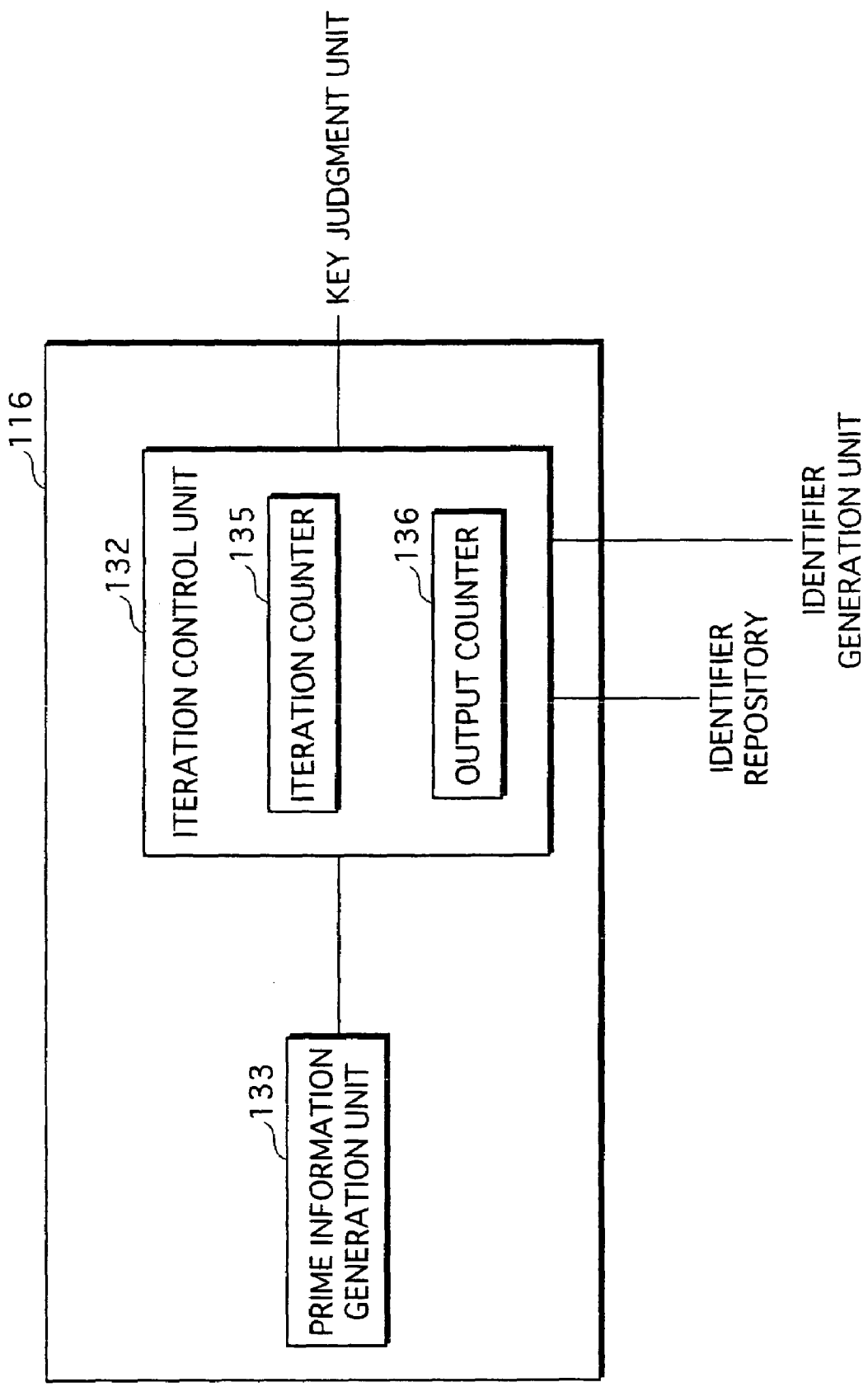
FIG. 3 is a block diagram illustrating the configuration of a prime generation unit 116.

The prime generation unit 116, as shown in FIG. 3, has an iteration control unit 132 and a prime information generation unit 133.

The prime generation unit 116 generates a 512-bit prime from an 8-bit prime, and outputs the generated 512-bit prime to the key judgment unit 117.

1.2.7.1 Iteration Control Unit 132

The iteration control unit 132 has an initial value storage area that stores in advance an 8-bit prime and the bit size of the prime (i.e. "8"), and a temporary storage area to temporarily store a prime received from the prime information generation unit 133.

The iteration control unit 132, as shown in FIG. 3, has an iteration counter 135 that counts the iteration number of operations of the prime information generation unit 133, and an output counter 136 that counts the number of primes output to the key judgment unit 117—i.e. the number of times that a generated 512-bit prime has been output. Note that the initial values of the iteration counter 135 and the output counter 136 are both "1".

The iteration control unit 132 has a control information table T100 shown in FIG. 4. The control information table T100 stores at least one combination made up of the number of iterations and control information. The number of iterations corresponds to the value of the iteration counter 135. The control information indicates a type of a generation method used to generate a prime at the prime information generation unit 133.

Receiving the order to start prime generation from the identifier generation unit 115, the iteration control unit 132 controls the prime information generation unit 133 to generate a prime. Receiving a prime from the prime information generation unit 133, the iteration control unit 132 either orders again the prime information generation unit 133 to generate a prime or outputs the received prime to the key judgment unit 117, according to the individual values of the iteration counter 135 and output counter 136.

The operation is described next.

Receiving the order to start prime generation from the identifier generation unit 115, the iteration control unit 132 sets both the iteration counter 135 and output counter 136 to "1".

Receiving a prime from the prime information generation unit 133, the iteration control unit 132 adds "1" to the value of the iteration counter 135, and judges whether the added result is 7 or not.

When determining that the added result is 7, the iteration control unit 132 judges whether the value of the output counter 136 is 1 or not. When determining that it is 1, the iteration control unit 132 outputs the received prime to the key judgment unit 117 as a prime "p1", and adds "1" to the value of the output counter 136 while setting the value of the iteration counter 135 to "1". When determining that it is not 1—i.e. two or more, the iteration control unit 132 makes the received prime a prime "p2", and outputs the prime "p2" and a judgment start order to the key judgment unit 117.

When determining that the added result is not 7, the iteration control unit 132 calculates the bit size of the received prime, and temporarily stores the received prime and the calculated bit size in the temporary storage area.

The iteration control unit 132 performs the following operation whenever (i) after receiving the order to start prime generation and setting the values of both the iteration counter 135 and the output counter 136 to "1", (ii) after temporarily storing a prime received from the prime information generation unit 133 and the bit size of the prime, and (iii) after adding "1" to the value of the output counter 136 and setting the value of the iteration counter 135 to "1".

The iteration control unit 132 judges whether the value of the iteration counter 135 is 1. When determining that it is 1, the iteration control unit 132 reads the 8-bit prime and the bit size of the prime from the initial value storage area. On the other hand, when determining that it is not 1, the iteration control unit 132 reads a bit size "8×(2^(n−1))" and the prime from the temporary storage area. That is, when determining that the value of the iteration counter 135 is not 1, the iteration control unit 132 reads, from the temporary storage area, a prime that was temporarily stored most recently and the bit size of the prime. Here, "n" is a value of the iteration counter. Herewith, the iteration control unit 132 reads the prime generated in the previous time and the bit size of the prime from the temporary storage area. For example, when the value of the iteration counter 135 is "2", the iteration control unit 132 reads a prime of "16" bits; when the value of the iteration counter 135 is "3", the iteration control unit 132 reads a prime of "32" bits. Namely, when the value of the iteration counter 135 is "2", "3", "4", "5" and "6", a prime of "16", "32", "64", "128" and "256" bits, respectively, is read out.

Control information corresponding to the value of the iteration counter 135 is read from the control information table T100, and the iteration control unit 132 judges whether the read control information is "Information C".

When determining that it is "Information C", the iteration control unit 132 generates 1st information made up of the read prime, the bit size of the prime, and the control information, and outputs the generated 1st information to the prime information generation unit 133.

When determining that it is not "Information C", the iteration control unit 132 acquires the issue identification information "IDI" from the identifier repository 110, and calculates a bit size "lenIDI" of the acquired issue identifier information. The iteration control unit 132 then generates 2nd information made up of the read prime, the bit size of the prime, the control information, the issue identifier information "IDI" and the bit size "lenIDI", and outputs the generated 2nd information to the prime information generation unit 133.

In addition, when receiving a regeneration order to regenerate a prime from the key judgment unit 117, the iteration control unit 132 adds "1" to the value of the output counter 136 and sets the value of the iteration counter 135 to "1". Subsequently, the iteration control unit 132 performs the judgment of whether the value of the iteration counter 135 is "1" and the subsequent operation.

1.2.7.2 Prime Information Generation Unit 133

Figure 5:
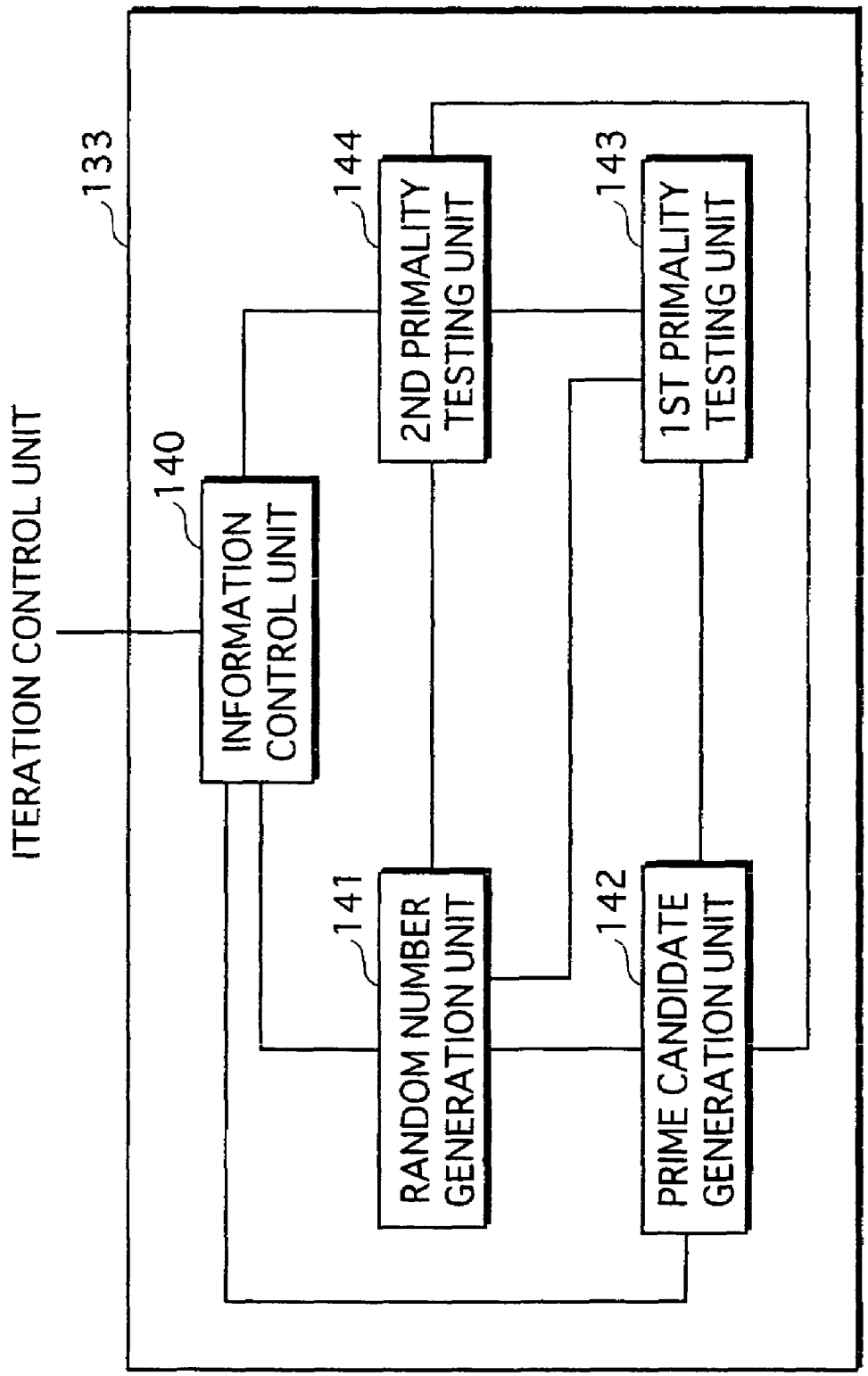
FIG. 5 is a block diagram illustrating the configuration of a prime information generation unit 133.

The prime information generation unit 133, as shown in FIG. 5, comprises: an information control unit 140; a random number generation unit 141; a prime candidate generation unit 142; a 1st primality testing unit 143; and a 2nd primality testing unit 144.

The prime information generation unit 133 generates a prime whose bit size is twice as large as that of the prime received from the iteration control unit 132. For example, when receiving a prime of 8 bits, the prime information generation unit 133 generates a prime of 16 bits. In the same fashion, a prime of 32 bit is generated when a prime of 16 bit is received.

The following describes each structural component, assuming that a prime received from the iteration control unit 132 is "q" and the bit size is "lenq".

1.2.7.3 Information Control Unit 140

The information control unit 140 has an information storage area to store the 1st and 2nd information.

The information control unit 140 has a verification-value storage area that stores in advance a 1st verification value "c11" and a 2nd verification value "c12" which are assigned by the certificate issuing server 200 and used when a prime is generated based on the control information "Information A".

Receiving, from the iteration control unit 132, the 1st information made up of the prime "q", the prime's bit size "lenq", and the control information, the information control unit 140 writes the received 1st information to the information storage area. That is, the information control unit 140 writes the prime "q", the prime's bit size "lenq", and the control information (in this case, "Information C").

Receiving, from the iteration control unit 132, the 2nd information made up of the prime "q", the prime's bit size "lenq", the control information, the issue identifier information "IDI" and the bit size "lenIDI", the information control unit 140 writes the received 2nd information to the information storage area. That is, the information control unit 140 writes the prime "q", the prime's bit size "lenq", the control information, the issue identifier information "IDI" and the bit size "lenIDI".

After writing the received information, the information control unit 140 outputs a 1st generation direction indicating a direction of random number generation to the random number generation unit 141.

Receiving a prime from the 2nd primality testing unit 144, the information control unit 140 outputs the received prime to the iteration control unit 132.

Receiving, from the prime candidate generation unit 142, a number read-out order to read the value of the output counter 136, the information control unit 140 reads the value of the output counter 136 in the iteration control unit 132. The information control unit 140 outputs the read value to the prime candidate generation unit 142.

1.2.7.4 Random Number Generation Unit 141

Receiving, from the information control unit 140, the 1st generation direction indicating a direction of random number generation, the random number generation unit 141 reads control information stored in the information storage area of the information control unit 140. The random number generation unit 141 judges whether the read control information is "Information C".

When determining that it is "Information C", the random number generation unit 141 reads "lenq" stored in the information storage area of the information control unit 140, generates a random number "R1" of (lenq-1) bits, and outputs the generated random number "R1" and the read control information to the prime candidate generation unit 142. Here, the first bit of the random number "R1" is 1. The method for generating random numbers is described in detail in Non-patent Reference 2.

When determining that it is not "Information C", the random number generation unit 141 reads "lenq" and "lenIDI" stored in the information storage area of the information control unit 140. Then, the random number generation unit 141 generates a random number "R1" of (lenq-lenIDI-1) bits, and outputs the generated random number "R1" and the read control information to the prime candidate generation unit 142. Here, the first bit of the random number "R1" is 1.

In addition, when receiving, from either the 1st primality testing unit 143 or the 2nd primality testing unit 144, a 2nd generation direction to generate a random number again, the random number generation unit 141 reads control information from the information storage area and conducts the above operation.

1.2.7.5 Prime Candidate Generation Unit 142

The prime candidate generation unit 142 has: a generated information storage area to store generated information; and a function storage area that stores in advance a function "f" which is an injection. Here, the function "f" is, for example, $f(X\|Y)=Enc(K, X\|Y)$. $Enc(K, X\|Y)$ is an encrypted text obtained by encrypting $(X\|Y)$ by a common key encryption method using a key K. An encryption function of a common key encryption method is generally a bisection. In addition, the symbol "$\|$" is a bit join or byte join. An example of the encryption function "$Enc(K, X\|Y)$" is "$Enc(K, X\|Y)=K \text{ XOR } X\|Y$". Note that an example of the common key encryption method is DES, and when DES is employed, the key length is 128 bits. At this point, the prime candidate generation unit 142 stores a predetermined key "K".

Receiving the random number "R1" and the control information from the random number generation unit 141, the prime candidate generation unit 142 judges whether the received control information is "Information C".

When determining that it is "Information C", the prime candidate generation unit 142 reads the prime "q" from the information storage area of the information control unit 140. The prime candidate generation unit 142 generates a number "$N=2\times R1\times q+1$", using the read prime "q" and the random number "R1" received from the random number generation unit 141. The number "N" generated at this point is a prime candidate.

The prime candidate generation unit 142 judges whether a bit size "lenN" of the generated number "N" matches "2×lenq". When determining that they match each other, the prime candidate generation unit 142 outputs the generated number "N" to the 1st primality testing unit 143, and stores, in the generated information storage area, the received random number "R1" as "R".

When determining that they do not match each other, the prime candidate generation unit 142 multiplies the random number "R1" received from the random number generation unit 141 by 2, makes the result "R1", and then generates the number "$N=2\times R1\times q+1$" by conducting the above operation once again.

When determining that the control information is not "Information C", the prime candidate generation unit 142 reads the prime "q" and the issue identifier information "IDI" from the information storage area of the information control unit 140. The prime candidate generation unit 142 judges whether the control information is "Information B".

When determining that it is "Information B", the prime candidate generation unit 142 generates a join value "IDI$\|$R1" from the received random number "R1" and the read issue identifier information "IDI", and then generates a number "$R=f(IDI\|R1)$" using the generated join value "IDI$\|$R1" and the function "f" stored in the function storage area. The prime candidate generation unit 142 generates the number "$N=2\times R\times q+1$" using the generated number "R" and the read prime "q". The number "N" generated at this point is a prime candidate.

The prime candidate generation unit 142 judges whether a bit size "lenN" of the generated number "N" is "2×lenq".

When determining that it is "2×lenq", the prime candidate generation unit 142 outputs the generated number "N" to the 1st primality testing unit 143, and stores the generated number "R" to the generated information storage area.

When determining that it is not "2×lenq", the prime candidate generation unit 142 multiplies the random number "R1" received from the random number generation unit 141 by 2, makes the result "R1", and generates the numbers "R" and "N" once again.

When it is determined that the control information is not "Information B", the prime candidate generation unit 142 generates the number "$R=IDI\times R1$" using the received random number "R1" and the read issue identifier information "IDI". The prime candidate generation unit 142 outputs a number read-out order to the information control unit 140, and receives the number of the output counter 136 from the information control unit 140. The prime candidate generation unit 142 judges whether the value of the output counter 136 is "1".

When determining that the number of outputs is "1", the prime candidate generation unit 142 reads the 1st verification value "c11" from the verification-value storage area of the information control unit 140.

When determining that the number of outputs is not "1"— that is, "two" or more, the prime candidate generation unit 142 reads the 2nd verification value "c12" from the verification-value storage area of the information control unit 140.

Note that the operations of the prime candidate generation unit 142 after reading the 1st verification value "c11" and after reading the 2nd verification value "c12" are the same, and therefore the following explanation is given using a verification value "c".

The prime candidate generation unit 142 generates a number "$N=2\times(R+w)\times q+1$" using the read prime "q", the issue identifier information "IDI", the verification value "c" and the generated number "R". The number "N" generated at this point is a prime candidate.

Here, "w" is a number that satisfies "$2\times w\times q+1=c \mod IDI$, $0 \leq w < IDI$". "w" is found by calculating "$w=(c-1)\times m \mod IDI$". "m" is a number that satisfies "$(2\times q)\times m=1 \mod IDI$". As described above, since the issue identifier information "IDI" is an odd number—i.e. "$GCD(IDI, 2)=1$"—and "IDI<q", "m" can be found by calculation. The calculation method is described in detail in Non-patent reference 5. Note that, hereinafter, "w" for the case where the 1st verification value "c11" is used is denoted as "w1" while "w" for the case where the 2nd verification value is used is denoted as "w2".

The prime candidate generation unit 142 reads the bit size "lenq" of the prime "q" from the information storage area of the information control unit 140, and judges whether the bit size of the generated number "N" is "2×lenq".

When determining that it is "2×lenq", the prime candidate generation unit 142 outputs the generated number "N" to the 1st primality testing unit 143, and stores the generated number "R" in the generated information storage area.

When determining that it is not "2×lenq", the prime candidate generation unit 142 multiplies the random number "R1" received from the random number generation unit 141 by 2, makes the result "R1", and generates the numbers "R" and "N" once again.

1.2.7.6 1st Primality Testing Unit 143

Receiving the number "N" from the prime candidate generation unit 142, the 1st primality testing unit 143 judges, using the received number "N", whether the following equation is true.

$$2^{(N-1)} = 1 \bmod N \qquad \text{Eq. 1}$$

Here, $2^{(N-1)}$ means 2 to the power of (N−1).

The 1st primality testing unit 143 outputs the number "N" to the 2nd primality testing unit 144 when determining that Eq. 1 is true.

The 1st primality testing unit 143 outputs the 2nd generation direction to the random number generation unit 141 when determining that Eq. 1 is false.

1.2.7.7 2nd Primality Testing Unit 144

Receiving the number "N" from the 1st primality testing unit 143, the 2nd primality testing unit 144 reads the number "R" stored in the generated information storage area of the prime candidate generation unit 142.

The 2nd primality testing unit 144 judges, using the numbers "N" and "R", whether the following equation is true.

$$2^{(2 \times R)} \neq 1 \bmod N \qquad \text{Eq. 2}$$

When determining that the Eq. 2 is true, the 2nd primality testing unit 144 takes the number "N" as a prime "N", and outputs the prime "N" to the iteration control unit 132 via the information control unit 140.

When determining that the Eq. 2 is false, the 2nd primality testing unit 144 outputs the 2nd generation direction to the random number generation unit 141.

1.2.8 Key Judgment Unit 117

The key judgment unit 117 has a prime storage area to store the two primes "p1" and "p2" received from the prime generation unit 116.

Receiving the primes "p1" and "p2" received from the prime generation unit 116, the key judgment unit 117 separately stores the received primes "p1" and "p2" in the prime storage area.

Receiving a judgment start order from the prime generation unit 116, the key judgment unit 117 judges whether the two primes "p1" and "p2" stored in the prime storage area agree with each other. When determining that they agree with each other, the key judgment unit 117 deletes the stored prime "p2" and outputs a regeneration order to the control unit 132.

When determining that they do not agree with each other, the key judgment unit 117 writes the stored two primes "p1" and "p2" to the prime repository area of the private key repository 111, and outputs a key generation start order to the key generation unit 118.

1.2.9 Key Generation Unit 118

Receiving the key generation start order from the key judgment unit 117, the key generation unit 118 reads the two primes "p1" and "p2" stored in the prime repository area of the-private key repository 111, and calculates the product "n" of the read primes "p1" and "p2"—i.e. "n=p1×p2".

The key generation unit 118 generates a random number "e", further generates, as a public key, a combination "PK=(n, e)" made up of the calculated "n" and the generated random number "e", and then writes the generated public key "PK" to the public key repository 112. Here, the random number "e" is coprime to the number "L", as in the conventional technique, and satisfies "1≦e≦L−1, GCD(e, L)=1". Here, GCD (e, L) is the greatest common divisor of e and L. The number "L" is found by "L=LCM(p1−1, p2−1)", and LCM(p1−1, p2−1) is the least common multiple of "p1−1" and "p2−1".

The key generation unit 118 calculates "d" satisfying "exd=1 mod L", and writes, as a private key, a combination "SK=(p1, p2, d)" made up of the calculated "d", and the primes "p1" and "p2" to the private key repository area of the private key repository 111. The key generation unit 118 outputs, to the information acquisition unit 119, a request start order to start a process of requesting a public key certificate.

1.2.10 Information Acquisition Unit 119

Receiving the request start order from the key generation unit 118, the information acquisition unit 119 separately reads the issue identifier information "IDI" from the identifier repository 110, the public key "PK" from the public key repository 112, and the server identifier of the server identifier storage area 130 in the control unit 114. The information acquisition unit 119 transmits, to the certificate issuing server 200 via the transmission unit 121, the read issue identifier information "IDI", public key "PK", and server identifier, together with certificate issue request information for requesting to issue a public key certificate.

Receiving a distribution start order from the control unit 114, the information acquisition unit 119 separately reads: the private key "SK" store in the private key repository 111; the public key certificate "Cert" stored in the certificate repository 113; and the terminal identifier stored in the terminal information storage area of the control unit 114, and transmits, via the transmission unit 121, the read private key "SK" and public key certificate "Cert" to the terminal 300 corresponding to the read terminal identifier.

1.2.11 Reception Unit 120

The reception unit 120 receives information from the certificate issuing server 200 and the terminal 300 via the Internet, and outputs the received information to the control unit 114.

1.2.12 Transmission Unit 121

Receiving the issue identifier information "IDI", the public key "PK", the server identifier, and the certificate issue request information from the information acquisition unit 119, the transmission unit 121 transmits the received individual information to the certificate issuing server 200.

The transmission unit 121 receives the private key "SK" and the public key certificate "Cert", and transmits the received individual information to the terminal 300.

1.3 Structure of Certificate Issuing Server 200

Figure 6:
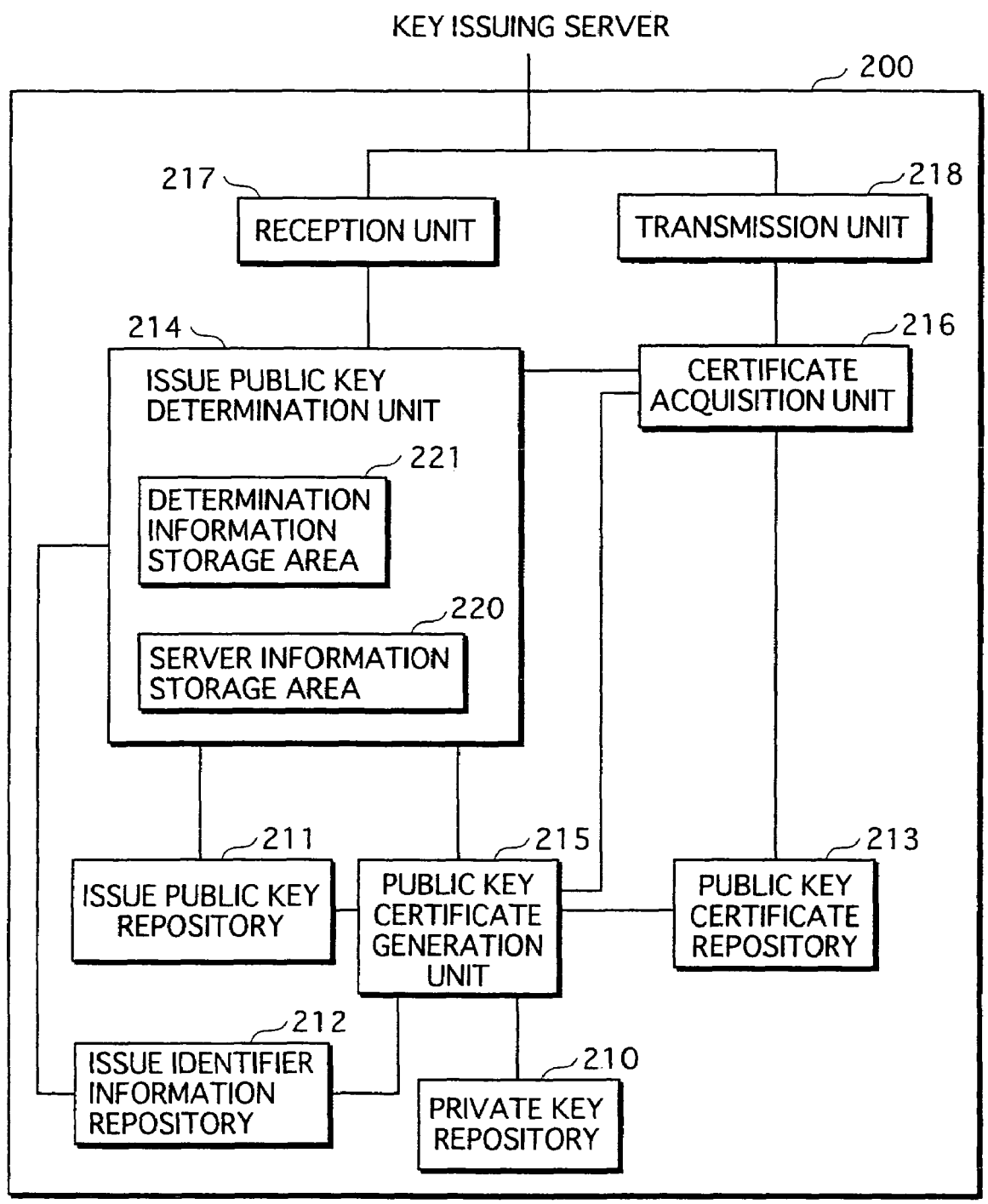
FIG. 6 is a block diagram illustrating the configuration of a certificate issuing server 200.

Receiving the certificate issue request information from each of the key issuing servers 100, 101 and 102, the certificate issuing server 200 issues a public key certificate and transmits the issued public key certificate to the key issuing server having made an issue request As shown in FIG. 6, the certificate issuing server 200 comprises: a private key repository 210; an issue public key repository 211; an issue identifier information repository 212; a public key certificate repository 213; an issue public key determination unit 214; a public key certificate generation unit 215; a certificate acquisition unit 216; a reception unit 217; and a transmission unit 218.

The certificate issuing server 200 is, specifically speaking, a computer system composed of a microprocessor, ROM, RAM, a hard drive unit, a display unit, a keyboard, a mouse, and the like. A computer program is store in the RAM or the hard drive unit. The microprocessor operates according to the computer program, and thereby the certificate issuing server 200 achieves the function.

Note that the certificate issuing server 200 conducts the same operations when receiving the certificate issue request information from the key issuing server 100 and from other key issuing servers. And therefore, in the following description, certificate issue request information transmitted from the key issuing server 100 is used.

1.3.1 Private Key Repository 210

The private key repository 210 stores in advance a private key "SKCA" that only the certificate issuing server 200 has.

Here, a public key "PKCA" corresponding to the private key "SKCA" has been distributed to the terminal 400.

1.3.2 Issue Public Key Repository 211

The issue public key repository 211 has an area to store the public key "PK" received from the key issuing server 100.

1.3.3 Issue Identifier Information Repository 212

The issue identifier information repository 212 has an area to store the issue identifier information "IDI" received from the key issuing server 100.

1.3.4 Public Key Certificate Repository 213

The public key certificate repository 213 has an area to store the issued public key certificate "Cert".

1.3.5 Issue Public Key Determination Unit 214

The issue public key determination unit 214, as shown in FIG. 6, has a server information storage area 220 and a determination information storage area 221.

The server information storage area 220 has an area to store a server identifier which identifies a key issuing server having made an issue request of a public key certificate.

The determination information storage area 221 has a verification value table T200, as shown in FIG. 7. The verification value table T200 has an area to store at least one combination made up of a server identifier, a 1st verification value and a 2nd verification value. The server identifier is an identifier that identifies a key issuing server. "SIDA" indicates the key issuing server 100, while "SIDB" and "SIDC" indicating the key issuing servers 101 and 102, respectively. The 1st and 2nd verification values are verification values assigned to the key issuing servers indicated by associated server identifiers. Note that the following description is given assuming that the server identifier of the key issuing server 100 is "SID".

The issue public key determination unit 214 receives, from the key issuing server 100 via the reception unit 217, the issue identifier information "IDI", the public key "PK", the server identifier and the certificate issue request information.

The issue public key determination unit 214 writes the received server identifier to the server information storage area 220.

The issue public key determination unit 214 reads corresponding 1st and 2nd verification values "c11" and "c12" by using the received server identifier.

The issue public key determination unit 214 determines, using the received public key "PK" and issue identifier information "IDI", whether the public key "PK" has been generated. by using the issue identifier information "IDI".

The determination method is explained here. The public key "PK" is "PK=(n, e)", as described above. The issue public key determination unit 214 calculates "n−(c11×c12)", and examines whether the calculation result is divisible by "IDI". Herewith, it can be determined that the public key "PK" has been generated using the issue identifier information "IDI".

When "n−(c11×c12)" is divisible by "IDI", the issue public key determination unit 214 determines that the public key "PK" has been generated using the issue identifier information "IDI". On the other hand, when "n−(c11×c12)" is not divisible by "IDI", the issue public key determination unit 214 determines that the public key "PK" has not been generated using the issue identifier information "IDI".

When determining that the public key "PK" has been generated using the issue identifier information "IDI", the issue public key determination unit 214 writes the received public key "PK" to the issue public key repository 211 while writing the issue identifier information to the issue identifier information repository 212. The issue public key determination unit 214 outputs, to the public key certificate generation unit 215, an order to start generating a public key certificate.

The issue public key determination unit 214 terminates the process when determining that the public key "PK" has not been generated using the issue identifier information "IDI".

1.3.6 Public Key Certificate Generation Unit 215

Receiving the order to start generating a public key certificate from the issue public key determination unit 214, the public key certificate generation unit 215 separately reads the private key "SKCA" from the private key repository 210, the public key "PK" from the issue public key repository 211, and the issue identifier information "IDI" from the issue identifier information repository 212.

The public key certificate generation unit 215 generates the public key certificate "Cert" using the read private key "SKCA", public key "PK" and issue identifier information "IDI". Specifically speaking, the public key certificate "Cert" to be generated is "Cert=n||e||IDI||Sig(SKCA, n||e||IDI)". Here, Sig (K, D) is signature data of when a private key "K" is used with respect to data "D". Here, the symbol "||" denotes a bit join or byte join.

The public key certificate generation unit 215 writes the generated public key certificate "Cert" to the public key certificate repository 213, and outputs, to the certificate acquisition unit 216, an order to start transmitting the public key certificate "Cert".

1.3.7 Certificate Acquisition Unit 216

Receiving the order to start transmitting the public key certificate "Cert" from the public key certificate generation unit 215, the certificate acquisition unit 216 separately reads the public key certificate "Cert" from the public key certificate repository 213 and the server identifier from the server information storage area 220, and transmits the read public key certificate "Cert" to the key issuing server 100 corresponding to the read server identifier via the transmission unit 218.

1.3.8 Reception Unit 217

The reception unit 217 receives information from the key issuing server 100, and outputs the received information to the issue public key determination unit 214.

1.3.9 Transmission Unit 218

The transmission unit 218 receives information from the certificate acquisition unit 216, and transmits the received information to the key issuing server 100.

1.4 Structure of Terminal 300

Figure 8:
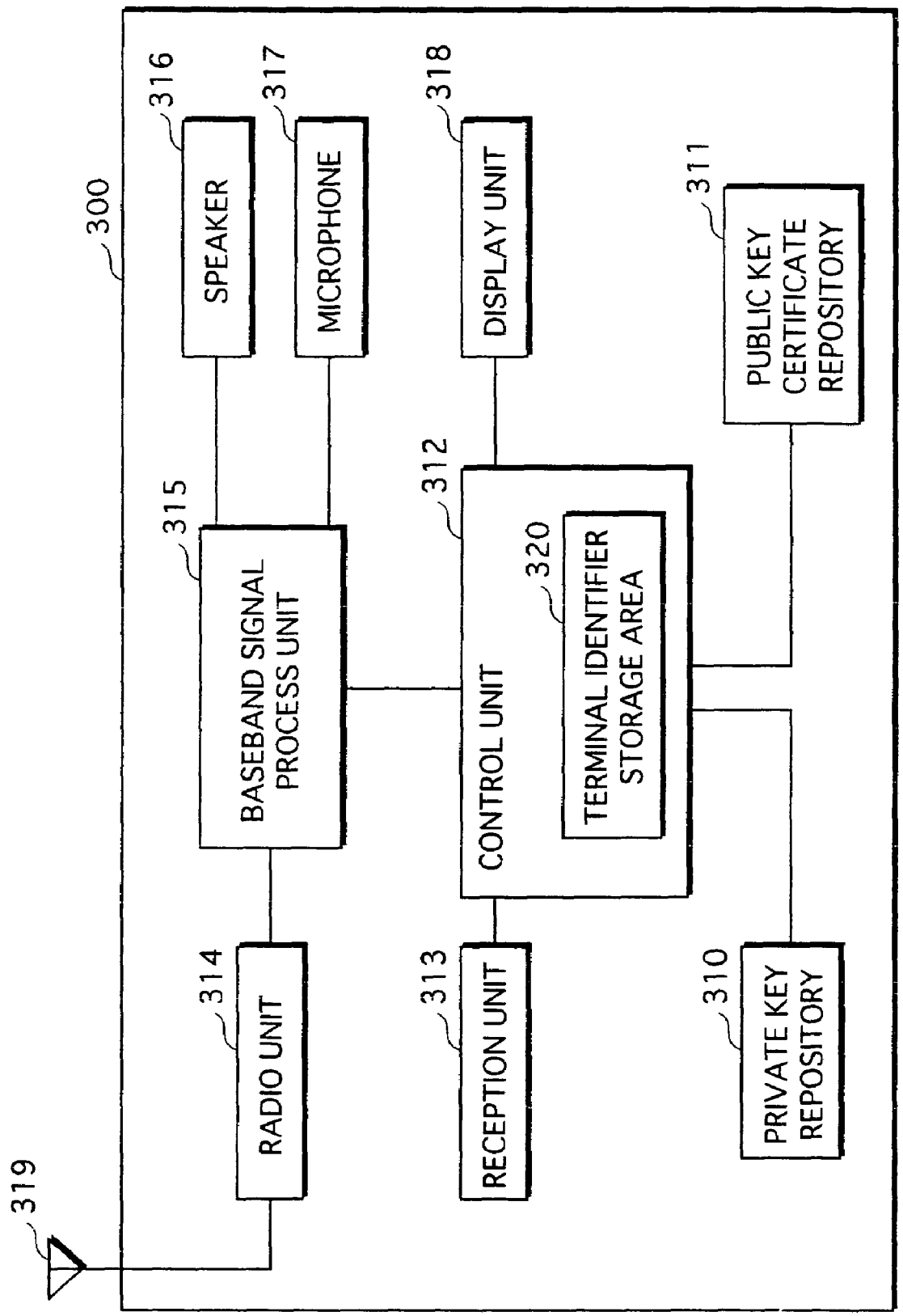
FIG. 8 is a block diagram illustrating the configuration of a terminal 300.

The terminal 300, as shown in FIG. 8, comprises: a private key repository 310; a public key certificate repository 311; a control unit 312; a reception unit 313; a radio unit 314; a baseband signal process unit 315; a speaker 316; a microphone 317; and a display unit 318. A portable phone is an example of the terminal 300.

The terminal 300 is, specifically speaking, a computer system composed of a microprocessor, ROM, RAM, a hard drive unit, a display unit, a keyboard, a mouse, and the like. A computer program is store in the RAM or the hard drive unit. The microprocessor operates according to the computer program, and thereby the terminal 300 achieves the function.

Note that, since each of the terminals 301, . . . , 302, 303, . . . , 304, 305, . . . , and 306 has the same structure as the terminal 300, their descriptions are left out here.

The following operations are all the same as the operation of when the terminal 300 transmits key issue request information and the terminal identifier to the key issuing server 100: when each of the terminals 301, . . . , and 302 transmits key issue request information and a terminal identifier of its own to the key issuing server 100; when each of the terminals 303, . . . , and 304 transmits key issue request information and a terminal identifier of its own to the key issuing server 101; and when each of the terminals 305, . . . , and 306 transmits key issue request information and a terminal identifier of its own to the key issuing server 102. Therefore, the following describes an operation of when key issue request information and a terminal identifier are transmitted to the key issuing server 100.

1.4.1 Private Key Repository 310

The private key repository 310 has an area to store the private key "SK=(p1, p2, d)" issued by a key issuing server having transmitted key issue request information—here, the key issuing server 100.

1.4.2 Public Key Certificate Repository 311

The public key certificate repository 311 has an area to store the public key certificate "Cert" of the public key corresponding to the private key issued by the key issuing server 100.

1.4.3 Control Unit 312

The control unit 312, as shown in FIG. 8, has a terminal identifier storage area 320.

The control unit 312 also has a mail storage area to store an encrypted e-mail.

The terminal identifier storage area 320 stores in advance the terminal identifier "TID" which identifies the terminal itself.

Receiving a direction of a key issue request from the reception unit 313, the control unit 312 reads the terminal identifier "TID" from the terminal identifier storage area 320.

The control unit 312 transmits the key issue request information and the read terminal identifier "TID" to the key issuing server 100 via the baseband signal process unit 315 and the radio unit 314.

Receiving the private key "SK" and public key certificate "Cert" from the key issuing server 100 via the radio unit 314 and the baseband signal process unit 315, the control unit 312 writes the received private key "SK" to the private key repository 310 while writing the public key certificate "Cert" to the public key certificate repository 311.

Receiving an encrypted e-mail from the terminal 400 via the radio unit 314 and the baseband signal process unit 315, the control unit 312 writes the received, encrypted e-mail to the mail storage area.

Receiving an order to display the encrypted e-mail from the reception unit 313, the control unit 312 reads the private key "SK" from the private key repository 310 and the encrypted e-mail from the mail storage area, decrypts the encrypted e-mail using the read private key "SK", and outputs the decrypted e-mail (hereinafter, referred to simply as "e-mail") to the display unit 318.

1.4.4 Reception Unit 313 Receiving a key issue request direction set out by a user operation, the reception unit 313 outputs the received direction to the control unit 312.

Receiving an encrypted e-mail display direction sent out by a user operation, the reception unit 313 outputs a display order to the control unit 312.

1.4.5 Radio Unit 314

The radio unit 314 has an antenna. 319, and receives and transmits radio signals.

1.4.6 Baseband Signal Process Unit 315

The baseband signal process unit 315 performs signal process for outputting a signal received from the radio unit 314 to the speaker 316 and a signal process for outputting audio received from the microphone 317 to the radio unit 314.

Receiving key issue request information and a terminal identifier from the control unit 312, the baseband signal process unit 315 transmits the received key issue request information and terminal identifier to the key issuing server 100 via the radio unit 314.

Receiving the private key and the public key certificate from the key issuing server 100 via the radio unit 314, the baseband signal process unit 315 outputs the received private key and public key certificate to the control unit 312.

Receiving the private key and public key certificate from the key issuing server 100 via the radio unit 314, the baseband signal process unit 315 outputs the received private key and public key certificate to the control unit 312.

Receiving an encrypted e-mail from the terminal 400 via the radio unit 314, the baseband signal process unit 315 outputs the received, encrypted e-mail to the control unit 312.

1.4.7 Speaker 316

The speaker 316 outputs a signal processed by the baseband signal process unit 315 as audio.

1.4.8 Microphone 317

The microphone 317 receives audio of the user, and outputs the received audio to the baseband signal process unit 315.

1.4.9 Display Unit 318

The display unit 318 displays an e-mail received from the control unit 312.

1.5 Operation of Key Issuing System 1

The operation of the key issuing system 1 is described here.

1.5.1 Overview of Operation of Key Issuing System 1

Figure 9:
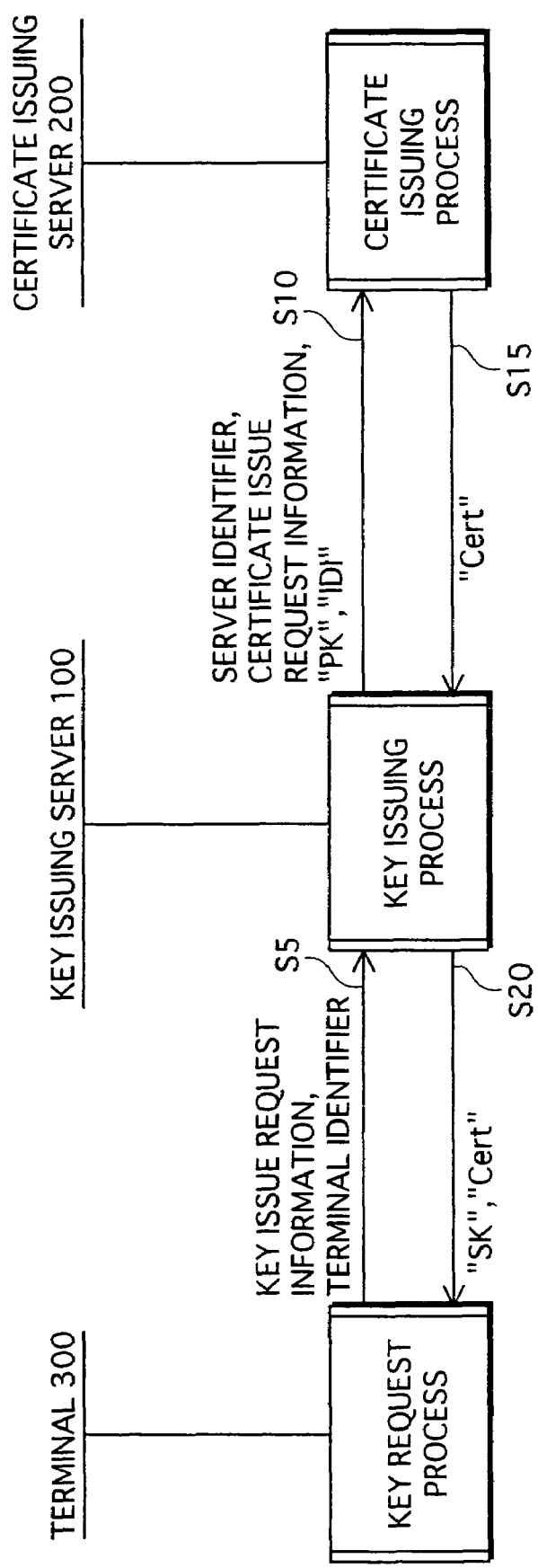
FIG. 9 is a flow diagram illustrating an outline of operation of the key issuing system 1.

The overview of operation of the key issuing system 1 is explained using a flow diagram shown in FIG. 9.

The following shows an overview of operation of when the key issuing server 100 issues a key to the terminal 300.

First, in a key request process, the terminal 300 transmits key issue request information and the terminal identifier "TID" to the key issuing server 100 (Step S5).

Receiving the key issue request information and terminal identifier "TID" from the terminal 300, the key issuing server 100 generates the issue identifier information "IDI", private key "SK=(p1, p2, d)" and public key "PK=(n, e)" in the key issuing process. The key issuing server 100 transmits the generated issue identifier information "IDI" and public key "PK", the certificate issue request information and the server identifier "SID" to the certificate issuing server 200 (Step S10).

Receiving the issue identifier information "IDI", public key "PK", certificate issue request information and server identifier "SID", the certificate issuing server 200 judges, in a certificate issuing process, whether the primes "p1" and "p2" included in the private key "SK" corresponding to the public key "PK" has been generated using the issue identifier information "IDI". When the judgment result is affirmative, the certificate issuing server 200 generates the public key certificate "Cert" corresponding to the public key "PK", and transmits the generated public key certificate "Cert" to the key issuing server 100 (Step S15).

Receiving the public key certificate "Cert" from the certificate issuing server 200 in the key issuing process, the key issuing server 100 transmits the private key "SK=(p1, p2, d)" and the public key certificate "Cert" to the terminal 300 (Step S20).

Receiving the private key "SK" and public key certificate "Cert" from the key issuing server 100 in the key request process, the terminal 300 stores the received private key "SK" and public key certificate "Cert", and then finished the system.

1.5.2 Key Request Process

Figure 10:
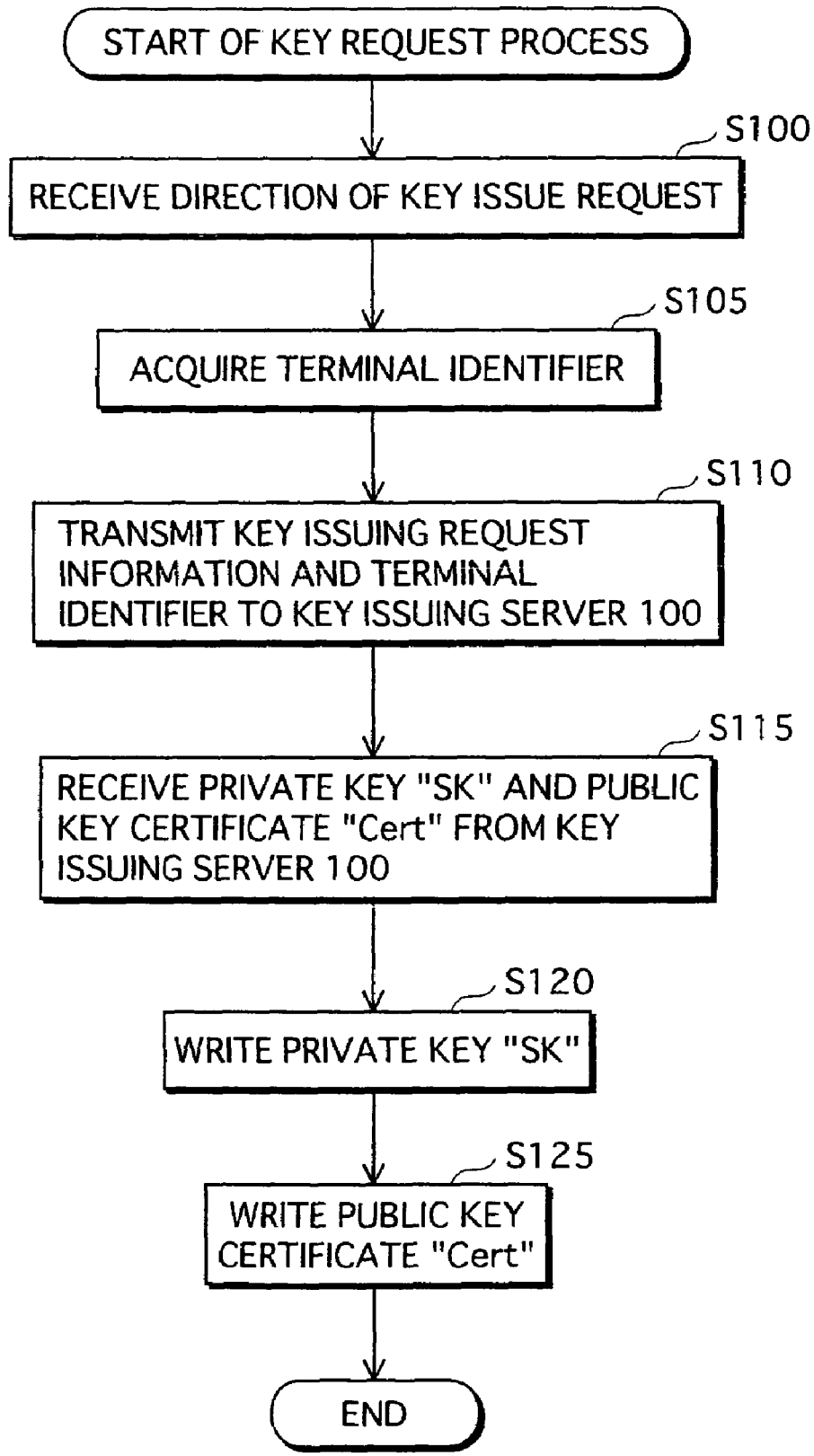
FIG. 10 is a flow diagram illustrating operation of a key request process in the key issuing system 1.

Here is described the operation of the key request process shown in FIG. 9, using a flow diagram illustrated in FIG. 10. Note that the operation of the key request process is described with the use of the terminal 300 and the key issuing server 100.

The reception unit 313 of the terminal 300 receives a key issue request direction set out by a user operation (Step S100).

The control unit 312 of the terminal 300 acquires the terminal identifier "TID" from the terminal identifier storage area 320 (Step S105).

The control unit 312 of the terminal 300 transmits the key issue request information and the acquired terminal identifier "TID" to the key issuing server 100 via the baseband signal process unit 315 and the radio unit 314 (Step S110).

The control unit 312 of the terminal 300 receives the private key "SK" and the public key certificate "Cert" from the key issuing server 100 via the radio unit 314 and the baseband signal process unit 315 (Step S115).

The control unit 312 writes the received private key "SK" to the private key repository 310 (Step S120) while writing the public key certificate "Cert" to the public key certificate repository 311 (Step S125).

1.5.3 Key Issuing Process

Here is described the operation of the key issuing process shown in FIG. 9 using flow diagrams illustrated in FIGS. 11, 12, 13 and 14.

Receiving, from the terminal 300 via the reception unit 120, key issue request information and the terminal identifier "TID" of the terminal 300 (Step S200), the control unit 114 of the key issuing server 100 writes the received terminal identifier "TID" to the terminal information storage area 131, and outputs an order to generate issue identifier information and the received terminal identifier "TID" to the identifier generation unit 115 (Step S205).

Receiving the order to generate issue identifier information and terminal identifier "TID" from the control unit 114, the identifier generation unit 115 acquires the server identifier "SID" stored in the server identifier storage area. The identifier generation unit 115 generates the issue identifier information "IDI" from the acquired server identifier "SID", the received terminal identifier "TID" and a number "1", writes the generated issue identifier information "IDI" to the identifier repository 110, and outputs an order to start prime generation to the prime generation unit 116 (Step S210).

Receiving the order to start prime generation from the identifier generation unit 115, the iteration control unit 132 sets both the iteration counter 135 and the output counter 136 to "1" (Step S215).

The iteration control unit 132 judges whether the value of the iteration counter 135 is 1 (Step S220).

When determining-that it is 1 ("YES" in Step S220), the iteration control unit 132 reads a prime and a bit size thereof from the initial value storage area (Step S225). When determining that it is not 1 ("NO" in Step S220), on the other hand, the iteration control unit 132 reads, from the temporary storage area, a bit size "8×(2^(n−1))" and a prime thereof—i.e. a prime generated in the previous time and a bit size thereof (Step S230). That is, when determining that the value of the iteration counter 135 is not 1, the iteration control unit 132 reads from the temporary storage area. Here, "n" is the value of the iteration counter.

The iteration control unit 132 reads control information corresponding to the value of the iteration counter 135 from the control information table T100 (Step S235), and judges whether the read control information is "Information C" (Step S240).

When determining that it is "Information C" ("YES" in Step S240), the iteration control unit 132 generates 1st information made up of the read prime, the bit size of the prime, and the control information, and outputs the generated 1st information to the prime information generation unit 133 (Step S245).

When determining that it is not "Information C" ("NO" in Step S240), the iteration control unit 132 acquires the issue identifier information "IDI" from the identifier repository 110, calculates the bit size "lenIDI" of the acquired issue identifier information "IDI", generates 2nd information made up of the read prime, the bit size of the prime, the control information, the issue identifier information "IDI" and its bit size "lenIDI", and outputs the generated 2nd information to the prime information generation unit 133 (Step S250).

The prime information generation unit 133 generates a prime in the prime generation process, and outputs the generated prime to the iteration control unit 132 (Step S255).

Receiving the prime from the prime information generation unit 133, the iteration control unit 132 adds "1" to the value of the iteration counter 135 (Step S260), and judges whether the added result is 7 (Step S265).

When determining that the added result is not 7 ("NO" in Step S265), the iteration control unit 132 calculates the bit size of the received prime (Step S270), and temporarily stores the received prime and calculated bit size (Step S275), and the process returns to Step S220.

When determining that the added result is 7 ("YES" in Step S265), the iteration control unit 132 further judges whether the value of the output counter 136 is 1 (Step S280).

When determining that it is 1 ("YES" in Step S280), the iteration control unit 132 outputs the received prime to the key judgment unit 117 as the prime "p1" (Step S285), adds "1" to the value of the output counter 136 (Step S290), and sets the value of the iteration counter 135 to "1" (Step S295), and the process returns to Step S220.

When determining that it is not 1—i.e. two or more— ("NO" in Step S280), the iteration control unit 132 makes the received prime the prime "p2" and outputs the prime "p2" and a judgment start order to the key judgment unit 117 (Step S300).

Receiving the prime "p1" from the iteration control unit 132 in Step S285, the key judgment unit 117 stores the received prime "p1" in the prime storage area. Receiving "p2" and the judgment start order from the iteration control unit 132 in Step S300, the key judgment unit 117 stores the received prime "p2" in the prime storage area. The key judgment unit 117 judges whether the two primes "p1" and "p2" stored in the prime storage area agree with each other (Step S305). When determining that they agree with each other, the key judgment unit 117 deletes the stored prime "p2" and outputs a regeneration order to the iteration control unit 132 ("YES" in Step S305). Receiving, from the key judgment unit 117, the regeneration order to generate a prime again, the iteration control unit 132 performs the above-mentioned Steps S290 and 295, and the process then returns to Step S220.

When determining that they do not agree with each other, the key judgment unit 117 writes the stored two primes "p1" and "p2" in the prime repository area of the private key repository 111, and outputs an order to start generating a key to the key generation unit 118 ("NO" in Step S305). Receiving the order to start generating a key from the key judgment unit 117, the key generation unit 118 reads the two primes "p1" and "p2" stored in the prime repository area of the private key repository 111, and calculates the product "n" of the read primes "p1" and "p2"—i.e. "n=p1×p2"—(Step S310).

The key generation unit 118 generates the random number "e" (Step S315), further generates, as a public key, a combination "PK=(n, e)" made up of the calculated "n" and generated random number "e", and writes the generated public key "PK" in the public key repository 112 (Step S320). Here, the random number "e" is coprime to the number "L", as in the conventional technique, and satisfies "1≦e≦T−1, GCD(e, L)=1". The number "L" is found from an equation of "L=LCM(p1−1, p2−1).

The key generation unit 118 calculates "d" satisfying "e×d=1 mod L" (Step S325), writes, as a private key, a combination "SK=(p1, p2, d)" made up of the calculated "d" and the primes "p1" and "p2" to the private key repository area of the private key repository 111, and outputs a request start order to the information acquisition unit 119 (Step S330).

Receiving a request start order from the key generation unit 118, the information acquisition unit 119 separately reads the issue identifier information "IDI" from the identifier repository 110, the public key "PK" from the public key repository 112, and the server identifier from the server identifier storage area 130 of the control unit 114 (Step S335). The information acquisition unit 119 transmits, to the certificate issuing server 200 via the transmission unit 121, the read issue identifier information "IDI", public key "PK", server identifier, and certificate issue request information for requesting to issue a public key certificate (Step S340).

Receiving the public key certificate "Cert" from the certificate issuing server 200 via the reception unit 120, the control unit 114 writes the received public key certificate "Cert" to the certificate repository 113, and outputs a distribution start order to the information acquisition unit 119 (Step S345).

Receiving the distribution start order from the control unit 114, the information acquisition unit 119 separately reads the private key "SK" stored in the private key repository 111, the public key certificate "Cert" stored in the certificate repository 113, and the terminal identifier stored in the terminal information storage area of the control unit 114 (Step S350), and transmits the read private key "SK" and public key certificate "Cert" to the terminal 300 corresponding to the read terminal identifier via the transmission unit 121 (Step S355).

1.5.4 Prime Generation Process

Figure 12:
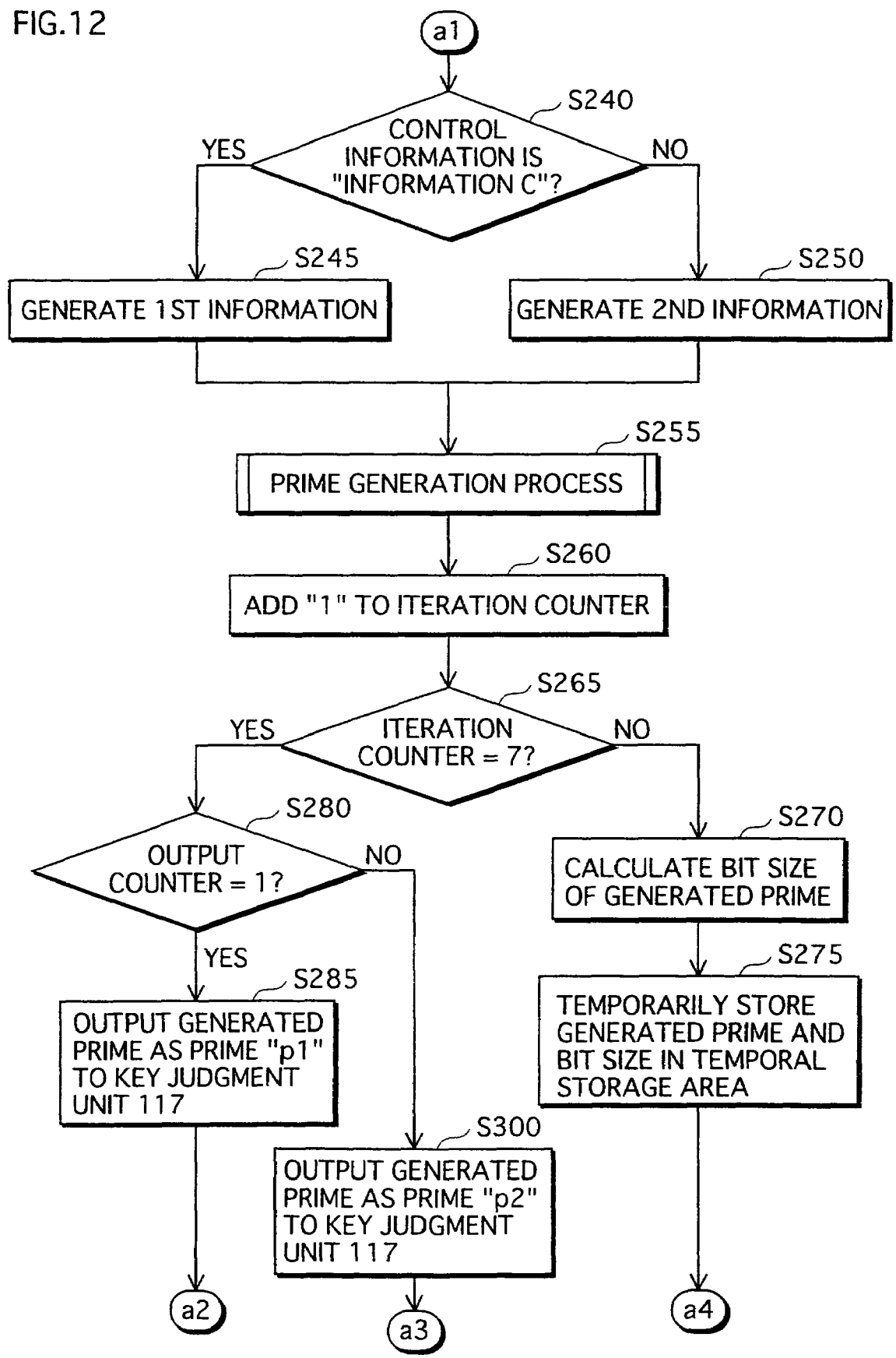
FIG. 12 is a flow diagram illustrating operation of the key issuing process in the key issuing system 1 (continued from FIG. 11 to FIG. 13)
Figure 15:
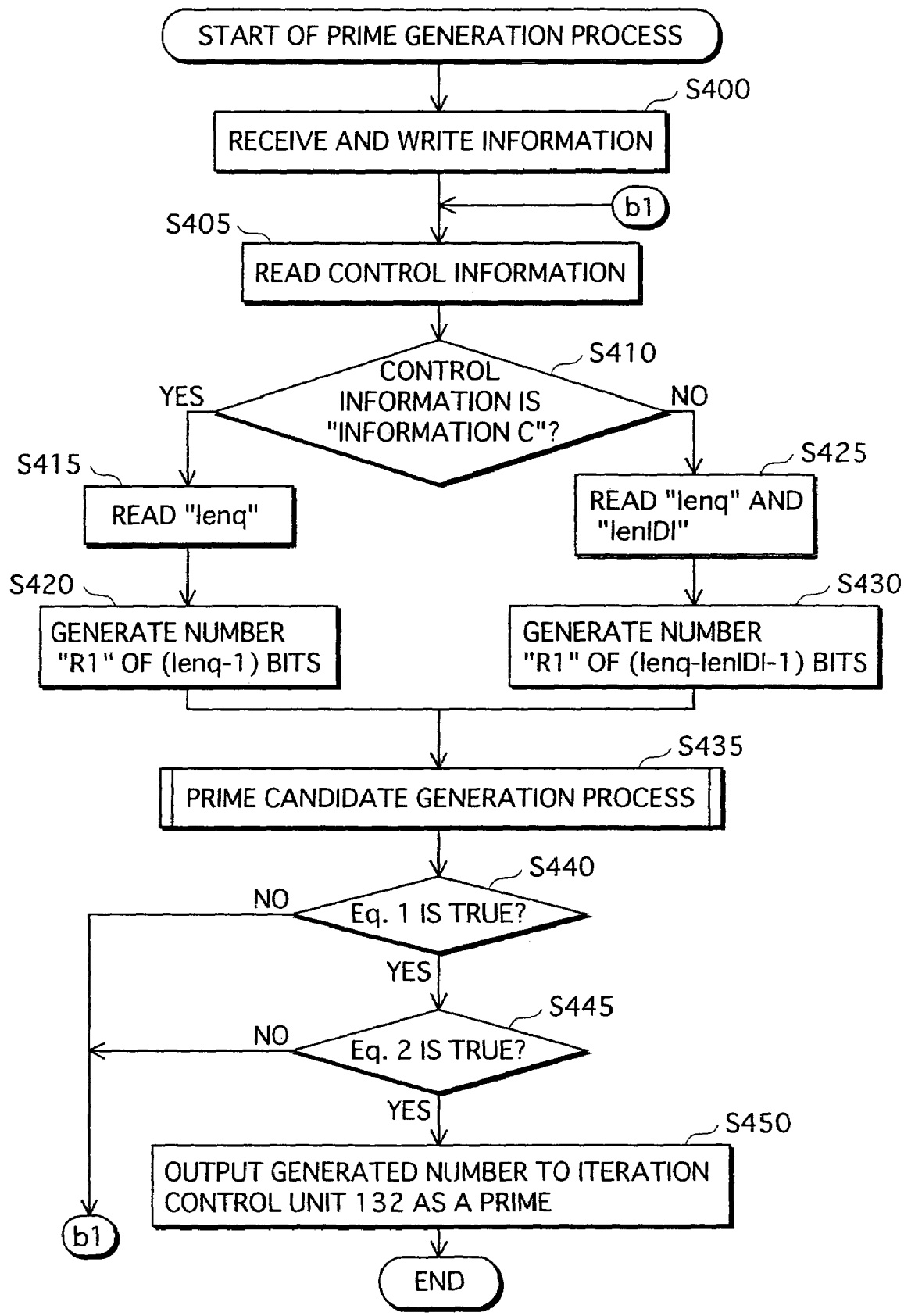
FIG. 15 is a flow diagram illustrating operation of a prime generation process.

Here is described the operation of the prime generation process shown in FIG. 12, using a flow diagram illustrated in FIG. 15.

Receiving, from the iteration control unit 132, either one of the 1st information—made of the prime "q", the bit size of the prime "lenq", and the control information—and the 2nd information—made of the prime "q", the prime's bit size "lenq", the control information, the issue identifier information "IDI" and the bit size "lenIDI", the information control unit 140 writes the received information to the information storage area, and outputs a 1st generation direction indicating random number generation to the random number generation unit 141 (Step S400).

Receiving the 1st generation direction indicating random number generation from the information control unit 140, the random number generation unit 141 reads control information stored in the information storage area of the information control unit 140 (Step S405), and judges whether the read control information is "Information C" (Step S410).

When determining that it is "Information C" ("YES" in Step S410), the random number generation unit 141 reads "lenq" stored in the information storage area of the information control unit 140 (Step S415), generates a random number "R1" of (lenq−1) bits, and outputs the generated random number "R1" and the read control information to the prime candidate generation unit 142 (Step S420). Here, the first bit of the random number "R1" is 1. The method for generating random numbers is described in detail in Non-patent Reference 2.

When determining that it is not "Information C" ("NO" in Step S410), the random number generation unit 141 reads "lenq" and "lenIDI" stored in the information storage area of the information control unit 140 (Step S425). Then, the random number generation unit 141 generates a random number "R1" of (lenq−lenIDI−1) bits, and outputs the generated random number "R1" and the read control information to the prime candidate generation unit 142 (Step S430). Here, the first bit of the random number "R1" is 1.

The prime candidate generation unit 142 generates the random number "R" and the number "N" of a prime candidate in the prime candidate generation process, stores the generated random number "R" in the generated information storage area, and outputs the generated number "N" to the 1st primality testing unit 143 (Step S435).

Receiving the number "N" from the prime candidate generation unit 142, the 1st primality testing unit 143 judges, using the received number "N", whether the above-mentioned equation (Eq. 1) is true (Step S440).

When determining that Eq. 1 is true, the 1st primality testing unit 143 outputs the number "N" to the 2nd primality testing unit 144 ("YES" in Step S440). Receiving the number "N" from the 1st primality testing unit 143, the 2nd primality testing unit 144 reads the number "R" stored in the generated information storage area of the prime candidate generation unit 142, and judges whether the above-mentioned equation Eq. 2 is true (Step S445).

When determining that Eq. 2 is true ("YES" in Step S445), the 2nd primality testing unit 144 takes the number "N" as a prime "N", and outputs the prime "N" to the iteration control unit 132 via the information control unit 140 (Step S450).

When determining that Eq. 1 is false, the 1st primality testing unit 143 outputs a 2nd generation direction to the random number generation unit 141 ("NO" in Step S440). When determining that Eq. 2 is false, the 2nd primality testing unit 144 outputs a 2nd generation direction to the random number generation unit 141 ("NO" in Step S445). Then, the random number generation unit 141 receives the 2nd generation direction to generate a random number again from either the 1st primality testing unit 143 or the 2nd primality testing unit 144, and the process returns to Step S405.

1.5.5 Prime Candidate Generation Process

Figure 16:
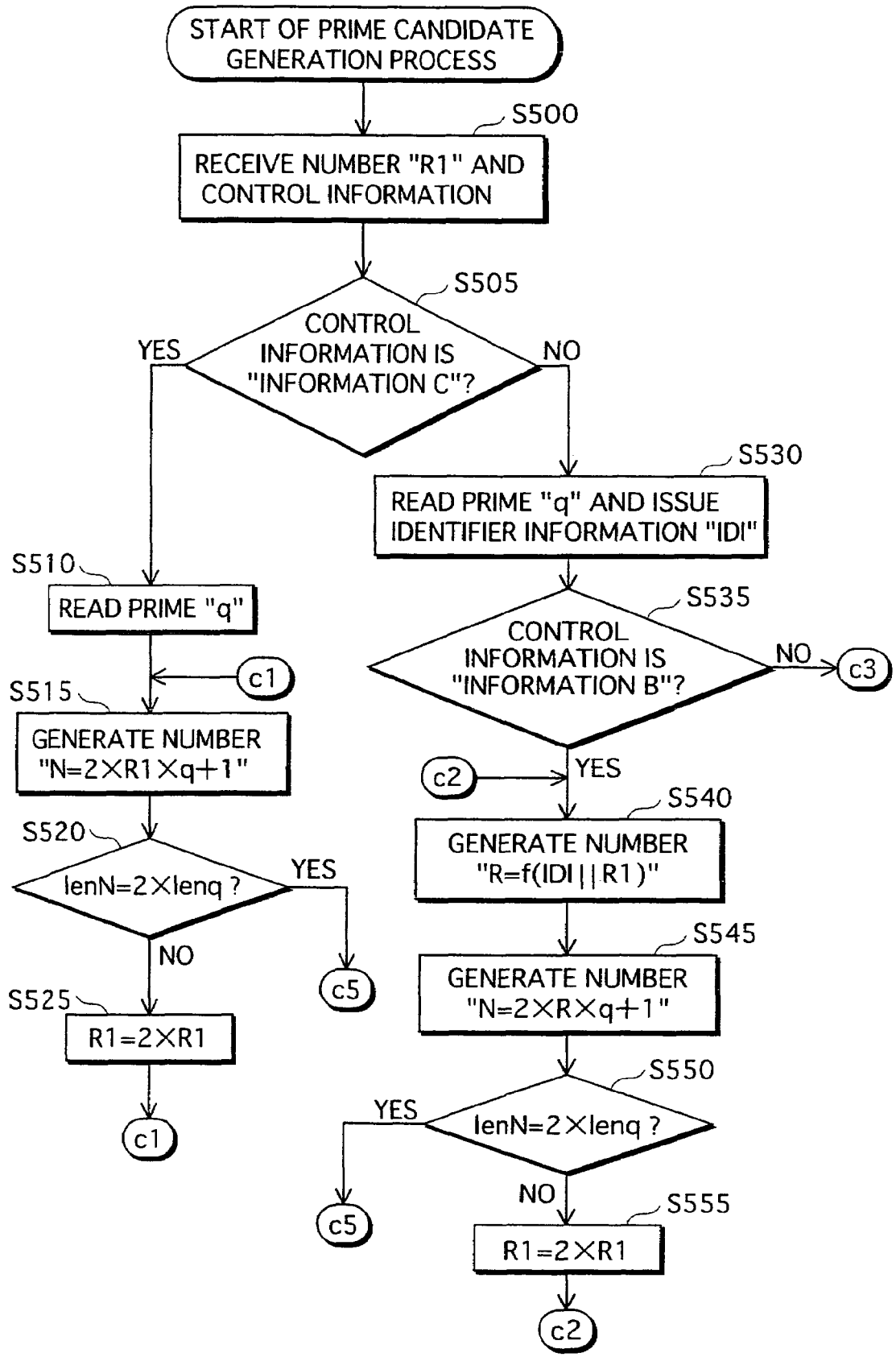
FIG. 16 is a flow diagram illustrating operation of a prime candidate generation process (continuing to FIG. 17)
Figure 17:
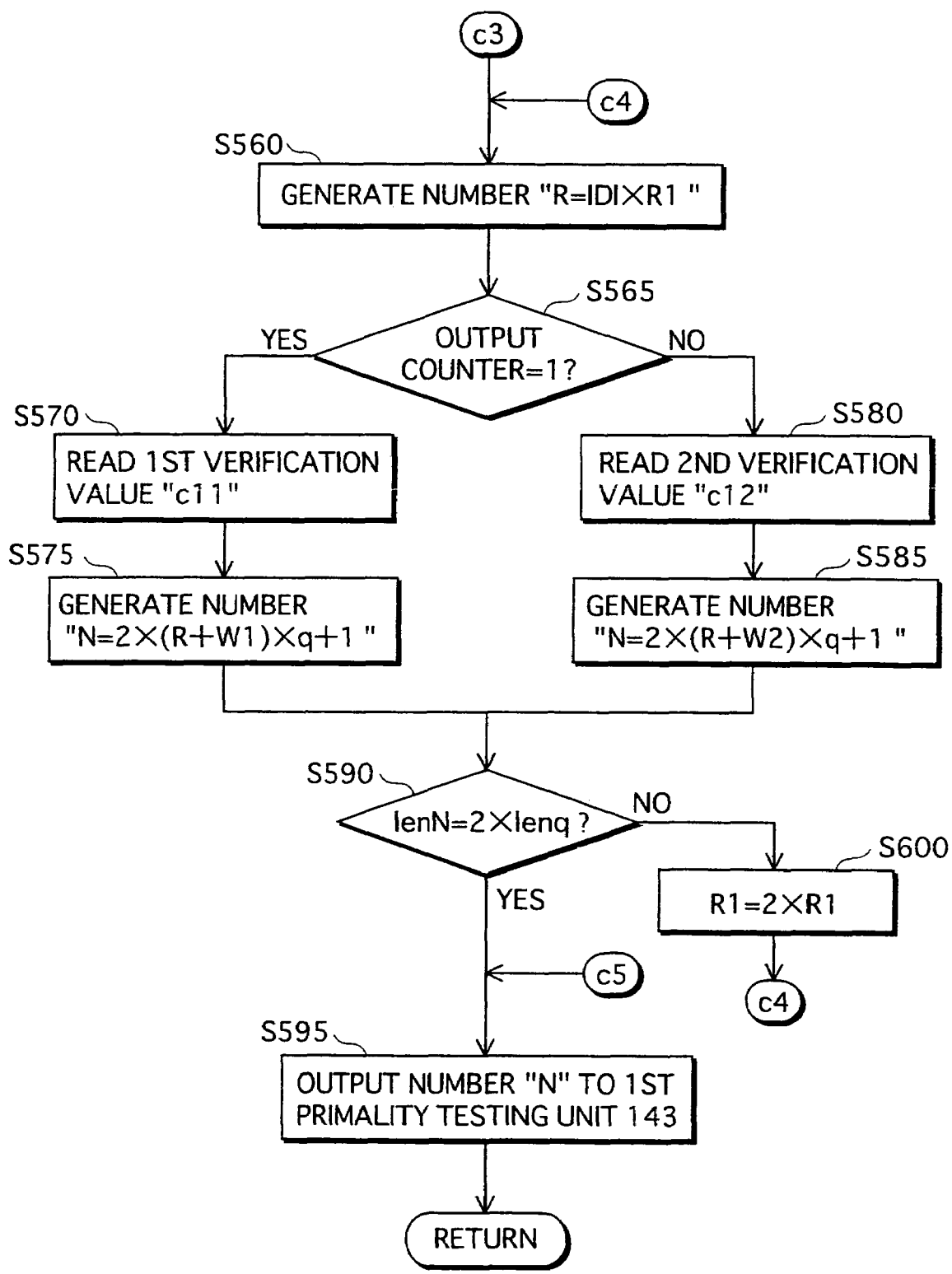
FIG. 17 is a flow diagram illustrating operation of the prime candidate generation process (continued from FIG. 16)

Here is described the operation of the prime candidate generation process shown in FIG. 15, using flow diagrams illustrated in FIGS. 16 and 17.

Receiving the random number "R1" and control information from the random number generation unit 141 (Step S500), the prime candidate generation unit 142 judges whether the received control information is "Information C" (Step S505).

When determining that it is "information C" ("YES" in Step S505), the prime candidate generation unit 142 reads the prime "q" from the information storage area of the information control unit 140 (Step S510). The prime candidate generation unit 142 generates a number "N=2×R1×q+1", using the read prime "q" and the random number "R1" received from the random number generation unit 141 (Step S515). The prime candidate generation unit 142 judges whether a bit size "lenN" of the generated number "N" matches "2×lenq" (Step S520). When determining that they match each other ("YES" in Step S520), the prime candidate generation unit 142 outputs the generated number "N" to the 1st primality testing unit 143, and stores, in the generated information storage area, the received random number "R1" as "R" (Step S595).

When determining that they do not match each other ("NO" in Step S520), the prime candidate generation unit 142 multiplies the random number "R1" received from the random number generation unit 141 by 2, and makes the result "R1" (Step S525), and then the process returns to Step S515.

When determining that the control information is not "Information C" ("NO" in Step S505), the prime candidate generation unit 142 reads the prime "q" and the issue identifier information "IDI" from the information storage area of the information control unit 140 (Step S530). The prime candidate generation unit 142 judges whether the control information is "Information B" (Step S535).

When determining that it is "Information B" ("YES" in Step S535), the prime candidate generation unit 142 generates a join value "IDI∥R1" from the received random number "R1" and the read issue identifier information "IDI", and then generates a number "R=f(IDI∥R1)" using the generated join value "IDI∥R1" and the function "f" stored in the function storage area (Step S540). The prime candidate generation unit 142 generates the number "N=2×R×q+1", using the generated number "R" and the read prime "q" (Step S545).

The prime candidate generation unit 142 judges whether a bit size "lenN" of the generated number "N" is "2×lenq" (Step S550).

When determining that it is "2×lenq" ("YES" in Step S535), the prime candidate generation unit 142 outputs the generated number "N" to the 1st primality testing unit 143, and stores the generated number "R" to the generated information storage area (Step S595).

When determining that it is not "2×lenq" ("NO" in Step S550), the prime candidate generation unit 142 multiplies the random number "R1" received from the random number generation unit 141 by 2, and makes the result "R1" (Step S555), and the process then returns to Step S540.

When it is determined that the control information is not "Information B" ("NO" in Step S535), the prime candidate generation unit 142 generates the number "R=IDI×R1" using the received random number "R1" and the read issue identifier information "IDI" (Step S560). The prime candidate generation unit 142 outputs a number read-out order to the information control unit 140, and receives the number of the output counter 136 from the information control unit 140. The prime candidate generation unit 142 judges whether the value of the output counter 136 is "1" (Step S565).

When determining that the number of outputs is "1" ("YES" in Step S565), the prime candidate generation unit 142 reads the 1st verification value "c11" from the verification-value storage area of the information control unit 140 (Step S570). The prime candidate generation unit 142 generates a number "N=2×(R+w1)×q+1" using the read prime "q", the issue identifier information "IDI", the verification value "c11" and the generated number "R" (Step S575). Here, "w1" is a number satisfying "2×w1×q+2=c11 mod IDI, 0≦w1<IDI".

When determining that the number of outputs not is "1"— that is, "two" or more ("NO" in Step S565), the prime candidate generation unit 142 reads the 2nd verification value "c12" from the verification-value storage area of the information control unit 140 (Step S580). The prime candidate generation unit 142 generates a number "N=2×(R+w2)×q+1" using the read prime "q", the issue identifier information "IDI", the verification value "c12" and the generated number "R" (Step S585). Here, "w2" is a number satisfying "2×w2×q+1=c12 mod IDI, 0≦w2<IDI".

The prime candidate generation unit 142 reads the bit size "lenq" of the prime "q" from the information storage area of the information control unit 140, and judges whether the bit size of the generated number "N" is "2×lenq" (Step S590).

When determining that it is "2×lenq" ("YES" in Step S590), the prime candidate generation unit 142 outputs the generated number "N" to the 1st primality testing unit 143, and stores the generated number "R" in the generated information storage area (Step S595).

When determining that it is not "2×lenq" ("NO" in Step S590), the prime candidate generation unit 142 multiplies the random number "R1" received from the random number generation unit 141 by 2, makes the result "R1" (Step S600), and the process then returns to Step S560.

1.5.6 Certificate Issuing Process

Figure 18:
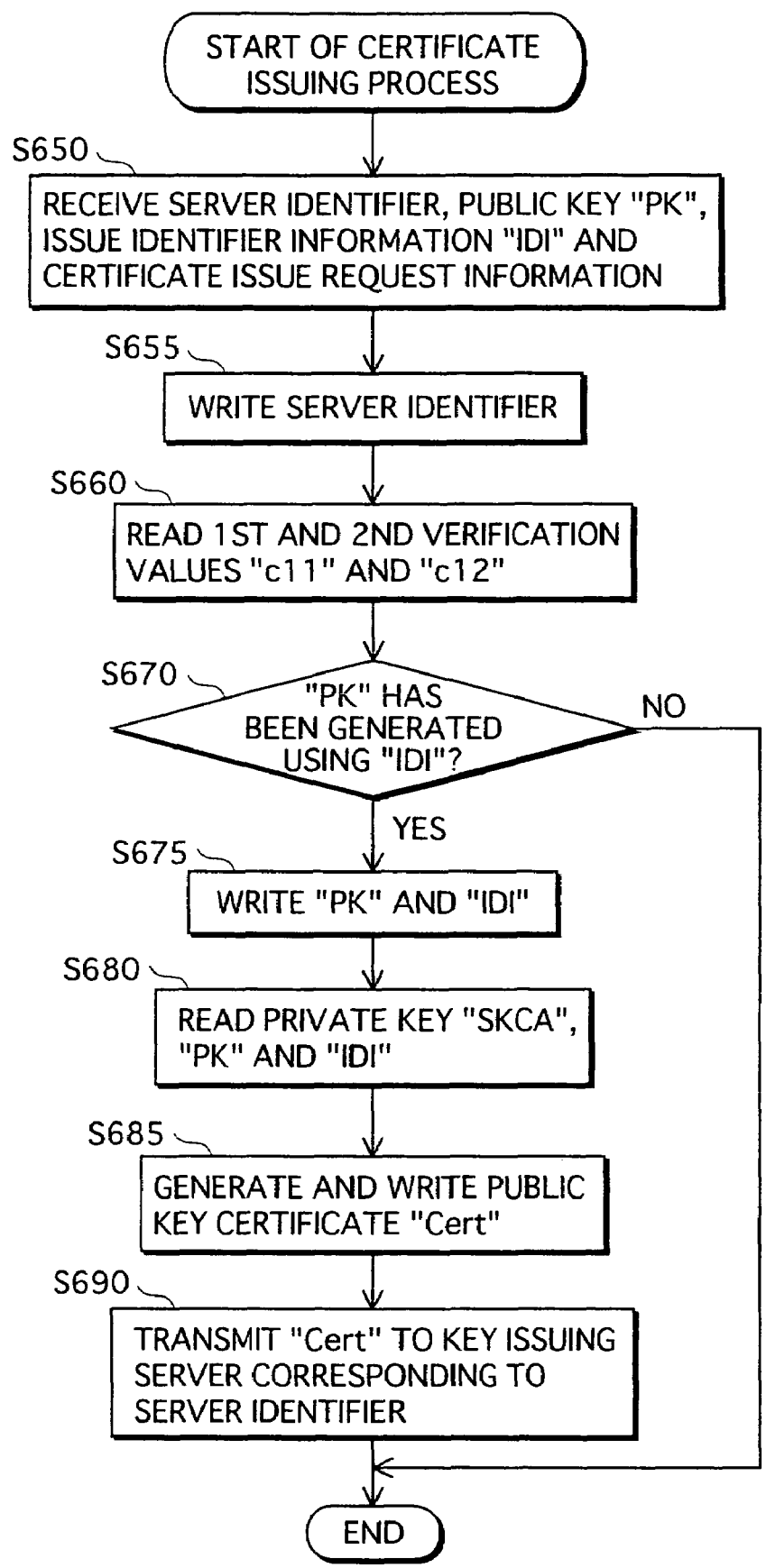
FIG. 18 is a flow diagram illustrating operation of a certificate issuing process in the key issuing system 1.

Here is described the operation of the certificate issuing process shown in FIG. 9, using a flow diagram illustrated in FIG. 18.

The issue public key determination unit 214 of the certificate issuing server 200 receives, from the key issuing server 100 via the reception unit 217, the issue identifier information "IDI", the public key "PK", the server identifier and the certificate issue request information (Step S650).

The issue public key determination unit 214 writes the received server identifier to the server information storage area 220 (Step S655).

The issue public key determination unit 214 reads corresponding 1st and 2nd verification values "c11" and "c12" by using the received server identifier (Step S660).

The issue public key determination unit 214 determines whether the public key "PK" has been generated using the issue identifier information "IDI" by using the read 1st verification value "c11" and 2nd verification value "c12", the received public key "PK", and the issue identifier information "IDI" (Step S660).

When "n−(c11×c12)" is divisible by "IDI"—i.e. when judging that the public key "PK" has been generated using the issue identifier information "IDI" ("YES" in Step S660), the issue public key determination unit 214 separately writes the received public key "PK" to the issue public key repository 211 and the issue identifier information to the issue identifier information repository 212, and outputs, to the public key certificate generation unit 215, an order to start generating a public key certificate (Step S665).

The issue public key determination unit 214 terminates the process when determining that the public key "PK" has not been generated using the issue identifier information "IDI" ("NO" in Step S660).

Receiving the order to start generating a public key certificate from the issue public key determination unit 214, the public key certificate generation unit 215 separately reads the private key "SKCA" from the private key repository 210, the public key "PK" from the issue public key repository 211, and the issue identifier information "IDI" from the issue identifier information repository 212 (Step S670).

The public key certificate generation unit 215 generates the public key certificate "Cert" using the read private key "SKCA", public key "PK" and issue identifier information "IDI", writes the generated public key certificate "Cert" to the public key certificate repository 213, and outputs, to the certificate acquisition unit 216, an order to start transmitting the public key certificate "Cert" (Step S675).

Receiving the order to start transmitting the public key certificate "Cert" from the public key certificate generation unit 215, the certificate acquisition unit 216 separately reads the public key certificate "Cert" from the public key certificate repository 213 and the server identifier from the server information storage area 220, and transmits the read public key certificate "Cert" to the key issuing server 100 corresponding to the read server identifier via the transmission unit 218 (Step S680).

1.6 Examination of Operation of Prime Information Generation Unit 133

The 1st and 2nd primality testing units 143 and 144 of the prime information generation unit 133 apply Pocklington's Theorem. Pocklington's Theorem is described in detail in Non-patent Reference 1 (p. 144) and Non-patent Reference 4. The following is a brief explanation of the theorem.

According to Pocklington's Theorem, when "q" of "N=2×R×q+1" is a prime and both:

$$2^{(N-1)} = 1 \bmod N; \text{ and}$$

$$2^{(2R)} \neq 1 \bmod N$$

are true, the number "N" is a prime. And, the prime information generation unit 133 can output the number "N" as a prime.

In addition, since the bit size of the random number "R1" is (lenq−lenIDI−1), the bit size of the number "R" becomes (lenq−1) and the bit size of the number "N", in most instances, becomes (2×lenq). Here, depending on the values of the prime "q", the issue identifier information "IDI", and the like, the bit size may be (2×lenq−1). In this case, the prime candidate generation unit 142 can set the bit size of the number "N" to be generated to (2×lenq) by multiplying R1 by 2 and newly taking the result as R1, as described above.

1.7 Advantageous Effect of 1st Embodiment

1.7.1 Uniqueness of Generated Key

Here is described the uniqueness of a key generated by the key issuing server 100—i.e. the uniqueness of a prime.

The following proposition is here to be proved.

Proposition: When the issue identifier information IDI is different, the output prime "N" is different.

First, the following lemma is going to be proved, and then the above proposition will be proved using the lemma.

Lemma: If p1=p2, where p1 and p2 are primes with "p1=2×q1×R1+1" and "p2=2×q2×R2+1", q1=q2 and R1=R2.

Proof: When p1=p2, the bit sizes of the primes "q1" and "q2" are respectively 256 bits while the bit sizes of the numbers "R1" and "R2" are respectively 255 bits. Therefore, it is obvious that q1=q2. In addition, since q1=q2, the equality of R1=R2 is also met (which was to be proven).

According to the above lemma, if p1=p2, R1=R2 is met. When R1=f(IDI1∥R11) and R2=f(IDI2∥R22), IDI1=IDI2 is met since R1=R2 and f is an injection. Accordingly, by obtaining the contraposition, the above proposition is met. Herewith, a different IDI always yields a different prime. Accordingly, by providing a different IDI for the key issuing server 100 each time, a different prime can be generated every time. Thereby, the uniqueness of the generated prime is maintained.

Accordingly, it can be proved, without the need for comparison, that primes generated multiple times do not conform to each other.

1.7.2 Validity of Generated Key

With the prime "p1" generated by the key issuing server 100, "p1−c11" is always divisible by the issue identifier information "IDI".

This is because "p1−c11=2×q×(R+w1)+1−c11=2×q×(IDI×R1+w1)+1−c11=2×q×IDI×R1+2×q×w1+1−c11", and it can be seen that the term "2×q×IDI×R1" is divisible by "IDI". In addition, since "2×q×w1+1=c11 mod IDI" has been met, as described above, the remaining term "2×q×w1+1−c11" is also divisible by "IDI". That is, with the prime "p1" generated by the key issuing server 100, "p1−c11" is always divisible by the issue identifier information "IDI". Therefore, whether the prime "p1" is generated using the key issuing server 100 can be determined by examining "p1−c11" being divisible by the issue identifier information "IDI".

In addition, for the same reason, with the prime "p2", "p2−c12" is always divisible by the issue identifier information "IDI".

Accordingly, since "n−c11×c12" is divisible by "IDI", the certificate issuing server 200 can determine whether the primes "p1" and "p2" have been properly generated using the issue identifier information "IDI" by examining "n−c11×c12" being divisible by "IDI".

This is because, the primes "p1" and "p2", which are private keys, satisfy the following with the primes "q1" and "q2", the random numbers "R11" and "R12", and the issue identifier information "IDI" "p1=2×q1×(IDI×R11+w1)+1=c11 mod IDI" and "p2=2×q2×(IDI×R12+w1)+1=c12 mod IDI". Therefore, the following equalities are obtained:

$$n = p1 \times p2$$
$$= (2 \times q1 \times IDI \times R11 + 1) \times (2 \times q2 \times IDI \times R12 + 1)$$
$$= c11 \times c12 \bmod IDI.$$

Accordingly, the certificate issuing server 200 is capable of determining whether the key issuing server has properly generated the primes "p1" and "p2" using the issue identifier information IDI by examining "n−c11×c12" being divisible by "IDI".

Note that, since the bit size of "IDI" is "lenIDI" and the bit size of "R1" is (lenq−lenIDI−1), the bit size of "N1=2×q×(IDI×R1+w)+1" becomes 2×lenq1 in most instances. Here, depending the values of "q1", "IDI", and the like, the bit size may be (2×lenq−1). In this case, the prime candidate generation unit 142 can set the bit size of the number "N1" to "2×lenq1" by multiplying "R1" by 2 and newly taking the result as "R1".

Furthermore, when a terminal commits misconduct using private keys that the terminal has, the key issuing system 1 can obtain information of the terminal having committed misconduct from the private keys in the following determination method. Assume that private keys "p1" and "p2" are identified as those of a terminal having committed misconduct, and that a tracker of the misconduct—for example, a manager of the certificate issuing server 200—has a correspondence table between issue identifier information and terminals. Both "p1−c11" and "p2−c12" are divisible by the issue identifier information "IDI". Therefore, GCD(p1−c11, p2−c12) is divisible by the issue identifier information "IDI". Accordingly, by investigating the prime factor of GCD(p1−c11, p2−c12), the tracker can limit and determine possible issue identifier information, which assists in obtaining the issue identifier information—i.e. identifying the terminal.

1.8 Modified Example 1 of Prime Generation

Although the above embodiment uses two verification values—the 1st and 2nd verification values, here is described prime generation in which only one verification value is used.

Modified Example 1 differs from the above embodiment in the prime information generation unit in the key issuing server and the issue public key determination unit in the certificate issuing server. The following describes a prime information generation unit 133A and an issue public key determination unit 214A of this modified example. Note that, with respect to other structural components, the same components shown in the first embodiment are used.

1.8.1 Prime Information Generation Unit 133A

Figure 19:
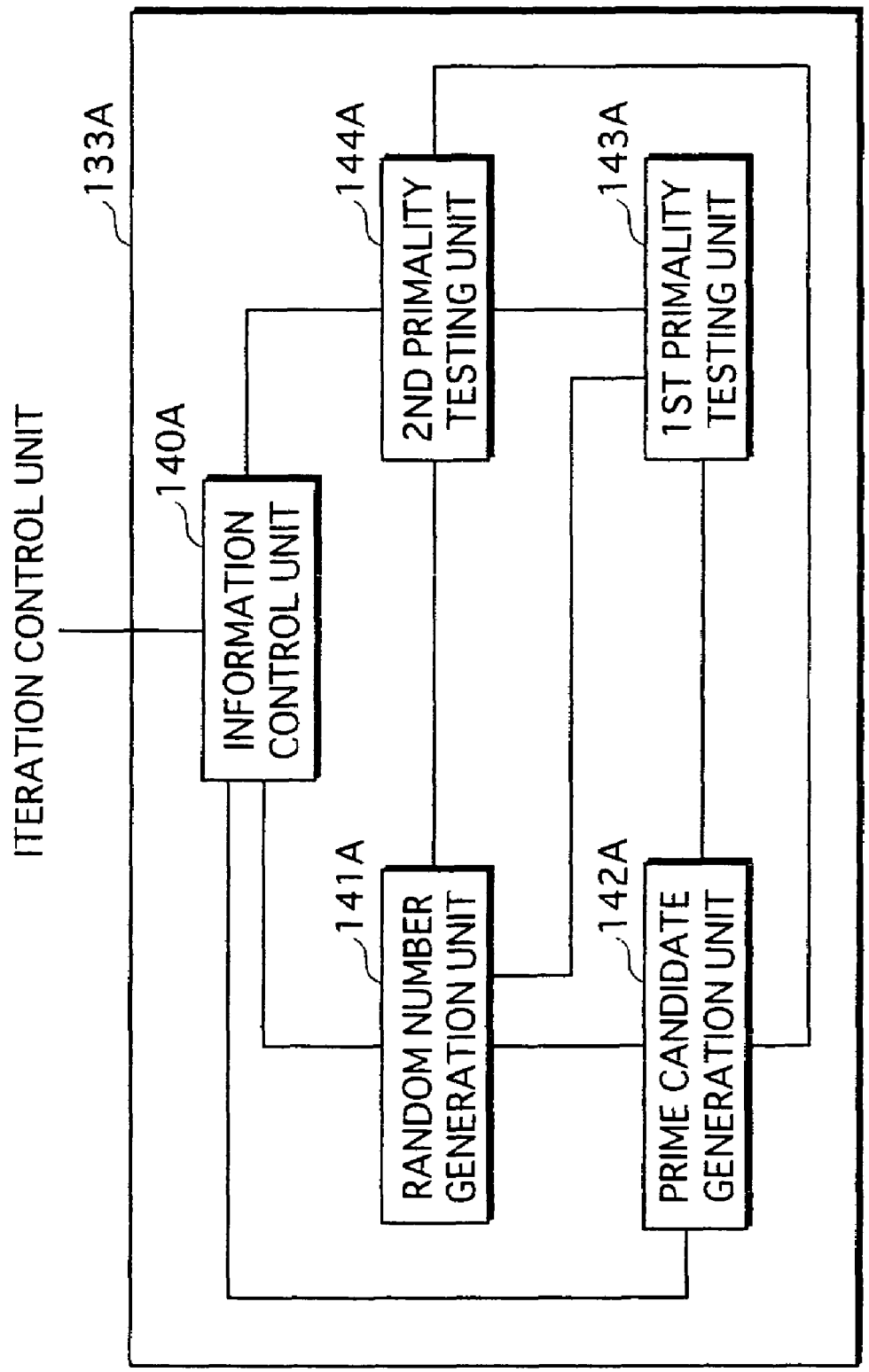
FIG. 19 is a block diagram illustrating a configuration of a prime information generation unit 133A.

The prime information generation unit 133A, as shown in FIG. 19, comprises: an information control unit 140A; a random number generation unit 141A; a prime candidate generation unit 142A; a 1st primality testing unit 143A; and a 2nd primality testing unit 144A.

The prime information generation unit 133A generates a prime whose bit size is twice as large as that of a prime received from the iteration control unit 132.

Note that the following describes each structural component, assuming that the prime received from the iteration control unit 132 is "q" and the bit size is "lenq".

1.8.1.1 Information Control Unit 140A

The information control unit 140A has an information storage area to store 1st and 2nd information.

The information control unit 140A has a verification-value storage area that stores in advance a verification value "c1" which is assigned by the certificate issuing server 200 and used when a prime is generated based on the control information "Information A".

Receiving, from the iteration control unit 132, the 1st information made up of the prime "q", the prime's bit size "lenq", and the control information, the information control unit 140A writes the received 1st information to the information storage area. That is, the information control unit 140A writes the prime "q", the prime's bit size "lenq", and the control information (in this case "Information C").

Receiving, from the iteration control unit 132, the 2nd information made up of the prime "q", the prime's bit size "lenq", the control information, the issue identifier information "IDI" and the bit size "lenIDI", the information control unit 140A writes the received 2nd information to the information storage area. That is, the information control unit 140 writes the prime "q", the prime's bit size "lenq", the control information, the issue identifier information "IDI" and the bit size "lenIDI".

After writing the received information, the information control unit 140A outputs a 1st generation direction indicating a direction of random number generation to a random number generation unit 141A.

Receiving a prime from the 2nd primality testing unit 144A, the information control unit 140A outputs the received prime to the iteration control unit 132.

1.8.1.2 Random Number Generation Unit 141A

Since the random number generation unit 141A is the same as the random number generation unit 141 of the first embodiment, the description is left out here.

8.1.3 Prime Candidate Generation Unit 142A

The prime candidate generation unit 142A has: a generated information storage area to store generated information; and a function storage area that stores in advance a function "f" which is an injection. Here, the function "f" is, for example, $f(X\|Y)=Enc(K, X\|Y)$. $Enc(K, X\|Y)$ is an encrypted text obtained by encrypting $(X\|Y)$ by a common key encryption method using a key K. An encryption function of a common key encryption method is generally a bisection. In addition, the symbol "$\|$" is a bit join or byte join. An example of the encryption function "$Enc(K, X\|Y)$ is "$Enc(K, X\|Y)=K\ XOR\ X\|Y$". Note that an example of the common key encryption method is DES, and when DES is employed, the key length is 128 bits.

Receiving the random number "R1" and control information from the random number generation unit 141A, the prime candidate generation unit 142A judges whether the received control information is "Information C".

When determining that it is "Information C", the prime candidate generation unit 142A reads the prime "q" from the information storage area of the information control unit 140A. The prime candidate generation unit 142A generates a number "$N=2\times R1\times q+1$", using the read prime "q" and the random number "R1" received from the random number generation unit 141A. The number "N" generated at this point becomes a prime candidate. The prime candidate generation unit 142A judges whether a bit size "lenN" of the generated number "N" matches "$2\times lenq$". When determining that they match each other, the prime candidate generation unit 142A outputs the generated number "N" to the 1st primality testing unit 143A, and stores, in the generated information storage area, the received random number "R1" as "R".

When determining that they do not match each other, the prime candidate generation unit 142A multiplies the random number "R1" received from the random number generation unit 141A by 2, makes the result "R1", and then generates the number "$N=2\times R1\times q+1$" by conducting the above operation once again.

When determining that the control information is not "Information C", the prime candidate generation unit 142A reads the prime "q" and the issue identifier information "IDI" from the information storage area of the information control unit 140A. The prime candidate generation unit 142A judges whether the control information is "Information B".

When determining that it is "Information B", the prime candidate generation unit 142A generates a number "$R=f(IDI\|R1)$" using the received random number "R1", the read issue identifier information "IDI", and the function "f" stored in the function storage area. The prime candidate generation unit 142A generates the number "$N=2\times R1\times q+1$" using the generated number "R" and the read prime "q".

The prime candidate generation unit 142A judges whether a bit size "lenN" of the generated number "N" is "$2\times lenq$".

When determining that it is "$2\times lenq$", the prime candidate generation unit 142A outputs the generated number "N" to the 1st primality testing unit 143A, and stores the generated number "R" to the generated information storage area.

When determining that it is not "$2\times lenq$", the prime candidate generation unit 142A multiplies the random number "R1" received from the random number generation unit 141A by 2, makes the result "R1", and generates the numbers "R" and "N" once again.

When it is determined that the control information is not "Information B", the prime candidate generation unit 142A generates the number "$R=IDI\times R1$" using the received random number "R1" and the read issue identifier information "IDI".

The prime candidate generation unit 142A reads the verification value "c1" from the verification-value storage area of the information control unit 140A.

The prime candidate generation unit 142A generates a number "$N=2\times(R+w)\times q+1$" using the read prime "q", the issue identifier information "IDI", the verification value "c1" and the generated number "R".

Here, "w" is a number that satisfies "$2\times w\times q+1=c1\ mod\ IDI, 0\leq w<IDI$". "w" is found by calculating "$w=(c1-1)\times m\ mod\ IDI$". "m" is a number that satisfies "$(2\times q)\times m=1\ mod\ IDI$".

The prime candidate generation unit 142A reads the bit size "lenq" of the prime "q" from the information storage area of the information control unit 140A, and judges whether the bit size of the generated number "N" is "$2\times lenq$".

When determining that it is "$2\times lenq$", the prime candidate generation unit 142A outputs the generated number "N" to the 1st primality testing unit 143A, and stores the generated number "R" in the generated information storage area.

When determining that it is not "2×lenq", the prime candidate generation unit 142A multiplies the random number "R1" received from the random number generation unit 141A by 2, makes the result "R1", and generates the numbers "R" and "N" once again.

8.1.4 1st Primality Testing Unit 143A

Since the 1st primality testing unit 143A is the same as the 1st primality testing unit 143 of the first embodiment, the description is left out here.

1.8.1.5 2nd Primality Testing Unit 144A

Since the 2nd primality testing unit 144A is the same as the 2nd primality testing unit 144 of the first embodiment, the description is left out here.

1.8.2 Issue Public Key Determination Unit 214A

Although not shown in the figure, a server information storage area 220A and a determination information storage area 221A are included in the issue public key determination unit 214A.

The server information storage area 220A has an area to store a server identifier which identifies a key issuing server having made an issue request of the public key certificate.

The determination information storage area 221A, as shown in FIG. 20, has a verification value table T250. The verification value table T250 has an area to store at least one combination made up of a server identifier and a verification value. The server identifier is an identifier that identifies a key issuing server. "SIDA" indicates the key issuing server 100, while "SIDB" and "SIDC" indicating the key issuing servers 101 and 102, respectively. The verification values are values assigned to the key issuing servers indicated by associated server identifiers. Note that the following description is given assuming that the server identifier of the key issuing server 100 is "SID".

The issue public key determination unit 214A receives, from the key issuing server 100 via the reception unit 217, the issue identifier information "IDI", the public key "PK", the server identifier and the certificate issue request information.

The issue public key determination unit 214A writes the received server identifier to the server information storage area 220A.

The issue public key determination unit 214A reads a corresponding verification value "c1" by using the received server identifier.

The issue public key determination unit 214A determines, using the received public key "PK" and issue identifier information "IDI", whether the public key "PK" has been generated by using the issue identifier information "IDI".

Here, the determination method involves an examination of whether "n−(c1)^2" is divisible by "IDI". Herewith, it can be determined that the public key "PK" has been generated using the issue identifier information "IDI".

When "n−(c1)^2" is divisible by "IDI", the issue public key determination unit 214A determines that the public key "PK" has been generated using the issue identifier information "IDI". On the other hand, when "n−(c1)^2" is not divisible by "IDI", the issue public key determination unit 214 determines that the public key "PK" has not been generated using the issue identifier information "IDI".

When determining that the public key "PK" has been generated using the issue identifier information "IDI", the issue public key determination unit 214A writes the received public key "PK" to the issue public key repository 211 while writing the issue identifier information to the issue identifier information repository 212. The issue public key determination unit 214A outputs, to the public key certificate generation unit 215, an order to start generating a public key certificate.

The issue public key determination unit 214A terminates the process when determining that the public key "PK" has not been generated using the issue identifier information "IDI".

1.8.3 Prime Candidate Generation Process

As to the prime candidate generation process according to the present modified example, only differences from the prime candidate generation process shown in the first embodiment are explained here. Note that, since the operational flows of the key issuing process and the prime generation process are the same as those in the first embodiment, the descriptions are left out here.

After executing Steps S500 to S560 shown in FIGS. 16 and 17, the prime candidate generation unit 142A omits Step S565 and reads the verification value "c1" in Step S570. In Step S575, the prime candidate generation unit 142A generates the number "N=2×(R+w)×q+1". That is, while Steps S565, 580 and 585 are omitted, Steps S570 and S575 are modified as above.

The following is the same as the first embodiment, and therefore the description is left out. Namely, the prime candidate generation process according to the present modified example generates the number "N" using the verification value "c1", the prime "q", and the number "R", independent of the value of the output counter.

1.8.4. Certificate Issuing Process

As to the certificate issuing process according to the present modified example, only differences from the certificate issuing process shown in the first embodiment are explained here.

In Step S660, the issue public key determination unit 214A reads a verification value (for example, "c1") corresponding to the received server identifier. Then, in Step S670, by using the read verification value "c1", the public key "PK" and the issue identifier information "IDI", the issue public key determination unit 214A determines whether "PK" has been generated using "IDI".

1.9 Modified Example 2 of Prime Generation

Although the above embodiment uses two verification values—the 1st and 2nd verification values, here is described prime generation in which only one verification value is used and the verification value is a fixed value of "1".

Modified Example 2 differs from the above embodiment in the prime information generation unit in the key issuing server and the issue public key determination unit in the certificate issuing server. The following describes a prime information generation unit 133B and an issue public key determination unit 214B of this modified example. Note that, with respect to other structural components, the same components shown in the first embodiment are used.

1.9.1 Prime Information Generation Unit 133B

Figure 21:
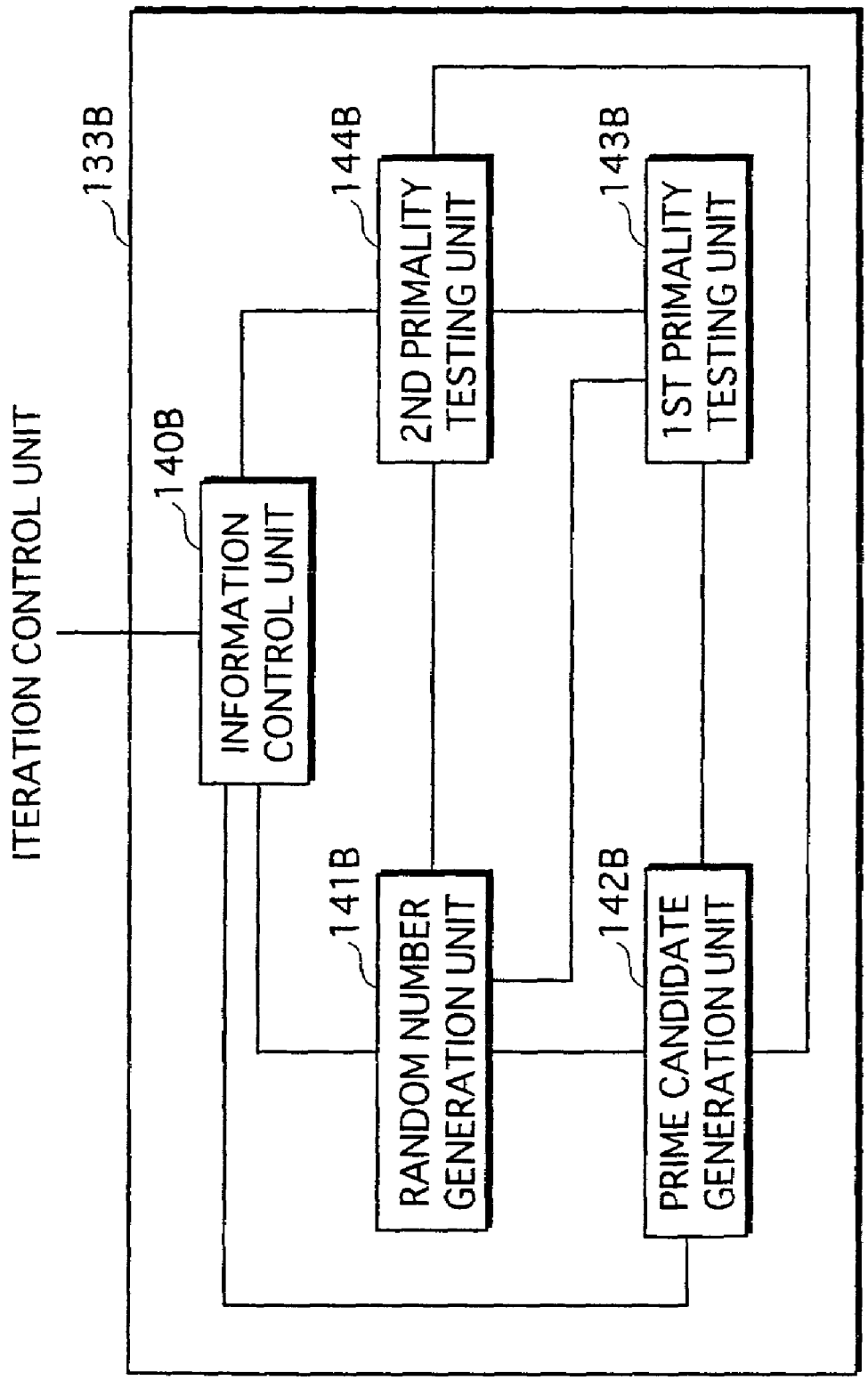
FIG. 21 is a block diagram illustrating a configuration of a prime information generation unit 133B.

The prime information generation unit 133B, as shown in FIG. 21, comprises: an information control unit 140B; a random number generation unit 141B; a prime candidate generation unit 142B; a 1st primality testing unit 143B; and a 2nd primality testing unit 144B.

The prime information generation unit 133B generates a prime whose bit size is twice as large as that of a prime received from the iteration control unit 132.

Note that the following describes each structural component, assuming that the prime received from the iteration control unit 132 is "q" and the bit size is "lenq".

1.9.1.1 Information Control Unit 140B

The information control unit 140B has an information storage area to store 1st and 2nd information.

The information control unit 140B has a verification-value storage area that stores in advance a verification value "1" which is used when a prime is generated based on the control information "Information A".

Receiving, from the iteration control unit 132, the 1st information made up of the prime "q", the prime's bit size "lenq", and the control information, the information control unit 140B writes the received 1st information to the information storage area. That is, the information control unit 140B writes the prime "q", the prime's bit size "lenq", and the control information (in this case "Information C").

Receiving, from the iteration control unit 132, the 2nd information made up of the prime "q", the prime's bit size "lenq", the control information, the issue identifier information "IDI" and the bit size "lenIDI", the information control unit 140B writes the received 2nd information to the information storage area. That is, That is, the information control unit 140B writes the prime "q", the prime's bit size "lenq", the control information, the issue identifier information "IDI" and the bit size "lenIDI".

After writing the received information, the information control unit 140B outputs a 1st generation direction indicating a direction of random number generation to a random number generation unit 141B.

Receiving a prime from the 2nd primality testing unit 144B, the information control unit 140B outputs the received prime to the iteration control unit 132.

1.9.1.2 Random Number Generation Unit 141B

Since the random number generation unit 141B is the same as the random number generation unit 141 of the first embodiment, the description is left out here.

1.9.1.3 Prime Candidate Generation Unit 142B

The prime candidate generation unit 142B has: a generated information storage area to store generated information; and a function storage area that stores in advance a function "f" which is an injection.

Receiving the random number "R1" and control information from the random number generation unit 141B, the prime candidate generation unit 142B judges whether the received control information is "Information C".

When determining that it is "Information C", the prime candidate generation unit 142B reads the prime "q" from the information storage area of the information control unit 140B. The prime candidate generation unit 142B generates a number "N=2×R1×q+1" by using the read prime "q" and the random number "R1" received from the random number generation unit 141B. The number "N" generated at this point becomes a prime candidate. The prime candidate generation unit 142B judges whether a bit size "lenN" of the generated number "N" matches "2×lenq". When determining that they match each other, the prime candidate generation unit 142B outputs the generated number "N" to the 1st primality testing unit 143B, and stores, in the generated information storage area, the received random number "R1" as "R".

When determining that they do not match each other, the prime candidate generation unit 142B multiplies the random number "R1" received from the random number generation unit 141B by 2, makes the result "R1", and then generates the number "N=2×R1×q+1" by conducting the above operation once again.

When determining that the control information is not "Information C", the prime candidate generation unit 142B reads the prime "q" and the issue identifier information "IDI" from the information storage area of the information control unit 140B. The prime candidate generation unit 142B judges whether the control information is "Information B".

When determining that it is "Information B", the prime candidate generation unit 142B generates a number "R=f(IDI∥R1)" using the received random number "R1", the read issue identifier information "IDI", and the function "f" stored in the function storage area. The prime candidate generation unit 142B generates the number "N=2×R1×q+1" using the generated number "R" and the read prime "q".

The prime candidate generation unit 142B judges whether a bit size "lenN" of the generated number "N" is "2×lenq".

When determining that it is "2×lenq", the prime candidate generation unit 142B outputs the generated number "N" to the 1st primality testing unit 143B, and stores the generated number "R" to the generated information storage area.

When determining that it is not "2×lenq", the prime candidate generation unit 142B multiplies the random number "R1" received from the random number generation unit 141B by 2, makes the result "R1", and generates the numbers "R" and "N" once again.

When it is determined that the control information is not "Information B", the prime candidate generation unit 142B generates the number "R=IDI×R1" using the received random number "R1" and the read issue identifier information "IDI".

The prime candidate generation unit 142B reads the verification value "1" from the verification-value storage area of the information control unit 140B.

The prime candidate generation unit 142B generates a number "N=2×R×q+1" using the read prime "q", the issue identifier information "IDI", the verification value "1" and the generated number "R". Here, "1" in the latter term is the verification value.

The prime candidate generation unit 142B reads the bit size "lenq" of the prime "q" from the information storage area of the information control unit 140B, and judges whether the bit size of the generated number "N" is "2×lenq".

When determining that it is "2×lenq", the prime candidate generation unit 142B outputs the generated number "N" to the 1st primality testing unit 143B, and stored the generated number "R" in the generated information storage area.

When determining that it is not "2×lenq", the prime candidate generation unit 142B multiplies the random number "R1" received from the random number generation unit 141B by 2, makes the result "R1", and generates the numbers "R" and "N" once again.

1.9.1.4 1st Primality Testing Unit 143B

Since the 1st primality testing unit 143B is the same as the 1st primality testing unit 143 of the first embodiment, the description is left out.

1.9.1.5 2nd Primality Testing Unit 144B

Since the 2nd primality testing unit 144B is the same as the 2nd primality testing unit 144 of the first embodiment, the description is left out here.

1.9.2 Issue Public Key Determination Unit 214B

Although not shown in the figure, a server information storage area 220B and a determination information storage area 221B are included in the issue public key determination unit 214B.

The server information storage area 220B has an area to store a server identifier which identifies a key issuing server having made an issue request of the public key certificate.

The determination information storage area 221B stores therein the verification value "1", which is a fixed value.

The issue public key determination unit 214B receives, from the key issuing server 100 via the reception unit 217, the issue identifier information "IDI", the public key "PK", the server identifier and the certificate issue request information.

The issue public key determination unit 214B writes the received server identifier to the server information storage area 220B.

The issue public key determination unit 214B reads the verification value "1" from the determination information storage area 221B.

The issue public key determination unit 214B determines, using the received public key "PK" and issue identifier information "IDI", whether the public key "PK" has been generated by using the issue identifier information "IDI".

Here, the determination method involves an examination of whether "n−(the verification value)"—i.e. "n−1"—is divisible by "IDI". Herewith, it can be determined that the public key "PK" has been generated using the issue identifier information, "IDI".

When "n−1" is divisible by "IDI", the issue public key determination unit 214B determines that the public key "PK" has been generated using the issue identifier information "IDI". On the other hand, when "n−1" is not divisible by "IDI", the issue public key determination unit 214 determines that the public key "PK" has not been generated using the issue identifier information "IDI".

When determining that the public key "PK" has been generated using the issue identifier information "IDI", the issue public key determination unit 214B writes the received public key "PK" to the issue public key repository 211 while writing the issue identifier information to the issue identifier information repository 212. The issue public key determination unit 214B outputs, to the public key certificate generation unit 215, an order to start generating a public key certificate.

The issue public key determination unit 214B terminates the process when determining that the public key "PK" has not been generated using the issue identifier information "IDI".

1.9.3 Prime Candidate Generation Process

As to the prime candidate generation process according to the present modified example, only differences from the prime candidate generation process shown in the first embodiment are explained here. Note that, since the operational flows of the key issuing process and the prime generation process are the same as those in the first embodiment, the descriptions are left out here.

After executing Steps S500 to S560 shown in FIGS. 16 and 17, the prime candidate generation unit 142B omits Step S565 and reads the verification value "1" in Step S570. In Step S575, the prime candidate generation unit 142B generates the number "N=2×(R+w)×q+1". That is, while Steps S565, 580 and 585 are omitted, Steps S570 and S575 are modified as above. Note that "1" in the latter term of the equation to obtain the number "N" is the verification value.

The following is the same as the first embodiment, and therefore the description is left out.

Namely, the prime candidate generation process according to the present modified example generates the number "N" using the prime "q" and the number "R", independent of the value of the output counter.

1.9.4 Certificate Issuing Process

As to the certificate issuing process according to the present modified example, only differences from the certificate issuing process shown in the first embodiment are explained here.

In Step S660, the issue public key determination unit 214B reads the verification value "1". Then, in Step S670, by using the read verification value "1", the public key "PK" and the issue identifier information "IDI", the issue public key determination unit 214B examines whether "PK" has been generated from "IDI".

1.9.5 Examination of Determination Method

By the method described above, the certificate issuing server can determine whether the key issuing server has properly generated the primes using the issue identifier information "IDI".

This is because, the primes "p1" and "p2", which are private keys, satisfy the following with the primes "q1" and "q2", the random numbers "R11" and "R12", and the issue identifier information "IDI": "p1=2×q1×IDI×R11+1" and "p2=2×q2×IDI×R12+1". Therefore, the following equalities are obtained:

$$n = p1 \times p2$$
$$= (2 \times q1 \times IDI \times R11 + 1) \times (2 \times q2 \times IDI \times R12 + 1)$$
$$= IDI \times (4 \times q1 \times q2 \times R11 \times R12 \times IDI + 2 \times q1 \times R11 +$$
$$2 \times q2 \times R12) + 1.$$

Accordingly, the certificate issuing server is capable of determining whether the key issuing server has properly generated the primes "p1" and "p2" using the issue identifier information IDI by examining "n−1" being divisible by "IDI".

1.10 Modified Example 3 of Prime Generation

In the above embodiment, when a prime of 256 bits is to be generated, the uniqueness of the prime to be generated is satisfied by applying an injection function; and when a prime of 512 bit is to be generated, an element used to examine the validity of the prime to be generated is added. Here, however, is described a case in which the uniqueness of a prime and the addition of an element used to examine the validity are performed in a single operation.

Modified Example 3 differs from the above embodiment in the prime generation unit in the key issuing server and the issue public key determination unit in the certificate issuing server. The following describes a prime generation unit 116C and an issue public key determination unit 214C of this modified example. Note that, with respect to other structural components, the same components shown in the first embodiment are used. In addition, here, the bit size of the server identifier is set to 15 bits, while the bit sizes of the terminal identifier of the terminal and the issue identifier information being 16 bits and 32 bits, respectively.

1.10.1 Prime Generation Unit 116C

Figure 22:
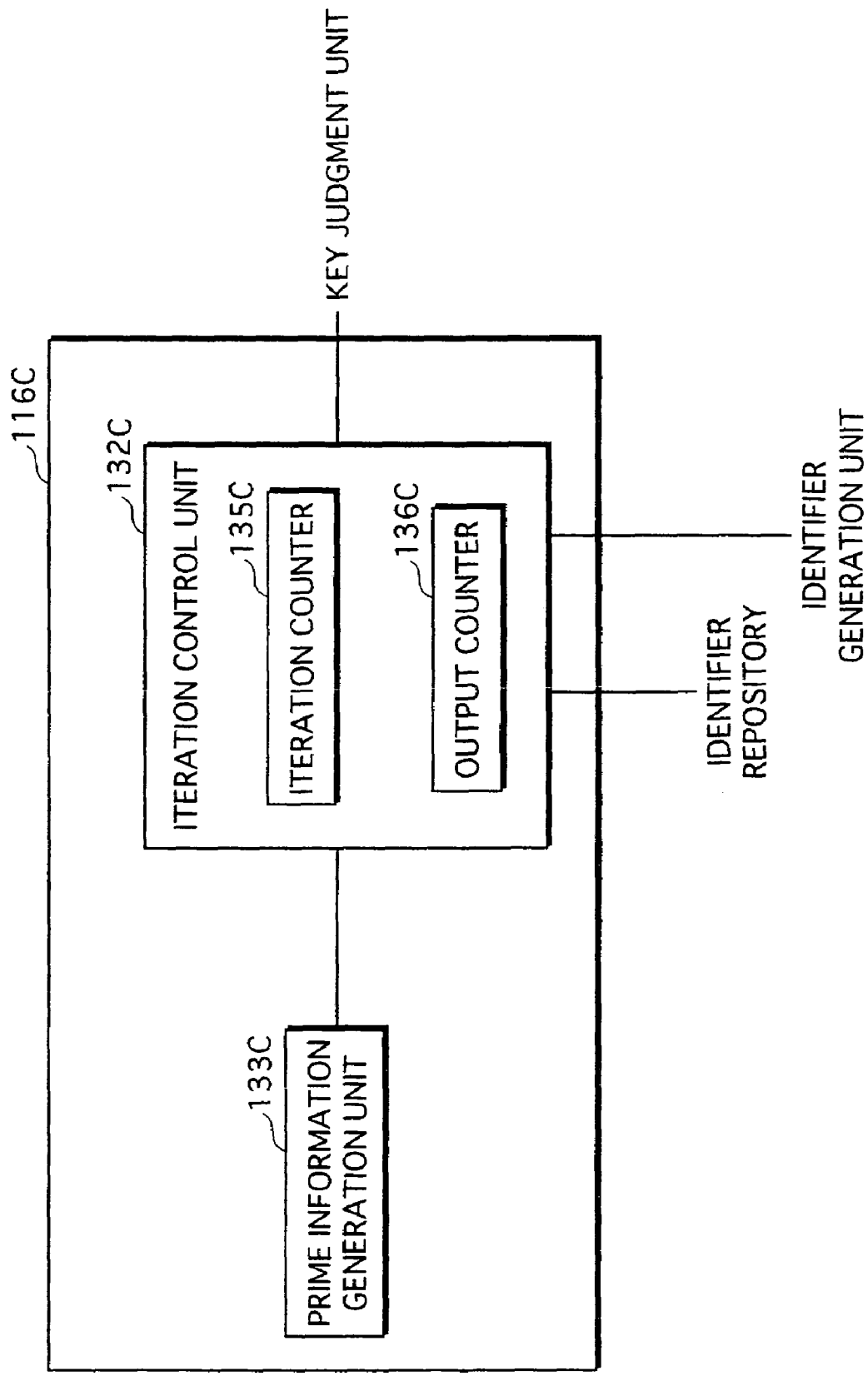
FIG. 22 is a block diagram illustration a structure of a prime generation unit 116C.

The prime generation unit 116C, as shown in FIG. 22, has an iteration control unit 132C and a prime information generation unit 133C.

The prime generation unit 116C generates a 512-bit prime from an 8-bit prime, and outputs the generated 512-bit prime to the key judgment unit 117.

1.10.1.1 Iteration Control Unit 132C

The iteration control unit 132C has an initial value storage area that stores in advance the 8-bit prime and the bit size of the prime (i.e. "8"), and a temporary storage area to temporarily store a prime received from the prime information generation unit 133C.

The iteration control unit 132C has an iteration counter 135C that counts the iteration number of operations of the prime information generation unit 133C, and an output counter 136C that counts the number of primes output to the key judgment unit 117—i.e. the number of times that a generated 512-bit prime has been output. Note that the initial values of the iteration counter 135C and output counter 136C are both "1".

The iteration control unit 132C has a control information table T150 shown in FIG. 23. The control information table T150 stores at least one pair made up of the number of iterations and control information. The number of iterations corresponds to the value of the iteration counter 135C. The control information indicates a type of a generation method used to generate a prime at the prime information generation unit 133C.

Receiving the order to start prime generation from the identifier generation unit 115, the iteration control unit 132C controls the prime information generation unit 133C to generate a prime. Receiving a prime from the prime information generation unit 133C, the iteration control unit 132C either orders again the prime information generation unit 133C to generate a prime or outputs the received prime to the key judgment unit 117, according to the individual values of the iteration counter 135C and output counter 136C.

The operation is described next.

Receiving the order to start prime generation from the identifier generation unit 115, -the iteration control unit 132C sets both the iteration counter 135C and output counter 136C to "1".

Receiving a prime from the prime information generation unit 133C, the iteration control unit 132C adds "1" to the value of the iteration counter 135C, and judges whether the added result is 7 or not.

When determining that the added result is 7, the iteration control unit 132C judges whether the value of the output counter 136C is 1 or not. When determining that it is 1, the iteration control unit 132C outputs the received prime to the key judgment unit 117 as a prime "p1", and adds "1" to the value of the output counter 136C while setting the value of the iteration counter 135C to "1". When determining that it is not 1—i.e. two or more, the iteration control unit 132C makes the received prime a prime "p2", and outputs the prime "p2" and an order to start judgment to the key judgment unit 117.

When determining that the added result is not 7, the iteration control unit 132C calculates the bit size of the received prime, and temporarily stores the received prime and calculated bit size in the temporary storage area.

The iteration control unit 132C performs the following operation whenever (i) after receiving the order to start prime generation and setting the values of both the iteration counter 135C and the output counter 136C to "1", (ii) after temporarily storing a prime received from the prime information generation unit 133C and the bit size of the prime, and (iii) after adding "1" to the value of the output counter 136C and setting the value of the iteration counter 135C to "1".

The iteration control unit 132C judges whether the value of the iteration counter 135C is 1. When determining that it is 1, the iteration control unit 132C reads an 8-bit prime and the bit size of the prime from the initial value storage area. On the other hand, when determining that it is not 1, the iteration control unit 132C reads a bit size "$8 \times (2^{(n-1)})$" and the prime from the temporary storage area. That is, when determining that the value of the iteration counter 135C is not 1, the iteration control unit 132C reads, from the temporary storage area, a prime that has been generated in the previous time and the bit size of the prime. Here, "n" is a value of the iteration counter.

Control information corresponding to the value of the iteration counter 135C is read from the control information table T150, and the iteration control unit 132C judges whether the read control information is "Information C".

When determining that it is "Information C", the iteration control unit 132C generates 1st information made up of the read prime, the bit size of the prime, and the control information, and outputs the generated 1st information to the prime information generation unit 133C.

When determining that it is not "Information C", the iteration control unit 132C acquires the issue identification information "IDI" from the identifier repository 110, and calculates a bit size "lenIDI" of the acquired issue identifier information. The iteration control unit 132 then generates 2nd information made up of the read prime, the bit size of the prime, the control information, the issue identifier information "IDI" and the bit size "lenIDI", and outputs the generated 2nd information to the prime information generation unit 133C.

In addition, when receiving a regeneration order to regenerate a prime from the key judgment unit 117, the iteration control unit 132C adds "1" to the value of the output counter 136C and sets the value of the iteration counter 135C to "1". Subsequently, the iteration control unit 132C performs the judging of whether the value of the iteration counter 135C is "1" and the subsequent operation.

1.10.1.2 Prime Information Generation Unit 133C

Figure 24:
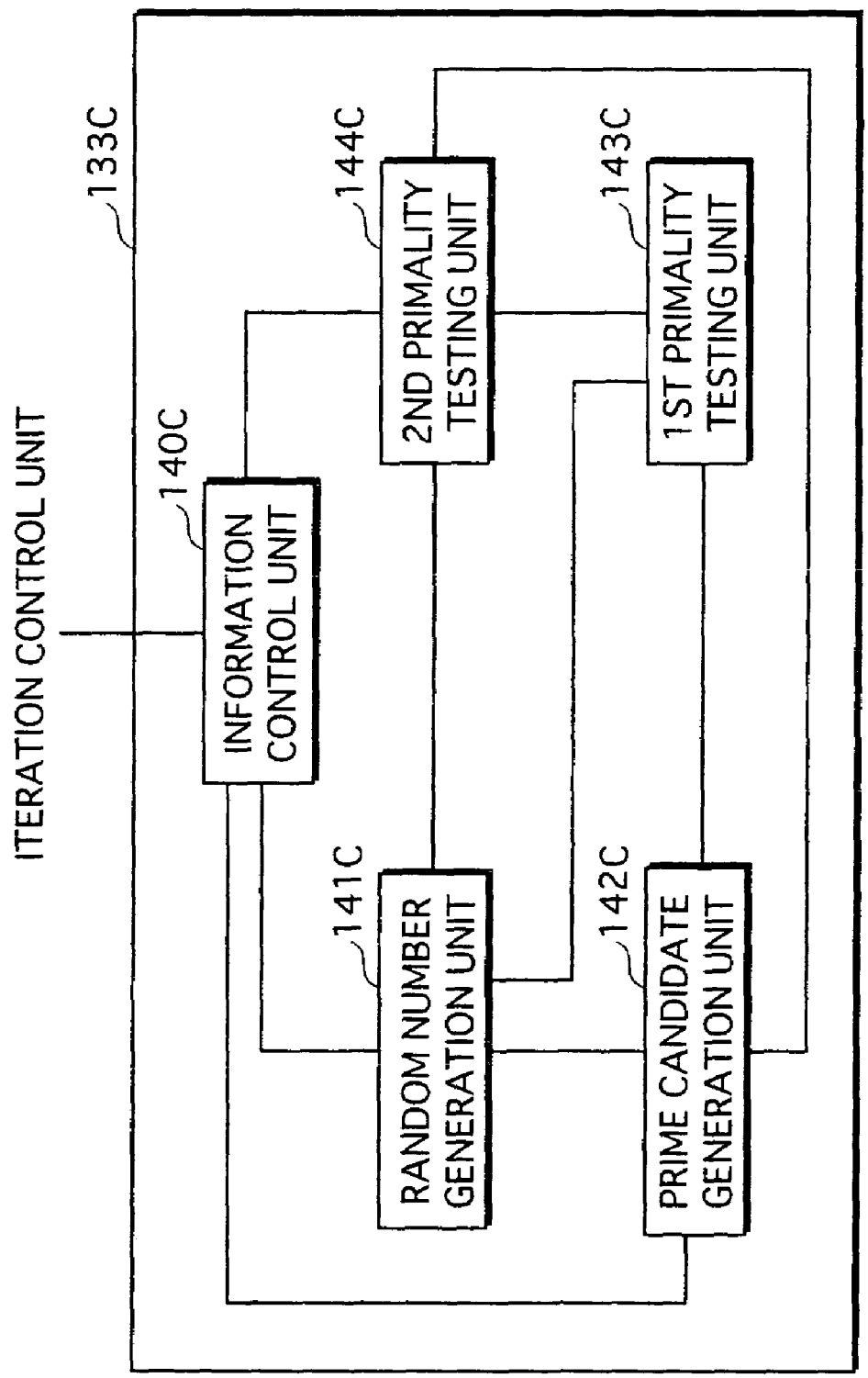
FIG. 24 is a block diagram illustrating a configuration of a prime information generation unit 133C.

The prime information generation unit 133C, as shown in FIG. 24, comprises: an information control unit 140C; a random number generation unit 141C; a prime candidate generation unit 142C; a 1st primality testing unit 143C; and a 2nd primality testing unit 144C.

The prime information generation unit 133C generates a prime whose bit size is twice as large as that of the prime received from the iteration control unit 132C. For example, when receiving a prime of 8 bits, the prime information generation unit 133C generates a prime of 16 bits. In the same fashion, a prime of 32 bit is generated when a prime of 16 bit is received.

The following describes each structural component, assuming that a prime received from the iteration control unit 132C is "q" and the bit size is "lenq".

1.10.1.3 Information Control Unit 140C

The information control unit 140C has an information storage area to store the 1st and 2nd information.

The information control unit 140C has an assigned prime storage area that stores in advance a prime "qg" and the prime's bit size "lenqg" which are assigned by the certificate issuing server 200 and used when a prime is generated based on the control information "Information AB". Here, the bit size of the prime "qg" is, for example, "64" bits.

Receiving, from the iteration control unit 132C, the 1st information made up of the prime "q", the prime's bit size "lenq", and the control information, the information control unit 140C writes the received 1st information to the information storage area. That is, the information control unit 140C writes the prime "q", the prime's bit size "lenq", and the control information (in this case "Information C").

Receiving, from the iteration control unit 132C, the 2nd information made up of the prime "q", the prime's bit size "lenq", the control information, the issue identifier information "IDI" and the bit size "lenIDI", the information control unit 140C writes the received 2nd information to the information storage area. That is, the information control unit 140 writes the prime "q", the prime's bit size "lenq", the control information, the issue identifier information "IDI" and the bit size "lenIDI".

After writing the received information, the information control unit 140C outputs a 1st generation direction indicating a direction of random number generation to a random number generation unit 141C.

Receiving a prime from the 2nd primality testing unit 144C, the information control unit 140C outputs the received prime to the iteration control unit 132C.

Receiving, from the prime candidate generation unit 142C, a number read-out order to read the value of the output counter 136C, the information control unit 140C reads the value of the output counter 136C in the iteration control unit 132C. The information control unit 140C outputs the read value to the prime candidate generation unit 142C.

1.10.1.4 Random Number Generation Unit 141C

Receiving, from the information control unit 140C, the 1st generation direction indicating a direction of random number generation, the random number generation unit 141C reads control information stored in the information storage area of the information control-unit 140C. The random number generation unit 141C judges whether the read control information is "Information C".

When determining that it is "Information C", the random number generation unit 141C reads "lenq" stored in the information storage area of the information control unit 140C, generates a random number "R1" of (lenq−1) bits, and outputs the generated random number "R1" and the read control information to the prime candidate generation unit 142C. Here, the first bit of the random number "R1" is 1. The method for generating random numbers is described in detail in Non-patent Reference 2.

When determining that it is not "Information C", the random number generation unit 141C separately reads "lenq" stored in the information storage area of the information control unit 140C and "lenqg" stored in the assigned prime storage area. Then, the random number generation unit 141C generates a random number "R1" of (lenq−2×lenqg−1) bits, using the read "lenq" and "lenqg", and outputs the generated random number "R1" and the read control information to the prime candidate generation unit 142C. Here, the first bit of the random number "R1" is 1.

In addition, when receiving the 2nd generation direction to generate a random number again from either the 1st primality testing unit 143 or the 2nd primality testing unit 144, the random number generation unit 141C reads control information from the information storage area and conducts the above operation.

1.10.1.5 Prime Candidate Generation Unit 142C

The prime candidate generation unit 142C has: a generated information storage area to store generated information; and a function storage area that stores in advance (i) a prime generation function "gp" to generate a unique prime from the issue identifier information "IDI" and the prime "qg", and (ii) a function "f", which is an injection.

Next is an example of the prime generation using the prime generation function "gp".

The prime candidate generation unit 142C, first, judges whether "2×qg×f(IDI∥c)+1" is a prime, where "c=0". When it is a prime, the following equation is established: "gp(IDI, qg)=2×qg×f(IDI∥c)+1". If it is not a prime, "1" is added to "c", and then the prime candidate generation unit 142C judges whether "2×qg×f(IDI∥c)+1" is a prime. Then, if it is a prime, the following equation is established: "gp(IDI, qg)=2×qg×f(IDI∥c)+1". Still, if it is not a prime, "1" is added to "c", and then the same judgment process is conducted. Such a procedure is repeated until a prime is obtained. When the prime generation function "gp" is defined in this way, the prime candidate generation unit 142C only has to have the functions "qg" and "f" in order to generate—no matter how many times a prime is generated by using the prime generation function—the same prime with respect to the issue identifier information "IDI". At this point, when the bit sizes of "IDI" and "qg" are "32" and "64" bits, respectively, the bit size of "gp(IDI, qg)" becomes 128 bits.

Receiving the random number "R1" and control information from the random number generation unit 141C, the prime candidate generation unit 142C judges whether the received control information is "Information C".

When determining that it is "Information C", the prime candidate generation unit 142C reads the prime "q" from the information storage area of the information control unit 140C. The prime candidate generation unit 142C generates a number "N =2×R1×q+1", using the read prime "q" and the random number "R1" received from the random number generation unit 141C. The prime candidate generation unit 142C judges whether a bit size "lenN" of the generated number "N" matches "2×lenq". When determining that they match each other, the prime candidate generation unit 142C outputs the generated number "N" to the 1st primality testing unit 143C, and stores, in the generated information storage area, the received random number "R1" as "R".

When determining that they do not match each other, the prime candidate generation unit 142C multiplies the random number "R1" received from the random number generation unit 141 by 2, makes the result "R1", and then generates the number "N=2×R1×q+1" by conducting the above operation once again.

When determining that the control information is not "Information C"—that is, determining that the control information is "information AB", the prime candidate generation unit 142C separately reads the prime "q" and issue identifier information "IDI" from the information storage area of the information control unit 140C and the prime "qg" from the assigned prime storage area.

The prime candidate generation unit 142C generates a prime "pIDI=gp(IDI, qg)", by the method described above, using the read issue identifier information "IDI" and prime "qg" as well as the functions "f" and "gp" stored in the function storage area, and stores the generated prime "pIDI" in the generated information storage area.

The prime candidate generation unit 142C reads the prime "pIDI" stored in the generated information storage area, and generates a number "N=2×R1×q×pIDI+1" using the read prime "pIDI", the received random number "R1" and the read prime "q".

The prime candidate generation unit 142C judges whether a bit size "lenN" of the generated number "N" is "2×lenq".

When determining that it is "2×lenq", the prime candidate generation unit 142C outputs the generated number "N" to the 1st primality testing unit 143C, and stores the received random number "R1" in the generated information storage area as "R".

When determining that it is not "2×lenq", the prime candidate generation unit 142C multiplies the random number "R1" received from the random number generation unit 141C by 2, makes the result "R1", and generates the number "N" once again.

1.10.1.6 1st Primality Testing Unit 143C

Since the 1st primality testing unit 143C is the same as the 1st primality testing unit 143 of the first embodiment, the description is left out here.

1.10.1.7 2nd Primality Testing Unit 144C

Since the 1st primality testing unit 144C is the same as the 1st primality testing unit 144 of the first embodiment, the description is left out here.

1.10.2 Issue Public Key Determination Unit 214C

Although not shown in the figure, a server information storage area 220C and a determination information storage area 221C are included in the issue public key determination unit 214C.

The server information storage area 220C has an area to store a server identifier which identifies a key issuing server having made an issue request of the public key certificate.

The determination information storage area 221C stores in advance the prime "qg" assigned to the key issuing server 100, the prime's bit size "lenqg", and the functions "gp" and "f" which are the same as the prime generation function and the injection function, respectively, stored in the key issuing server 100.

The issue public key determination unit 214C receives, from the key issuing server 100 via the reception unit 217, the issue identifier information "IDI", the public key "PK=(n, e)", the server identifier and the certificate issue request information.

The issue public key determination unit 214C writes the received server identifier to the server information storage area 220C.

The issue public key determination unit 214C judges whether the public key "PK" has been generated using the issue identifier information "IDI", using the received public key "PK" and the issue identifier information "IDI".

The determination method is explained here. First, the issue public key determination unit 214C generates the prime "gp(IDI, qg)" using the received issue identifier information "IDI", the stored prime "qg" and the functions "gp" and "f", and writes the generated prime "gp(IDI, qg)" to the determination information storage area 221C. The generation method of the prime "gp(IDI, qg)" is the same as the method described above, and therefore the description is omitted here. It can be seen that the prime "gp(IDI, qg)" generated by the issue public key determination unit 214C at this point is the same as the prime "pIDI" generated by the prime candidate generation unit 142C of the key issuing server.

Next, the issue public key determination unit 214C reads the prime "gp(IDI, qg)" stored in the determination information storage area 221C, and examines whether "n−1" is divisible by the read prime "gp (IDI, qg)". Herewith, it can be determined that the public key "PK" has been generated using the issue identifier information "IDI".

When "n−1" is divisible by the prime "gp(IDI, qg)", the issue public key determination unit 214C determines that the public key "PK" has been generated using the issue identifier information "IDI". On the other hand, when "n−1" is not divisible by the prime "gp(IDI, qg)", the issue public key determination unit 214C determines that the public key "PK" has not been generated using the issue identifier information "IDI".

When determining that the public key "PK" has been generated using the issue identifier information "IDI", the issue public key determination unit 214C writes the received public key "PK" to the issue public key repository 211 while writing the issue identifier information to the issue identifier information repository 212. The issue public key determination unit 214C outputs, to the public key certificate generation unit 215, an order to start generating a public key certificate.

The issue public key determination unit 214C terminates the process when determining that the public key "PK" has not been generated using the issue identifier information "IDI".

1.10.3 Prime Generation Process

As to the prime generation process of the present modified example, the differences from the prime generation process shown in the first embodiment are described. Note that the operational flow is the same as in the first embodiment, and therefore the description is left out.

Step S425 of the prime generation process shown in FIG. 15 is changed so that the random number generation unit 141C separately reads "lenq" stored in the information storage area of the information control unit 140C and "lenqg" stored in the assigned prime storage area. Then, Step S430 is changed so that the random number generation unit 141C generates the random number "R1" of (lenq−2×lenqg−01) bits using the read "lenq" and "lenqg", and outputs the generated random number "R1" and the read control information to the prime candidate generation unit 142C. Here, the first bit of the random number "R1" is 1.

1.10.4 Prime Candidate Generation Process

Figure 25:
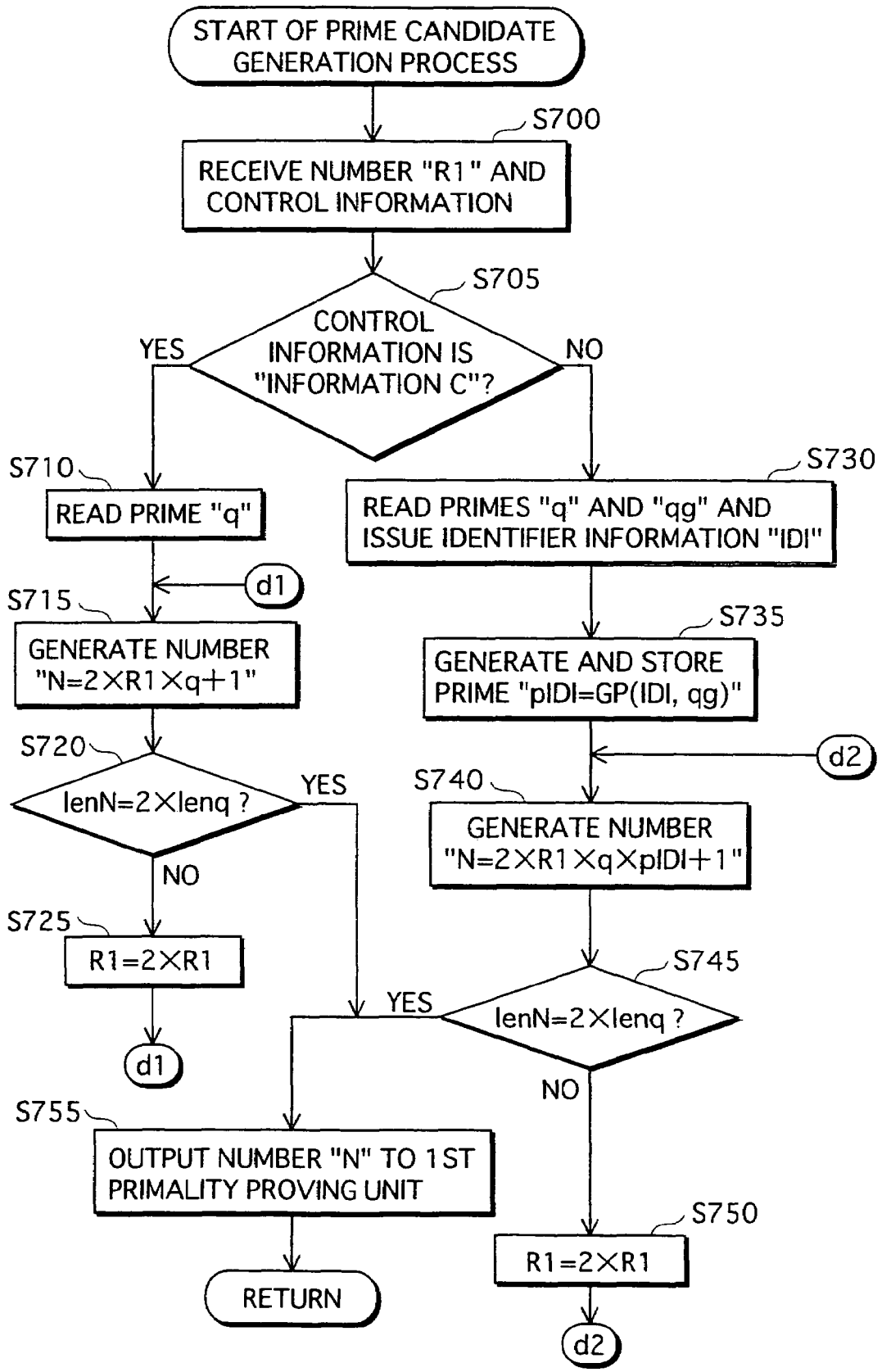
FIG. 25 is a flow diagram illustrating operation of a prime candidate generation process.

The prime candidate generation process of the present modified example is described using the flow diagram shown in FIG. 25.

Receiving the random number "R1" and control information from the random number generation unit 141C (Step S700), the prime candidate generation unit 142C judges whether the received control information is "Information C" (Step S705).

When determining that it is "information C" ("YES" in Step S705), the prime candidate generation unit 142C reads the prime "q" from the information storage area of the information control unit 140(Step S710). The prime candidate generation unit 142C generates a number "N =2×R1×q+1" by using the read prime "q" and the random number "R1" received from the random number generation unit 141C(Step S715). The prime candidate generation unit 142C judges whether a bit size "lenN" of the generated number "N" matches "2×lenq" (Step S720). When determining that they match each other ("YES" in Step S720), the prime candidate generation unit 142C outputs the generated number "N" to the 1st primality testing unit 143C, and stores, in the generated information storage area, the received random number "R1" as "R" (Step S755).

When determining that they do not match each other ("NO" in Step S720), the prime candidate generation unit 142C multiplies the random number "R1" received from the random number generation unit 141C by 2, makes the result "R1" (Step S725), and then the process returns to Step S715.

When determining that the control information is not "Information C" ("NO" in Step S705)—that is, when determining that the control information is "Information AB", the prime candidate generation unit 142C separately reads the prime "q" and the issue identifier information "IDI" from the information storage area of the information control unit 140C and the prime "qg" from the assigned prime storage area (Step S730).

By the method described above, the prime candidate generation unit 142C generates the prime "pIDI=gp(IDI, qg)", using the read issue identifier information "IDI" and prime "qg" as well as the functions "f" and "gp" stored in the function storage area, and stores the generated prime "pIDI" in the generated information storage area (Step S735).

The prime candidate generation unit 142C reads the prime "pIDI" stored in the generated information storage area, and generates a number "N=2×R1×q×pIDI+1" using the read prime "pIDI", the read prime "q", and the generated prime "pIDI" (Step S740).

The prime candidate generation unit 142C judges whether a bit size "lenN" of the generated number "N" is "2×lenq" (Step S745).

When determining that it is "2×lenq" ("YES" in Step S745), the prime candidate generation unit 142C outputs the generated number "N" to the 1st primality testing unit 143C, and stores the random number "R1" to the generated information storage area as "R" (Step S755).

When determining that it is not "2×lenq" ("NO" in Step S745), the prime candidate generation unit 142C multiplies the random number "R1" received from the random number generation unit 141C by 2, and makes the result "R1" (Step S750), and the process returns to Step S740.

1.10.5 Certificate Issuing Process

As to the certificate issuing process according to the present modified example, only the differences from the certificate issuing process shown in the first embodiment are described here.

Step S660 is changed so that the issue public key determination unit 214C generates the prime "gp(IDI, qg)" using the received issue identifier information "IDI", the stored prime "qg" and functions "gp" and "f", and writes the prime "gp(IDI, qg)" to the determination information storage area 221C. In Step S665, the issue public key determination unit 214C reads the prime "gp(IDI, qg)", and examines whether the public key "PK" has been generated using the issue identifier information "IDI", using the received public key "PK" and issue identifier information "IDI" as well as the read prime "gp(IDI, qg)".

1.10.6 Examination of Prime Uniqueness and Determination Method

According to the same proof described above, the uniqueness of the prime generated by the prime generation unit 116C is satisfied. That is, since different issue identifier information is generated with respect to each terminal, a generated prime is also different due to a property of the injection of the function "f" used for the prime generation. Herewith, a different private key and a public key corresponding to the private key can be assigned with respect to each terminal.

By the above-mentioned method, the certificate issuing server is capable of determining whether the key issuing server has properly generated the primes using the issue identifier information IDI.

This is because, the primes "p1" and "p2", which are private keys, satisfy the following with the primes "q1" and "q2", the random numbers "R11" and "R12", and the prime "pIDI=gp(IDI, qg)": "p1=2×q1×pIDI×R11+1" and "p2=2×q2×pIDI×R12+1". Therefore, the following equalities are obtained:

$$n = p1 \times p2$$
$$= (2 \times q1 \times pIDI \times R11 + 1) \times (2 \times q2 \times pIDI \times R12 + 1)$$
$$= pIDI \times (4 \times q1 \times q2 \times R11 \times R12 \times pIDI + 2 \times q1 \times R11 + 2 \times q2 \times R12) + 1.$$

Accordingly, the certificate issuing server is capable of determining whether the key issuing server has properly generated the primes "p1" and "p2" using the issue identifier information IDI by examining "n−1" being divisible by "pIDI".

1.10.7 Modifications

It is a matter of course that the present invention is not confined to the above embodiment and modified examples, and the following cases are also within the scope of the present invention.

In the above modified examples, a single prime "qg" is stored in advance; however, the present invention is not confined to this. The key issuing server may store in advance two primes "qg1" and "qg2". Then, the key issuing server uses the primes "qg1" and "qg2" when generating the primes "p1" and "p2", respectively.

Furthermore, in the above modified examples, "pIDI" used to generate the prime "p1" is the same as "pIDI" used to generate the prime "p2"; however, the present invention is not confined to this. For example, the value of "c" used to generate the prime "p1" and the value of "c" used to generate the prime "p2" are set to be different from each other so as to make the values of "pIDI" used to generate the primes "p1" and "p2" different from each other.

2. Second Embodiment

A key issuing system 2 of the second embodiment according to the present invention is described, focusing on differences from the key issuing system 1 of the first embodiment.

2.1 Overview of Key Issuing System 2

Figure 26:
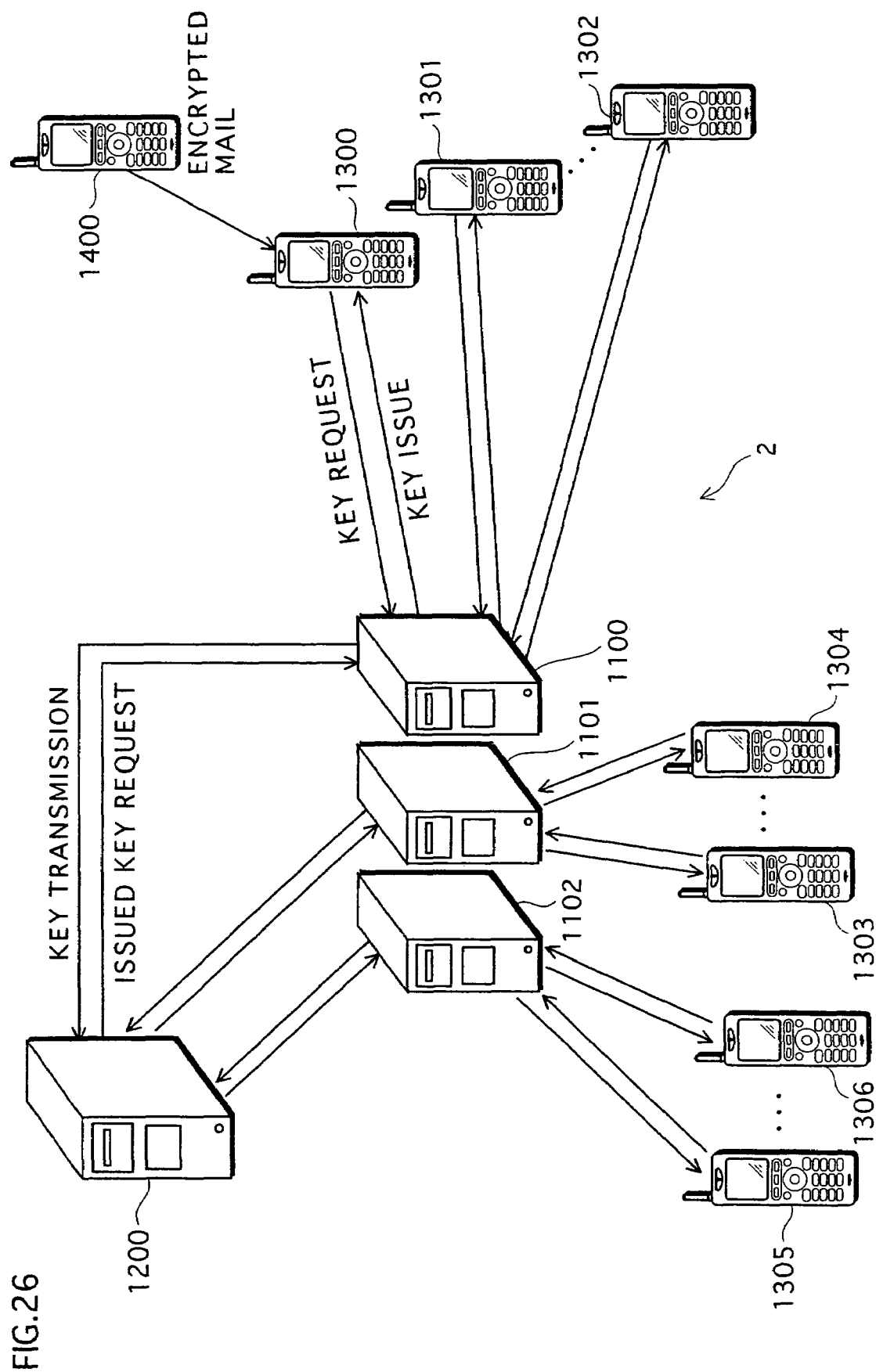
FIG. 26 is an overall schematic view of a key issuing system 2.

As shown in FIG. 26, the key issuing system 2 comprises: key issuing servers 1100, 1101 and 1102; a key issue audit server 1200; terminals 1300, 1301, ..., 1302, 1303, ..., 1304, 1305, ..., and 1306. The number of the terminals is, for example, a thousand.

Each of the key issuing servers 1100, 1101 and 1102 is managed by a different company. The terminals 1300, 1301, ..., and 1302 individually request the key issuing server 1100 to issue a key. In the same manner, the terminals 1303, ..., and 1304 individually request the key issuing server 1101 to issue a key, while the terminals 1305, ..., and 1306 individually request the key issuing server 1102 to issue a key. Note that the terminals 1300, 1301, ..., and 1302 respectively have safe communication pathways with the key issuing server 1100. And in the same way, safe communication pathways are established between the key issuing server 1101 and the respective terminals 1303, ..., and 1304 as well as between the key issuing server 1102 and the respective terminals 1305, ..., and 1306.

In like fashion, each of the key issuing servers 1100, 1101 and 1102 also has a safe communication pathway with the key issue audit server 1200.

Note that the following describes the overview of the key issuing system 2, using the key issuing server 1100, key issue audit server 1200 and terminal 1300.

Receiving a key issue request from the terminal 1300, the key issuing server 1100 generates a private key and a public key with the RSA encryption. In addition, the key issuing server 1100 generates a public key certificate corresponding to the generated public key, and transmits the generated public key certificate and private key to the terminal 1300. Here, assume that the key length of each key to be generated is 1024 bits.

Receiving issued-key request information which requests an issued public key and issue identifier information, the key issuing server 1100 transmits, to the key issue audit server 1200, issued-key information made up of the issued public key and issue identifier information used to generate the public key.

Receiving the issued public key information from the key issuing server 1100, the key issue audit server 1200 audits the validity of the issued public key, and displays the audit result.

Receiving the public key certificate and the private key from the key issuing server 1100, the terminal 1300 stores therein the received public key certificate and private key.

Subsequently, the user of the terminal 1400, for example, first obtains the public key certificate of the terminal 1300 from the key issuing server 1100, or from the terminal 1300, and examines the validity of the public key certificate, using a public key "C_PK" held by the key issuing server 1100.

When the public key certificate is determined as valid, the obtained public key certificate is stored in the terminal 1400. The terminal 1400 encrypts an e-mail to be transmitted to the terminal 1300, using the public key included in the stored public key certificate, and transmits the encrypted e-mail to the terminal 1300.

Receiving the encrypted e-mail from the terminal 1400, the terminal 1300 decrypts the encrypted e-mail, using the stored private key, and displays the decrypted e-mail.

Herewith, a safe exchange of data can be achieved between the terminals 1300 and 1400.

Note that, since each of the terminals 1301, ..., and 1302 is the same as the terminal 1300, the descriptions are left out here. In addition, each of the key issuing servers 1101 and 1102 is the same as the key issuing server 1100, the descriptions are left out here.

In the following explanation, the terminal 1300 is used as a representative terminal while the key issuing server 1100 being used as a representative key issuing server.

2.2 Structure of Key Issuing Server 1100

Figure 27:
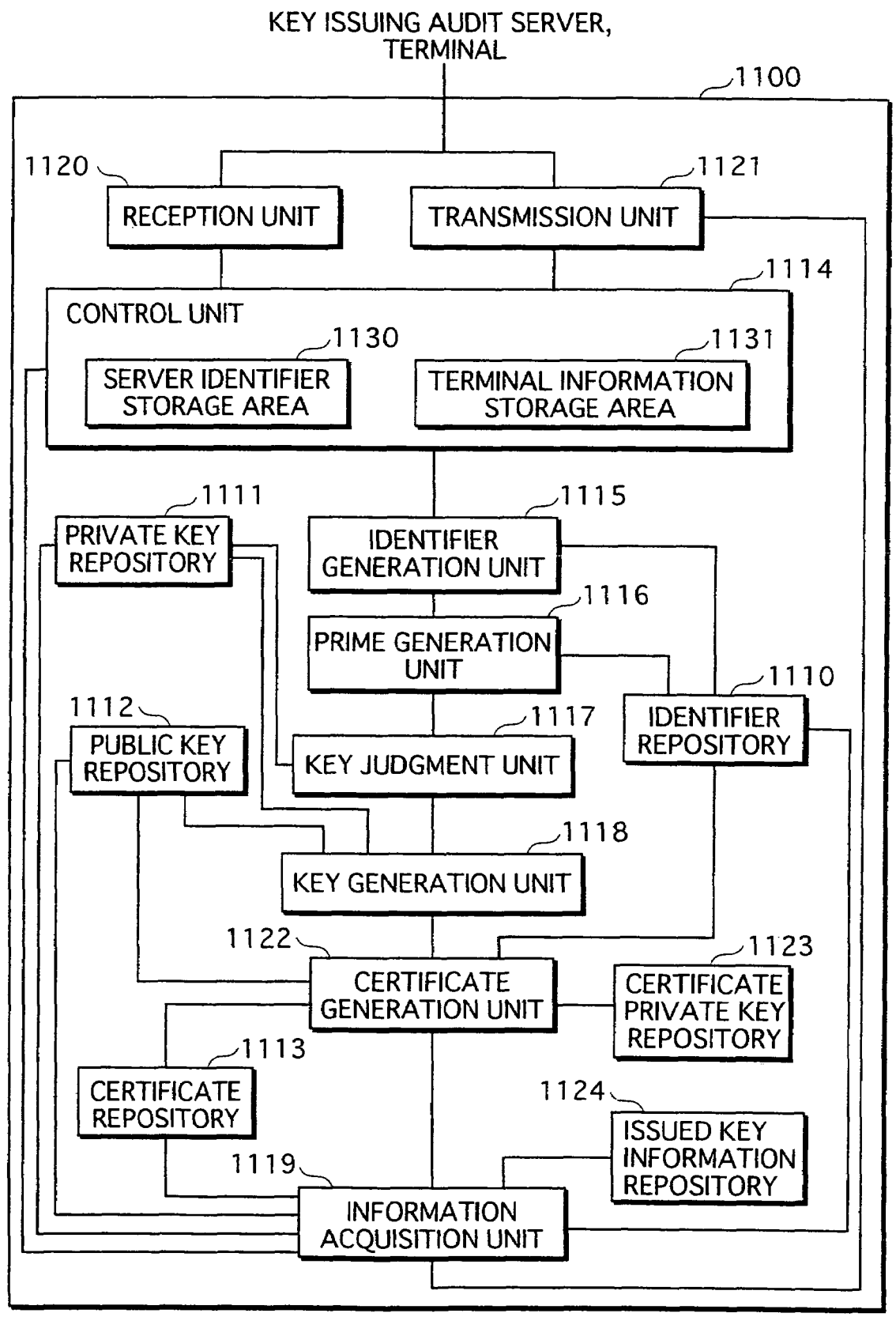
FIG. 27 is a block diagram illustrating a configuration of a key issuing server 1100.

The key issuing server 1100, as shown in FIG. 27, comprises: an identifier repository 1110; a private key repository 1111; a public key repository 1112; a certificate repository 1113; a control unit 1114; an identifier generation unit 1115; a prime generation unit 1116; a key judgment unit 1117; a key generation unit 1118; an information acquisition unit 1119; a reception unit 1200; a transmission unit 1121; a certificate generation unit 1122; a certificate private key repository 1123; and an issued-key information repository 1124.

The key issuing server 1100 is, specifically speaking, a computer system composed of a microprocessor, ROM, RAM, a hard drive unit, a display unit, a keyboard, a mouse, and the like. A computer program is stored in the RAM or the hard drive unit. The microprocessor operates according to the computer program, and thereby the key issuing server 1100 achieves the function.

Note that, since each of the key issuing servers 1101 and 1102 has the same structure as the key issuing server 1100, the descriptions are left out here.

2.2.1 Identifier Repository 1110

The identifier repository 1110 has an area to store issue identifier information, having a bit size of 126 bits or less, as in the case of the identifier repository 110 of the first embodiment. The bit size of the issue identifier information is 64 bits, for example.

2.2.2 Private Key Repository 1111

As in the case of the private key repository 111 of the first embodiment, the private key repository 1111 has a prime storage area and a private key storage area.

2.2.3 Public Key Repository 1112

The public key repository 1112 has an area to store a public key, as in the case of the public key repository 112 of the first embodiment.

2.2.4 Certificate Repository 1113

The certificate repository 1113 has an area to store a public key certificate generated by the certificate issuing server.

2.2.5 Certificate Private Key Repository 1123

The certificate private key repository 1123 stores in advance a certificate private key "C_SK" used to generate a public key certificate.

2.2.6 Control Unit 1114

The control unit 1114, as shown in FIG. 27, has a server identifier storage area 1130 and a terminal information storage area 1131.

The server identifier storage area 1130 stores in advance a sever identifier which identifies the server itself. For example, in the case of the key issuing server 1100, SIDA is stored therein, while SIDB and SIDC are stored in the server identifier storage area 1130 of the key issuing servers 1101 and 1102, respectively. Note that the following description is given with the server identifier of the key issuing server 100 being "SID". Here, the bit size of the server identifier is 31 bits.

The terminal information storage area 1131 has an area to store a terminal identifier that identifies a terminal having requested a key issue. Here, the terminal identifier is, for example, a serial number of the terminal. The bit size of the serial number is here 32 bits.

Receiving, from the terminal 1300 via the reception unit 1120, key issue request information and a terminal identifier "TID" of the terminal 1300, the control unit 1114 writes the received terminal identifier "TID" to the terminal information storage area 1131. The control unit 1114 outputs an order to generate issue identifier information and the received terminal identifier "TID" to the identifier generation unit 1115.

Receiving issued-key request information from the key issue audit server 1200 via the reception unit 1120, the control unit 1114 outputs an order to acquire key information to the information acquisition unit 1119.

2.2.7 Identifier Generation Unit 1115

Since the identifier generation unit 1115 is the same as the identifier generation unit 115 of the first embodiment, the description is left out here.

2.2.8 Prime Generation Unit 1116

The prime generation unit 1116 generates a 512-bit prime in the same manner as the prime generation method of the prime generation unit 116 according to the first embodiment.

2.2.9 Key Judgment Unit 1117

Since the key judgment unit 1117 is the same as the key judgment unit 117 of the first embodiment, the description is left out here.

2.2.10 Key Generation Unit 1118

Receiving the key generation order from the key judgment unit 1117, the key generation unit 1118 reads two primes "p1" and "p2" stored in the prime storage area of the private key repository 1111, and calculates the product "n" of the read primes "p1" and "p2"—.e. "n=p1×p2".

The key generation unit 1118 generates a random number "e", further generates, as a public key, a combination "PK=(n, e)" made up of the calculated "n" and the generated random number "e", and then writes the generated public key "PK" to the public key repository 1112. Here, the random number "e" is coprime to the number "L", as in the conventional technique, and satisfies "1≦e≦L−1, GCD(e, L)=1". Here, GCD (e, L) is the greatest common divisor of e and L. The number "L" is found by "L=LCM(p1−1, p2−1)", where LCM(p1−1, p2−1) is the least common multiple of "p1−1" and "p2−1".

The key generation unit 1118 calculates "d" satisfying "exd =1 mod L", and writes, as a private key, a combination "SK=(p1, p2, d)" made up of the calculated "d", and the primes "p1" and "p2" to the private key storage area of the private key repository 1111. The key generation unit 1118 outputs, to the certificate generation unit 1122, an order to generate a public key certificate.

2.2.11 Certificate Generation Unit 1122

Receiving the order to generate a public key certificate from the key generation unit 1118, the certificate generation unit 1122 separately reads the certificate private key "C_SK" from the certificate private key repository, the public key "PK" from the public key repository 1112, and issue identifier information "IDI" from the identifier repository 1110.

The certificate generation unit 1122 generates a public key certificate "Cert", using the read private key "C_SK", public key "PK" and issue identifier information "IDI". Specifically speaking, the public key certificate "Cert" to be generated is "Cert=n||e||IDI||Sig(C_SK, n||e||IDI)". Here, Sig(K, D) is signature data of when a private key "K" is used with respect to data "D". Here, the symbol "||" denotes a bit join or byte join.

The certificate generation unit 1122 writes the generated public key certificate "Cert" to the certificate repository 1113, and outputs, to the information acquisition unit 1119, a distribution start order to the information acquisition unit 1119.

2.2.12 Information Acquisition Unit 1119

Receiving the distribution start order form the certificate generation unit 1122, the information acquisition unit 1119 separately reads the private key "SK" stored in the private key repository 1111, the public key certificate "Cert" stored in the certificate repository 1113, and the terminal identifier stored in the terminal information storage area 1131 of the control unit 1114. Then, the information acquisition unit 1119 transmits, via the transmission unit 1121, the read private key "SK" and public key certificate "Cert" to the terminal 1300 corresponding to the read terminal identifier.

After transmitting the private key "SK" and the public key certificate "Cert" to the terminal 1300 via the transmission unit 1121, the information acquisition unit 1119 separately reads the issued public key "PK=(n, e)" from the public key repository 1112 and the issued issue identifier information "IDI" from the identifier repository 1110, and writes the read public key "PK" and issue identifier information "IDI" to the issued-key information repository 1124 as one combination.

Receiving an order to acquire key information from the control unit 1114, the information acquisition unit 1119 reads all the pieces of issued-key information from the issued-key information repository 1124. The information acquisition unit 1119 reads the server identifier from the server identifier storage area 1130 of the control unit 1114, and transmits all the read pieces of issued-key information and the server identifier to the key issue audit server 1200 via the transmission unit 1121.

2.2.13 Issued-key Information Repository 1124

The issued-key information repository 1124 has an issued-key information table T1100 as shown in FIG. 28.

The issued-key information table T1100 has an area to store at least one combination made up of an issued public key and an issued identifier information piece.

The issued public key is a public key having been issued by the key issuing server 1100, while the issued identifier information piece is a piece of issued identifier information used to generate a public key and a private key corresponding to the public key.

Herewith, the key issuing server 1100 is capable of accumulating issued public keys and pieces of issued identifier information.

Note that, since being used to store issue history that is issued public key information, the issued-key information repository 1124 has to be nonvolatile memory (e.g. a hard disc), in which data is not erased even when the power is turned off.

2.2.14 Reception Unit 1120

The reception unit 1120 receives information from the key issue audit server 1200 and the terminal 1300, and outputs the received information to the control unit 1114.

2.2.15 Transmission Unit 1121

Receiving the private key "SK" and the public key certificate "Cert" from the information acquisition unit 1119, the transmission unit 1121 transmits individual information to the terminal 1300.

Receiving one or more pieces of issued-key information and the server identifier from the information acquisition unit 1119, the transmission unit 1121 transmits the received one or more pieces of issued-key information to the key issue audit server 1200.

2.3 Key Issue Audit Server 1200

Figure 29:
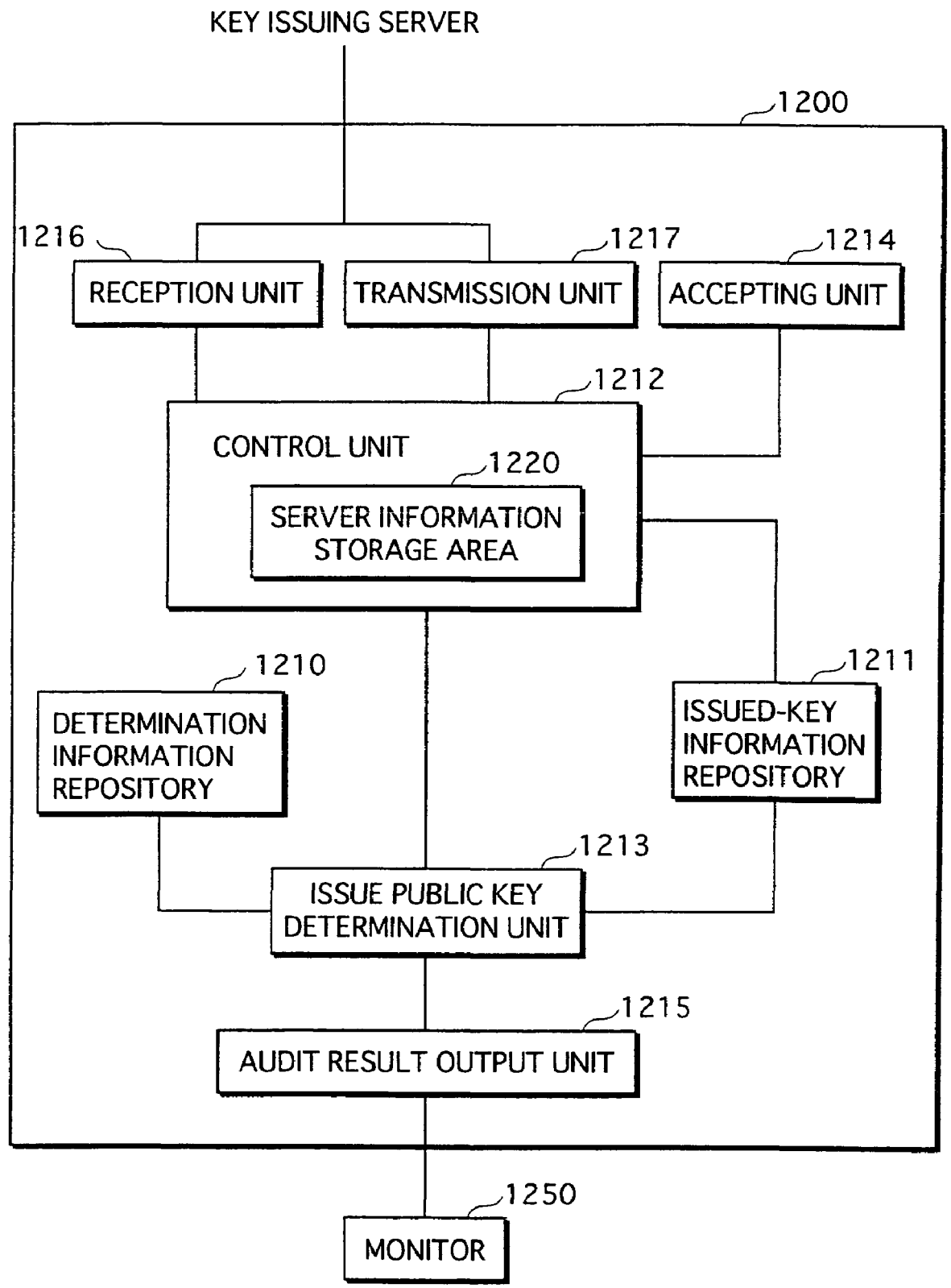
FIG. 29 is a block diagram illustrating a configuration of a key issuing audit server 1200.

The key issue audit server 1200, as shown in FIG. 29, comprises: a determination information repository 1210; an issued-key information repository 1211; a control unit 1212; an issue public key determination unit 1213; an accepting unit 1214; an audit result output unit 1215; a reception unit 1216; and a transmission unit 1217.

The key issue audit server 1200 is, specifically speaking, a computer system composed of a microprocessor, ROM, RAM, a hard drive unit, a display unit, a keyboard, a mouse, and the like. A computer program is stored in the RAM or the hard drive unit. The microprocessor operates according to the computer program, and thereby the key issue audit server 1200 achieves the function.

Note that the key issue audit server 1200 conducts the same operations when receiving the issued-key information from the key issuing server 1100 and from other key issuing servers. And therefore, in the following description, issued-key information transmitted from the key issuing server 1100 is used.

2.3.1 Determination Information Repository 1210

The determination information repository 1210 has a verification value table T1200 as shown in FIG. 30. The verification value table T1200 has an area to store at least one combination made up of a server identifier, and 1st and 2nd verification values. The server identifier is an identifier that identifies a key issuing server. "SIDA" indicates the key issuing server 1100, while "SIDB" and "SIDC" indicating the key issuing servers 1101 and 1102, respectively. The 1st and 2nd verification values are verification values assigned to the key issuing servers indicated by associated server identifiers. Note that the following description is given, assuming that the server identifier of the key issuing server 1100 is "SID".

2.3.2 Issued Key Information Repository 1211

The issued-key information repository 1211 has an area to store one or more pieces of issued-key information transmitted from the key issuing server 1100.

2.3.3 Control Unit 1212

The control unit 1212 has a server information storage area 1220 as shown in FIG. 29.

The server information storage area 1220 has an area to store server identifiers, each of which identifies a key issuing server having requested a public key certificate issue.

Receiving, from the accepting unit 1214, an audit start order to start auditing the public key and an audit-target server identifier (here, it is "SID"), the control unit 1212 transmits, via the transmission unit 1217, issued-key request information to the key issuing server 1100 corresponding to the server identifier.

The control unit 1212 writes the server identifier received from the accepting unit 1214 to the server information storage area 1220.

The control unit 1212 receives one or more pieces of issued-key information and the server identifier from the key issuing server 1100 via the reception unit 1216.

The control unit 1212 judges whether the received server identifier matches the server identifier stored in the server information storage area.

When determining that they match each other, the control unit 1212 writes the received one or more pieces of issued-key information to the issued-key information repository 1211, and outputs an audit start order and the received server identifier to the issue public key determination unit 1213.

When determining that they do not match each other, the control unit 1212 terminates the process.

2.3.4 Issue Public Key Determination Unit 1213

Receiving the audit start order and the server identifier from the control unit 1212, the issue public key determination unit 1213 reads corresponding 1st and 2nd verification values "c11" and "c12" from the determination information repository 1210, using the received server identifier.

The issue public key determination unit 1213 reads one piece from among unread issued-key information from the issued-key information repository 1211.

The issue public key determination unit 1213 judges whether the public key "PK" has been generated using the issue identifier information "IDI", using the public key "PK" included in the read piece of issued-key information, the issue identifier information "IDI", and the 1st and 2nd verification values "c11" and "c12".

Here, since the determination method is the same as in the first embodiment, the description is left out.

When "n−(c11×c12)" is divisible by "IDI", the issue public key determination unit 1213 determines that the public key "PK" has been generated using the issue identifier information "IDI". On the other hand, when "n−(c11×c12)" is not divisible by "IDI", the issue public key determination unit 1213 determines that the public key "PK" has been generated, not using the issue identifier information "IDI" and temporarily stores the read issue identifier information "IDI".

The issue public key determination unit 1213 judges whether there is unread issued-key information. When determining that there is unread issued-key information, the issue public key determination unit 1213 repeats the above operation. When determining that there is no unread issued-key information, the issue public key determination unit 1213 then judges whether there is temporarily stored issue identifier information.

When determining that there is temporarily stored issue identifier information, the issue public key determination unit 1213 generates an invalid issue identifier information group by linking the all the stored issue identifiers, and outputs the generated invalid issue identifier information group to the audit result output unit 1215.

When determining that there is no temporarily stored issue identifier information, the issue public key determination unit 1213 outputs, to the audit result output unit 1215, a validity message indicating that the validity of all public keys is determined.

2.3.5 Accepting Unit 1214

Accepting a direction of starting audit and a server identifier of an audit-target key issuing server, the accepting unit 1214 outputs an audit start order and the server identifier to the control unit 1212.

2.3.6 Audit Result Output Unit 1215

Receiving the invalid issue identifier information group from the issue public key determination unit 1213, the audit result output unit 1215 outputs the received invalid issue identifier information group to the monitor 1250.

Receiving the validity message from the issue public key determination unit 1213, the audit result output unit 1215 outputs the received validity message to the monitor 1250.

Note that the monitor 1250 displays information received from the audit result output unit 1215.

2.3.7 Reception Unit 1216

Receiving one or more pieces of issued-key information and the server identifier from the key issuing server 1100, the reception unit 1216 outputs the received one or more issued-key information and server identifier to the control unit 1212.

2.3.8 Transmission Unit 1217

Receiving issued-key request information from the control unit 1212, the transmission unit 1217 transmits the received issued-key request information to the key issuing server 1100.

2.4 Structure of Terminal 1300

The terminal 1300 is the same as the terminal 300 of the first embodiment, and therefore the description is left out.

Note that, since each of the terminals 1301, . . . , 1302, 1303, . . . , 1304, 1305, . . . , and 1306 is the same as the terminal 300, their descriptions are omitted.

2.5 Operation of Key Issuing System 2

The operation of the key issuing system 2 is described here.

2.5.1 Overview of Operation of Key Issuing System 2

Here is described the overview of operation of the key issuing system 2.

The following shows an overview of operation of when the key issuing server 1100 issues a key to the terminal 1300.

The following description is given, defining one or more pieces of issued-key information as an issued-key information group.

2.5.1.1 Overview of Operation for Key Issue

The overview of operation for a key issue is described next, using a flow diagram shown in FIG. 31.

Accepting a direction of key issue request by a user operation, the terminal 1300 transmits key issue request information and the terminal identifier "TID" to the key issuing server 100 (Step S1000).

Receiving the key issue request information and the terminal identifier "TID" from the terminal 1300, the key issuing server 1100 generates a private key and a public key in the key issuing process (Step S1005), issues a public key certificate for the public key generated in Step S1005 in the certificate issuing process, and transmits the issued public key certificate and the private key generated in Step S1005 to the terminal 1300 (Step S1010).

Receiving the private key "SK" and the public key certificate "Cert" from the key issuing server 1100, the terminal 1300 stores the received private key "SK" and the public key certificate "Cert" therein (Step S1015).

5.1.2 Overview of Operation for Key Audit

The overview of operation for key audit is described next, using a flow diagram shown in FIG. 32.

The key issue audit server 1200 transmits issued-key request information to the key issuing server 1100 in the audit process (Step S1050).

The key issuing server 1100 transmits the issued-key information group acquired in the key information acquisition process and the server identifier to the key issue audit server 1200 (Step S1055).

2.5.2 Key Issuing Process

Figure 31:
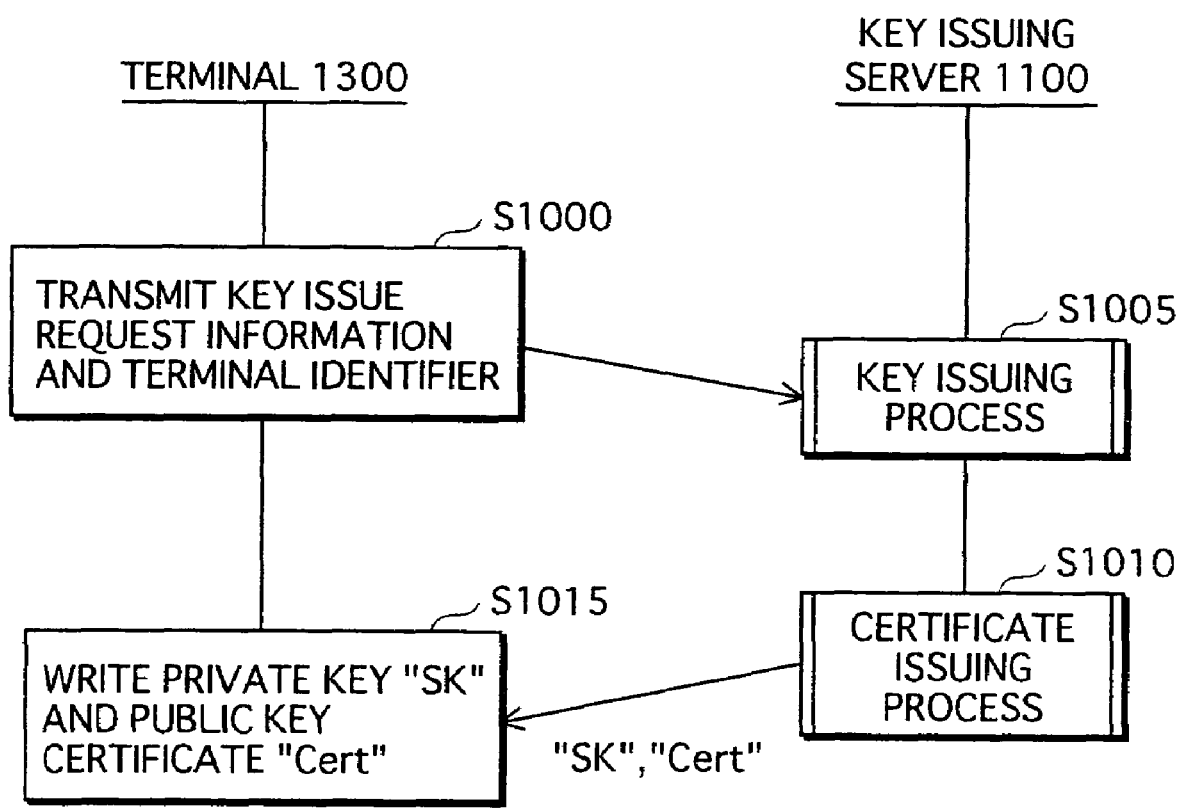
FIG. 31 is a flow diagram illustrating an outline of operation of the key issuing system 2 at key issuance.

As to the operation of the key issuing process shown in FIG. 31, only differences .from that of the first embodiment are explained here, using the flow diagrams shown in FIGS. 11, 12, 13 and 14.

Figure 11:
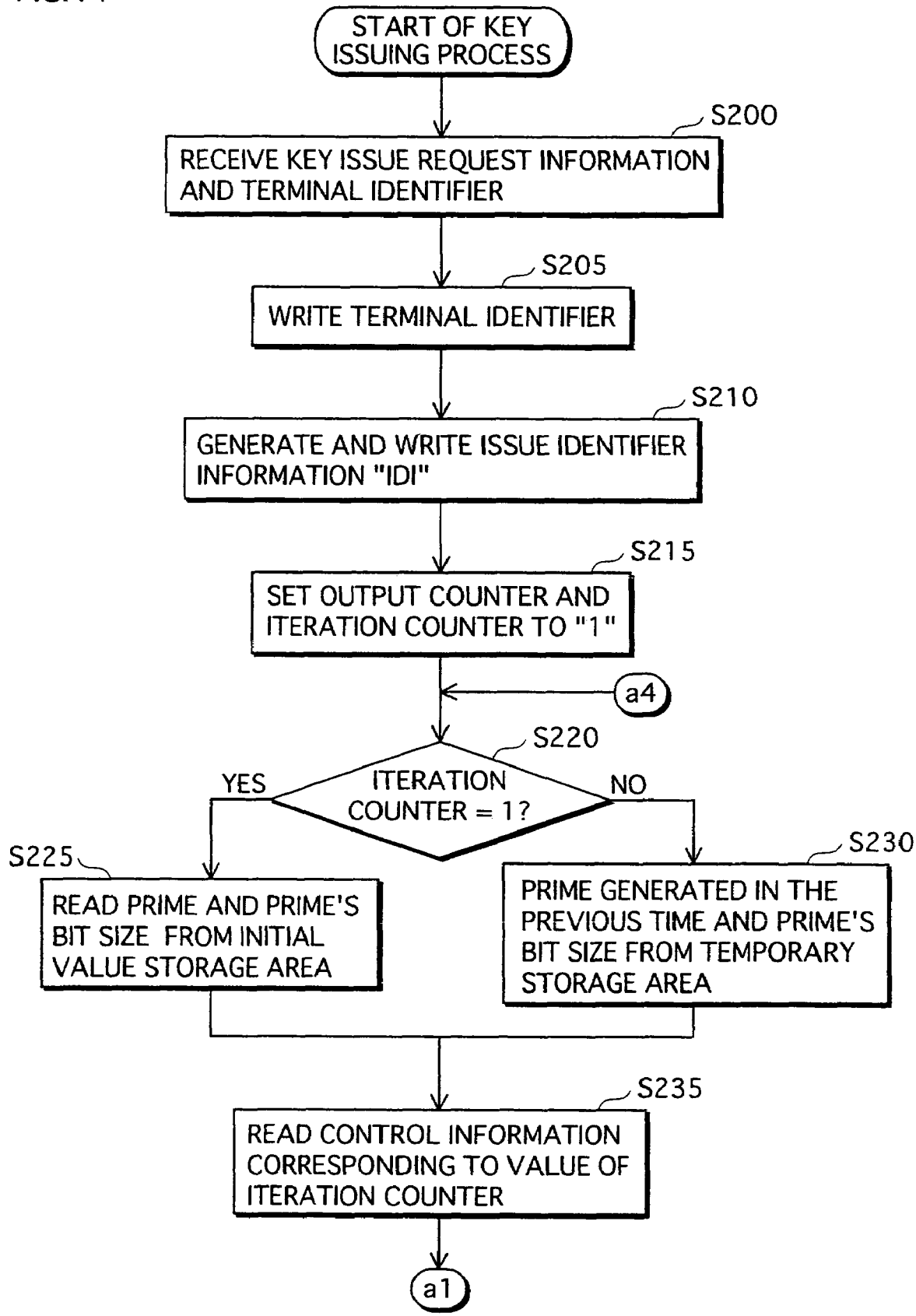
FIG. 11 is a flow diagram illustrating operation of a key issuing process in the key issuing system 1 (continuing to FIG. 12)
Figure 13:
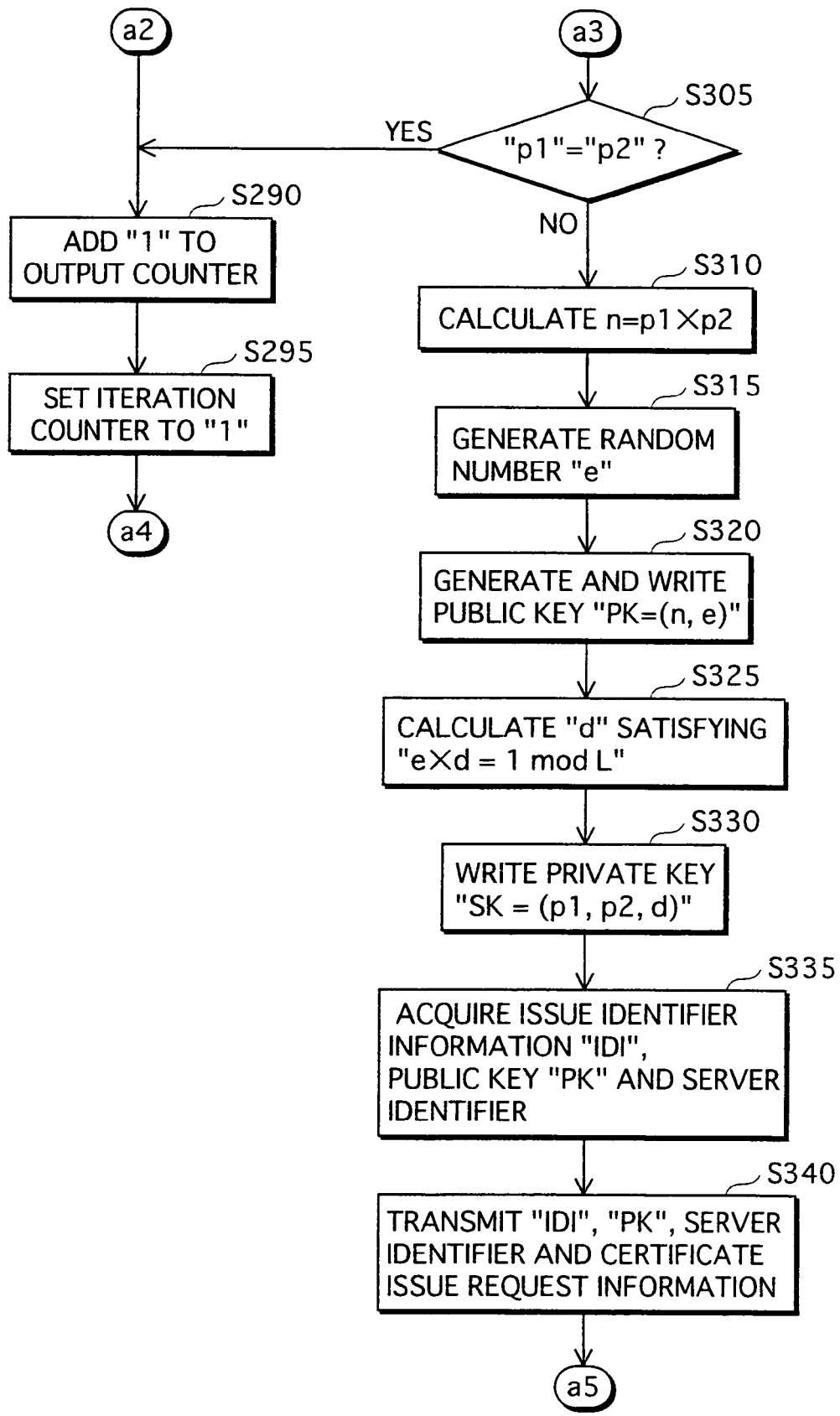
FIG. 13 is a flow diagram illustrating operation of the key issuing process in the key issuing system 1 (continued from FIG. 12 to FIG. 14)
Figure 14:
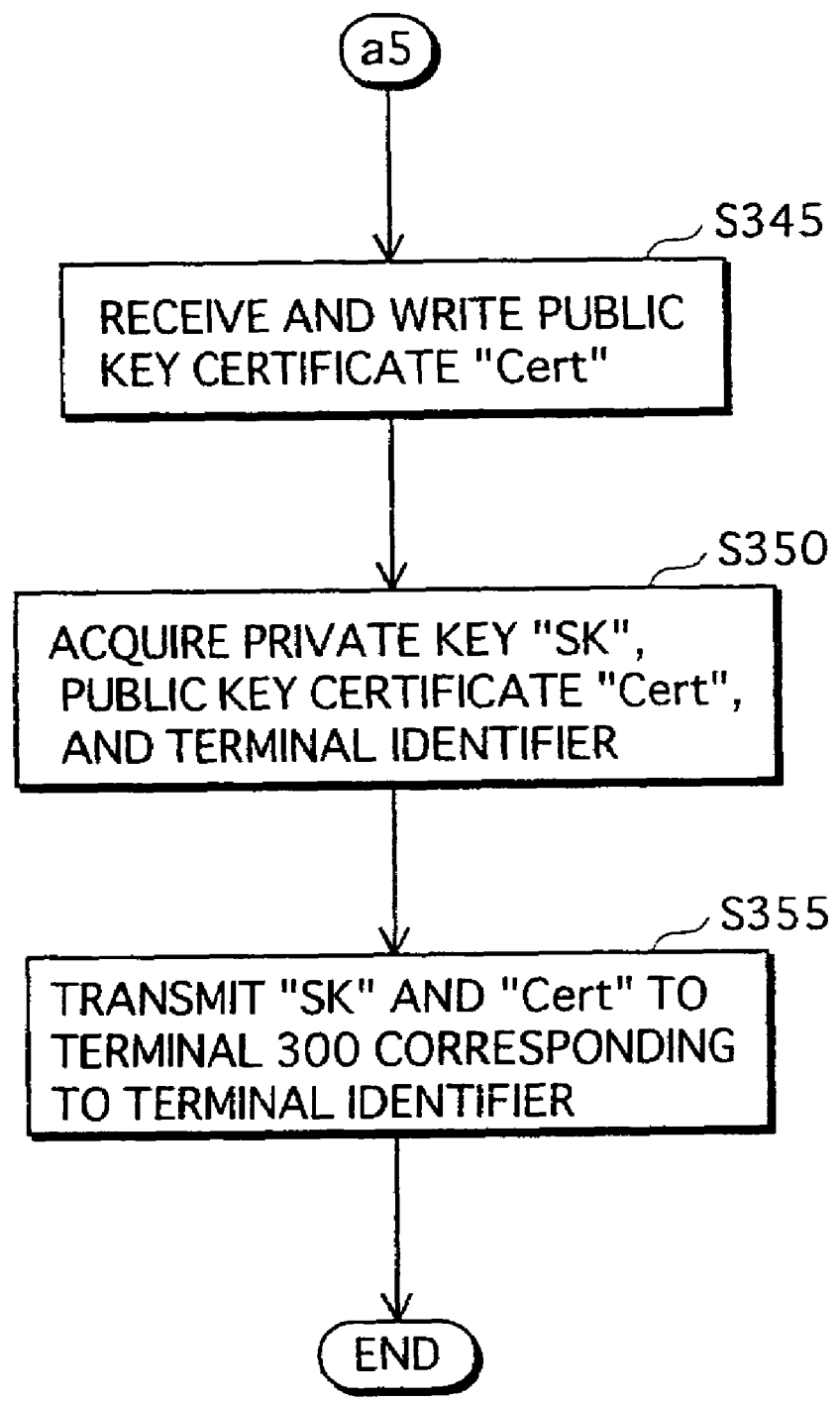
FIG. 14 is a flow diagram illustrating operation of the key issuing process in the key issuing system 1 (continued from FIG. 13)

The key issuing process according to the present embodiment performs Steps S200 to 325 shown in FIGS. 11, 12 and 13.

As to the key issuing process of the present embodiment, Step S330 shown in FIG. 13 is changed so that the key generation unit 1118 writes, as a private key, a combination "SK=(p1, p2, d)" to the private key storage area of the private key repository 1111, and outputs an order to generate a public key certificate to the certificate generation unit 1122.

The key issuing process of the present embodiment is terminated after the modified Step S330 is executed.

2.5.3 Certificate Issuing Process

Figure 33:
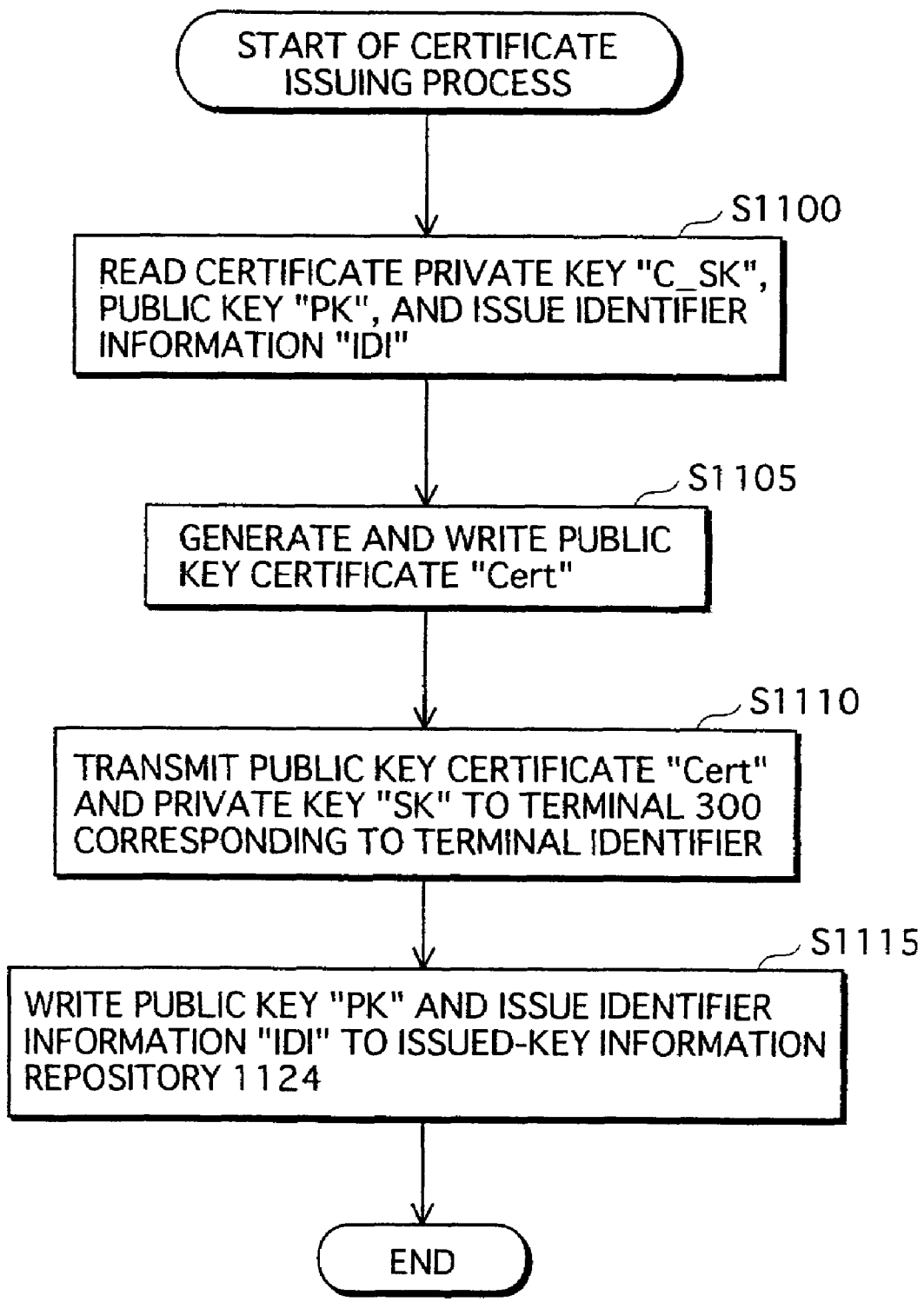
FIG. 33 is a flow diagram illustrating operation of a certification issuing process in the key issuing system 2.

Here is described the operation of the certificate issuing process shown in FIG. 31, using a flow diagram of FIG. 33.

Receiving the order to generate a public key certificate from the key generation unit 1118, the certificate generation unit 1122 separately reads the certificate private key "C_SK" from the certificate private key repository, the public key "PK" from the public key repository 1112, and the issue identifier information "IDI" from the identifier repository 1110 (Step The certificate generation unit 1122 generates the public key certificate "Cert", using the read private key "C_SK", public key "PK" and issue identifier information "IDI", writes the generated public key certificate "Cert" to the certificate repository 1113, and outputs a distribution start order for the public key certificate "Cert" to the information acquisition unit 1119 (Step S1105).

Receiving the distribution start order from the certificate generation unit 1122, the information acquisition unit 1119 separately reads the private key "SK" stored in the private key repository 1111, the public key certificate "Cert" stored in the certificate repository 1113, and the terminal identifier stored in the terminal information storage area of the control unit 1114, and transmits, via the transmission unit 1121, the read private key "SK" and public key certificate "Cert" to the terminal 1300 corresponding to the read terminal identifier (Step S1110).

The information acquisition unit 1119 separately reads the public key "PK=(n, e)" issued from the public key repository 1112 and the issue identifier information "IDI" issued from the identifier repository 1110, and writes the read public key "PK" and issue identifier information "IDI" to the issued-key information repository 1124 as one combination (Step S1115).

2.5.4 Key Information Acquisition Process

Figure 32:
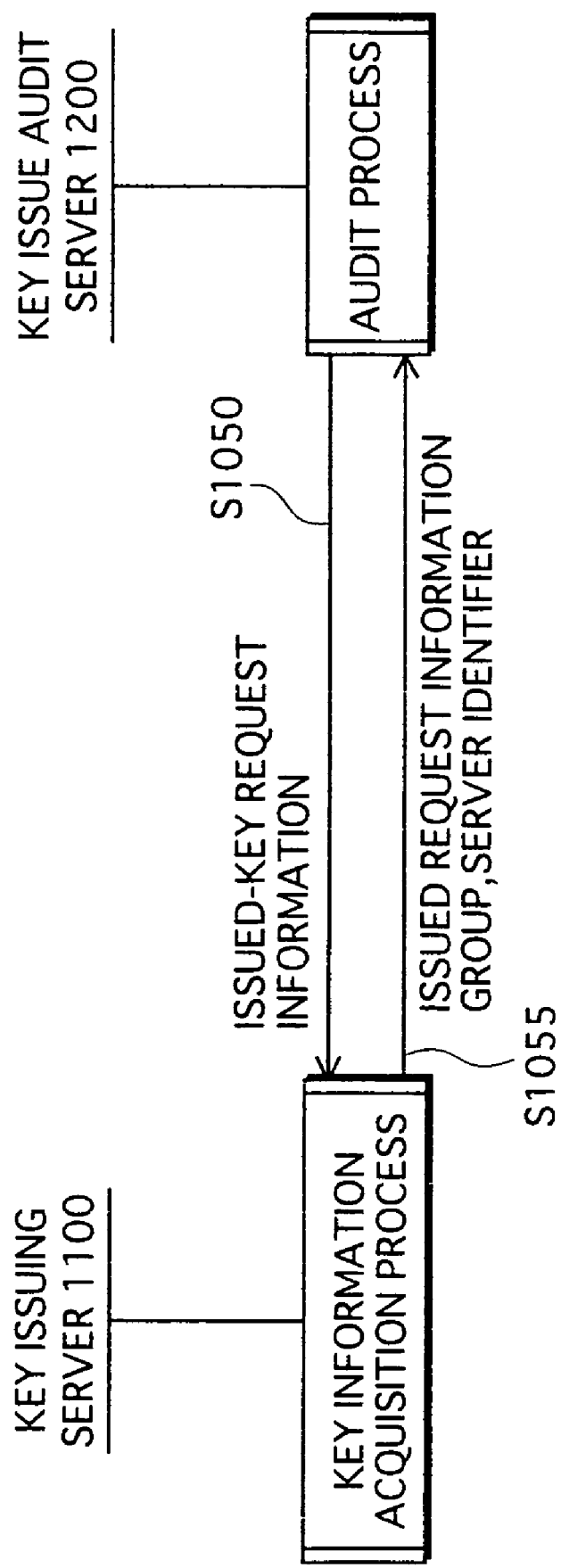
FIG. 32 is a flow diagram illustrating an outline of operation of the key issuing system 2 at key audit.
Figure 34:
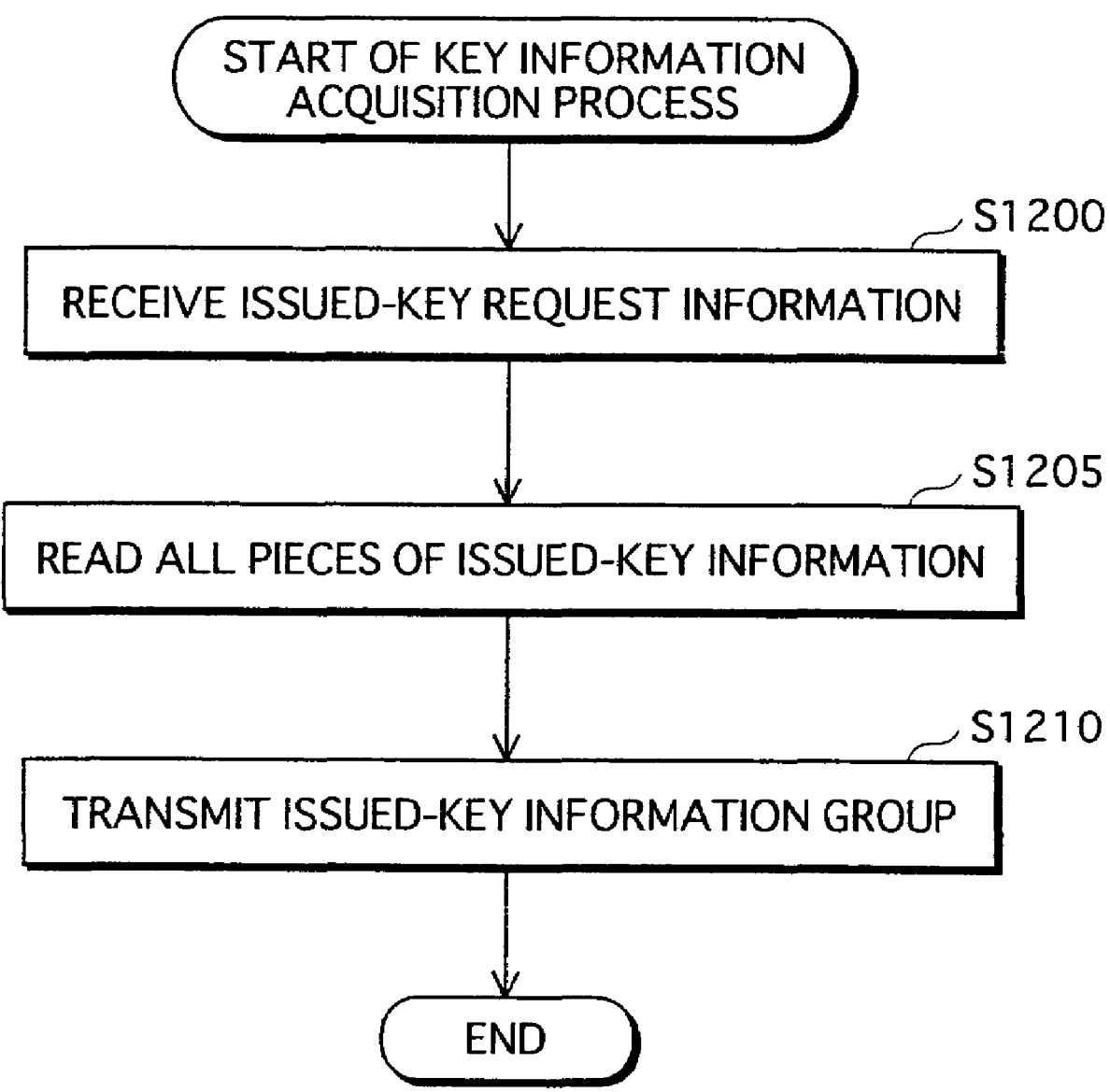
FIG. 34 is a flow diagram illustrating operation of a key information acquisition process in the key issuing system 2.

Here is described the operation of the key information acquisition process shown in FIG. 32; using a flow diagram of FIG. 34.

Receiving the issued request information from the key issue audit server 1200 via the reception unit 1120, the control unit 1114 of the key issuing server 1100 outputs a key information acquisition order to the information acquisition unit 1119 (Step S1200).

Receiving the key information acquisition order from the control unit 1114, the information acquisition unit 1119 of the key issuing server 1100 reads all the pieces of issued-key information from the issued-key information repository 1124 (Step S1205).

The information acquisition unit 1119 reads the server identifier from the server identifier storage area 1130 of the control unit 1114, and transmits the read issued-key information group and server identifier to the key issue audit server-1200 via the transmission unit 1121 (Step S1210).

2.5.5 Audit Process

Figure 35:
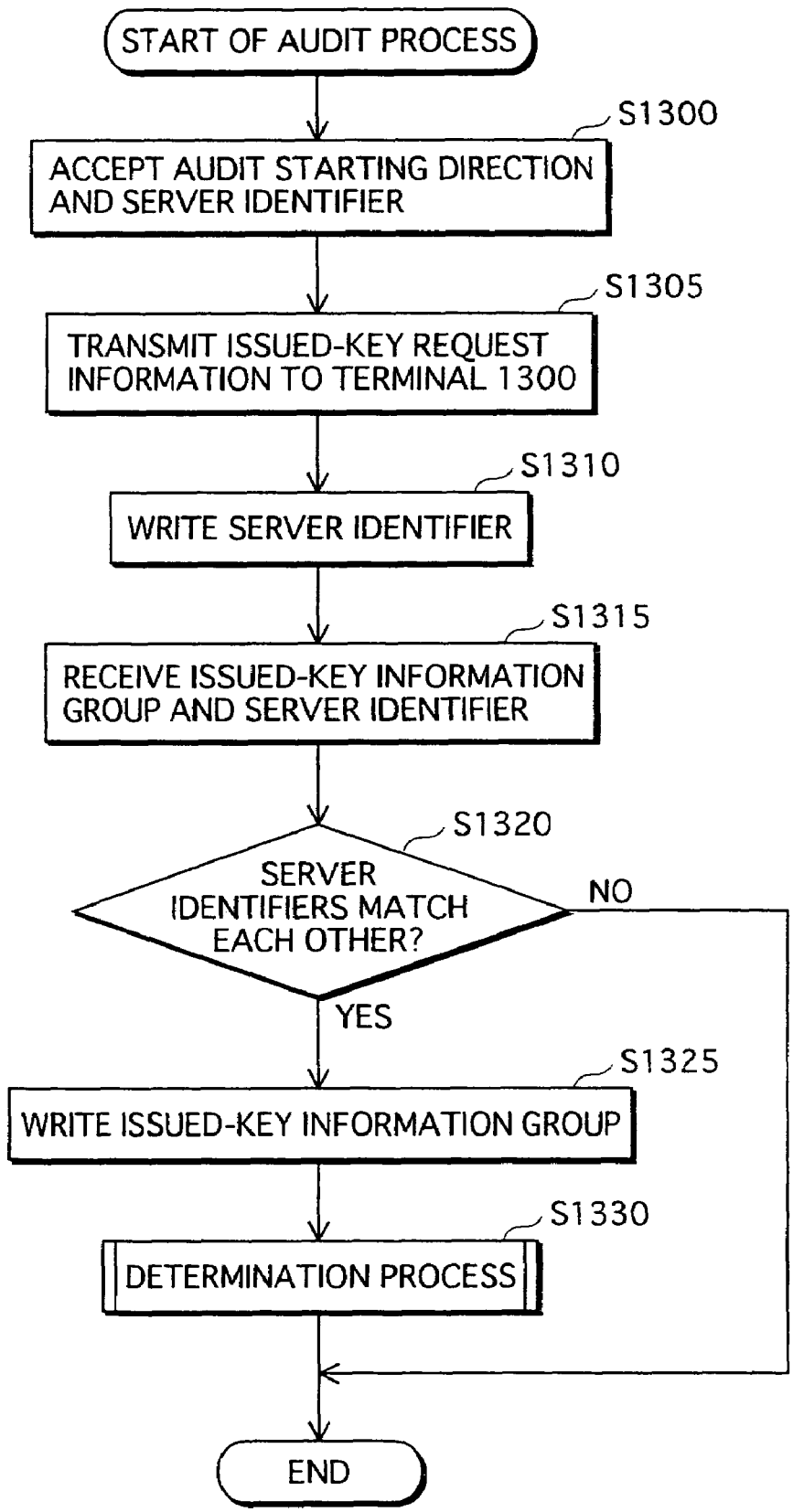
FIG. 35 is a flow diagram illustrating operation of an audit process in the key issuing system 2.

Here is described the operation of the audit process shown in FIG. 32, using a flow diagram of FIG. 35.

Accepting an audit start direction and a server identifier of an audit-target key issuing server by a user operation, the accepting unit 1214 of the key issue audit server 1200 outputs an audit start order and the server identifier to the control unit 1212 (Step S1300).

Receiving the audit start order to start auditing the public key and the audit-target server identifier (here, it is "SID") from the accepting unit 1214, the control unit 1212 transmits issued-key request information to the key issuing server 1100 corresponding to the server identifier via the transmission unit 1217 (Step S1305).

The control unit 1212 writes the server identifier received from the accepting unit 1214 to the server information storage area 1220 (Step S1310).

The control unit 1212 receives one or more pieces of issued-key information and the server identifier from the key issuing server 1100.via the reception unit 217 (Step S1315).

The control unit 1212 judges whether the received server identifier matches the server identifier stored in the server information storage area (Step S1320).

When determining that they match each other ("YES" in Step S1320), the control unit 1212 writes the received one or more pieces of issued-key information to the issued-key information repository 1211, and outputs an audit start order and the received server identifier to the issue public key determination unit 1213 (Step S1325).

The issue public key determination unit 1213 examines the validity of the public key in the determination process, and displays the result on the monitor 1250.

When determining that they do not match each other ("NO" in Step S1320), the control unit 1212 terminates the process.

2.5.6 Determination Process

Figure 36:
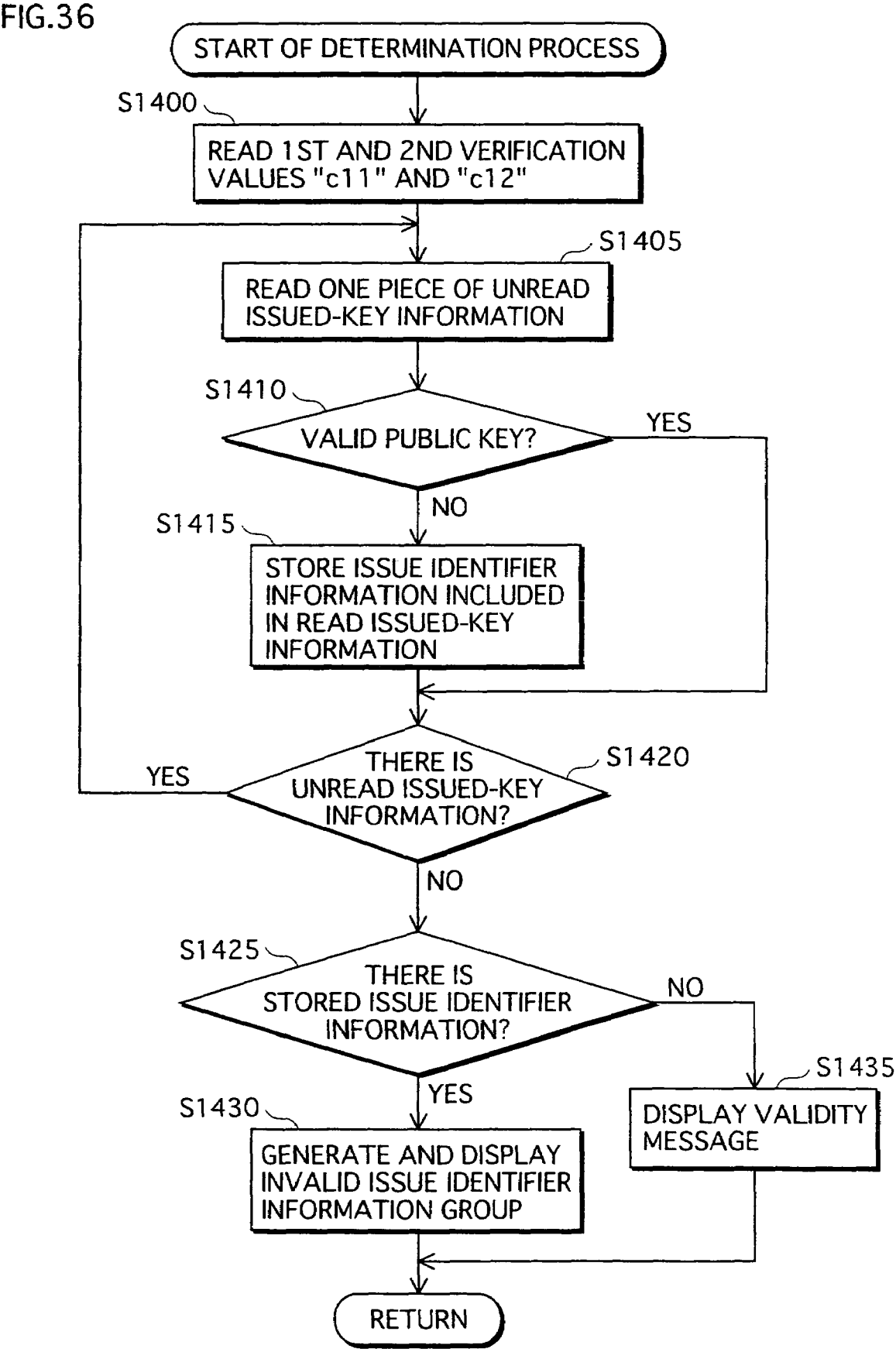
FIG. 36 is a flow diagram illustrating operation of a determination process.

Here is described the determination process shown in FIG. 35, using a flow diagram of FIG. 36.

Receiving the audit start order and the server identifier from the control unit 1212, the issue public key determination unit 1213 reads corresponding 1st and 2nd verification values "c11" and "c12" from the determination information repository 1210, using the received server identifier (Step S1400).

The issue public key determination unit 1213 reads one piece of unread issued-key information from the issued-key information repository 1211 (Step S1405).

The issue public key determination unit 1213 examines whether the public key "PK" has been generated using the issue identifier information "IDI" by using the public key "PK" and the issue identifier information "IDI" included in the read piece of issued-key information as well as the 1st and 2nd verification values "c11" and "c12" (Step S1410). Note that, since the determination method is the same as in the first embodiment, the description is left out here.

When determining that "n−(c11×c12)" is not divisible by "IDI"—i.e. when determining that the public key is invalid ("NO" in Step S1410), the issue public key determination unit 1213 temporarily stores the read issue identifier information "IDI" (Step S1415).

When determining that "n−(c11×c12)" is divisible by "IDI"—i.e. when determining that the public key is valid ("YES" in Step S1410), the issue public key determination unit 1213 omits Step S1415.

The issue public key determination unit 1213 judges whether there is unread issued-key information (Step S1420). When the issue public key determination unit 1213 determines that there is unread issued information ("YES" in Step S1420), the process returns to Step S1405.

When determining that there is no unread issued-key information ("NO" in Step S1420), the issue public key determination unit 1213 judges whether there is temporarily stored issue identifier information (Step S1425).

When determining that there is temporarily stored issue identifier information ("YES" in Step S1425), the issue public key determination unit 1213 generates an invalid issue identifier information group by linking all the stored issue identifiers, and displays the generated invalid issue identifier information group on the monitor 1250, via the audit result output unit 1215 (Step S1430).

When determining that there is no temporarily stored issue identifier information ("NO" in Step S1425), the issue public key determination unit 1213 displays, on the monitor 1250 via the audit result output unit 1215, a validity message indicating that the validity of all the public keys-is determined (Step S1435).

3. Summary

Figure 37:
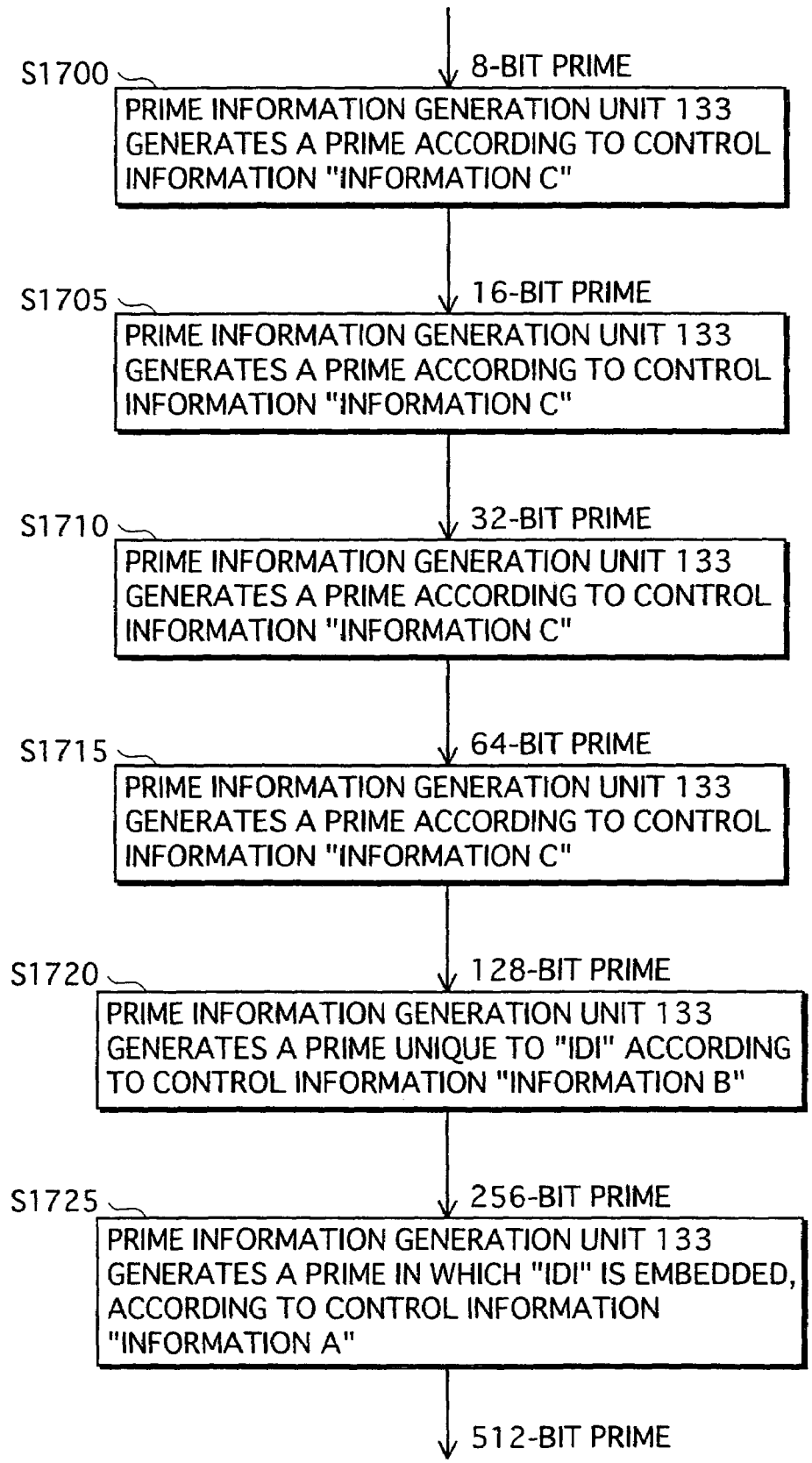
FIG. 37 shows operation for generating a 512-bit prime from an 8-bit prime.

The prime information generation unit 133 of the prime generation unit 116 in the key issuing server 100 shown in the above first embodiment generates a 512-bit prime from an 8-bit prime by repeating the operation illustrated in FIG. 37.

The prime information generation unit 133 generates a 16-bit prime from an 8-bit prime (Step S1700), and generates a 32-bit prime from the generated 16-bit prime (Step S1705). Subsequently, in a similar fashion, the prime information generation unit 133 in turn generates a 64-bit prime from the 32-bit prime, a 128-bit prime from the 64-bit prime, and a 256-bit prime from the 128-bit prime (Steps S1710, S1715 and S1720). Then, at the end, a 516-bit prime is generated from the generated 256-bit prime (Step S1725).

Up to the generation of a 128-bit prime starting from an 8-bit prime, the prime generation unit 116 generates those primes in a generation method similar to the conventional technique, according to the control information "Information C".

In Step S1720, the prime generation unit 116 generates a 256-bit prime using the injection function "f" according to the control information "Information B" so that the generated prime is to be unique. to the issue identifier information "IDI".

In Step S1725, the prime generation unit 116 generates a 512-bit prime in which the issue identifier information "IDI" is embedded, according to the control information "Information A" so that the validity of the generated prime can be determined.

Thus, by using the injection function "f", the key issuing server 100 is capable of generating a different private key and public key with respect to each terminal. In addition, when a 512-bit prime is generated from a 256-bit prime in the key issuing server 100, the issue identifier information "IDI" is embedded in the generated prime. As a result, the certificate issuing server 200 is capable of determining the validity of the public key, using the generated public key and the issue identifier information.

Note that, also in the second embodiment, the key issuing server 1100 can generate a different private key and public key for each terminal by using the injection function "f", as described above. Additionally, when a 512-bit prime is generated from a 256-bit prime in the key issuing server 1100, the issue identifier information "IDI" is embedded in the generated prime. As a result, the key issuing audit server 1200 is capable of determining the validity of the public key, using the generated public key and the issue identifier information.

According to the first embodiment, the key issuing server 100 achieves, by using the injection function "f", generating primes whose disparity is assured without a comparison between them, even when the prime generation is performed multiple times.

Accordingly, it can be proved, without the need for comparison, that primes generated multiple times do not conform to each other According to the first embodiment above, as a result that the key issuing server 100 embeds the issue identifier information "IDI" in the prime to be generated, the certificate issuing server 200 is capable of determining whether a key has been properly issued by examining the generated prime being divisible by the issue identifier information "IDI" or not.

There is conventionally a key issuing system having a single key issuing server. However, if the number of users increases, the computational effort also increases due to performing exponentiation multiple times for the prime generation, and as a result, a longer time is required for the computation. Given this factor, it is sometimes the case that the computational effort is dispersed by providing multiple key issuing servers and making each handle key issuing. However, as to the conventional key issuing system having multiple key issuing servers, two users, for example, may have the same prime as their keys. In such a situation, the safety of the encryption is significantly reduced. For example, assume that the primes of User A are pA1 and pA2, and nA=pA1×pA2 while the primes of User B are pB1 and pB2, and nB=pB1×pB2. At this point, if pA1=pB1, User A can find that one of the User B's primes is equal to pA1 by calculating GCD (pA1, nB). As a result, by calculating nB/pA1, User A can also obtain pB2. The safety of an RSA encryption system is based on prime factorization, and therefore, the decoding is very easy once a prime factor is revealed. Therefore, User A is capable of decrypting encrypted texts using the public key of User B. In like fashion, User B can decrypt encrypted texts using the User A's public key.

In the conventional technique, there is a possibility that primes conform to each other when the prime generation is performed multiple times, and as a result, the safety of the encryption is significantly reduced. In order not to reduce the safety, whether the primes conform to each other or not can be determined by comparing an issued key with a previously-issued prime (a private key). However, in a conventional public key encryption system, although a public key after being issued is managed at the key issuing server, a private key is often deleted since being highly confidential. Therefore, it is necessary to newly manage the issued prime (i.e. private key). Furthermore, when the number of issued primes reaches around a billion, it takes an awfully long time to perform the comparison, which is impractical.

Additionally, when multiple key issuing servers perform key issues, it is necessary that the individual key issuing servers have to check each other's issued primes—i.e. private key—so that the primes issued by all the key issuing servers do not conform to one another. There is no problem when the individual key issuing servers have a trusting relationship with each other; however, it .is often the case that key issuing servers are individually set by different companies, and therefore, the relationships cannot always be trusted. Furthermore, even if key issuing servers maintain trusting relationships with each other, the volume of communication between each key issuing server becomes large since the database of the private key in each key issuing server is accessed in every key issue. Thus, it is also impractical that the individual key issuing servers check each other's issued primes.

By using the key issuing server of the present invention, it can be proved, without the need for comparison, that primes generated multiple times do not conform to each other, even when the prime generation is performed multiple times.

3.1 Modifications

The present invention has been described based on the first and second embodiments and Modified Examples 1, 2 and 3 of the prime generation; however, it is matter of course that the present invention is not confined to these. The following cases are also within the scope of the present invention.

(1) The issue identifier information "IDI" above is made up of a join of a server identifier, a terminal identifier, and the number "1"; however, the present invention is not limited to this. "IDI" may be generated using a server identifier and an issue identifier "PID" generated by a counter. Here, the issue identifier "PID" is an odd number assigned in the order of issue starting from 1. Here, the identifier generation unit 115 becomes capable of readily generating a different prime for each time by increasing the issue identifier "PID" by "2" every time of a prime issue (generation).

(2) An injection function is applied above when a 256-bit prime is generated from a 128-bit prime; however, the present invention is not confined to this. The application of the injection function can be made at any step before the issue identifier information is embedded.

For example, the injection function may be applied when a 16-bit prime is generated from an 8-bit prime. Alternatively, the injection function may be applied when a 32-bit prime is generated from a 16-bit prime. In a similar fashion, the injection function maybe applied when a 64-bit prime is generated from a 32-bit prime, or when a 128-bit prime is generated from a 64-bit prime.

Note however that the number of bits of the issue identifier "IDI" is smaller than the number of bits of the prime "q" used for input, and the number of bits of the random number "R1" is (lenq−lenIDI−1) bits while the number of bits of the number "R" is (lenq−1) bits.

(3) The prime generation unit 116 of the first embodiment may be a single prime generating apparatus. Here, when the issue identifier information "IDI" and its bit size "lenIDI" are given, the prime generating apparatus generates a 512-bit prime from the given "IDI" and bit size "lenIDI" together with an 8-bit prime stored in advance.

Additionally, in the same way, the prime generation unit 1116 of the second embodiment may be formed as a single prime generating apparatus.

(4) The prime generation unit 116 of the first embodiment may be composed of: a 1st prime generation unit for generating a 128-bit prime from an 8-bit prime stored in advance; a 2nd prime generation unit for generating a 512-bit prime from a 128-bit prime. Or alternatively, the 1st and 2nd prime generation units may be formed by individual prime generating apparatuses.

Figure 38:
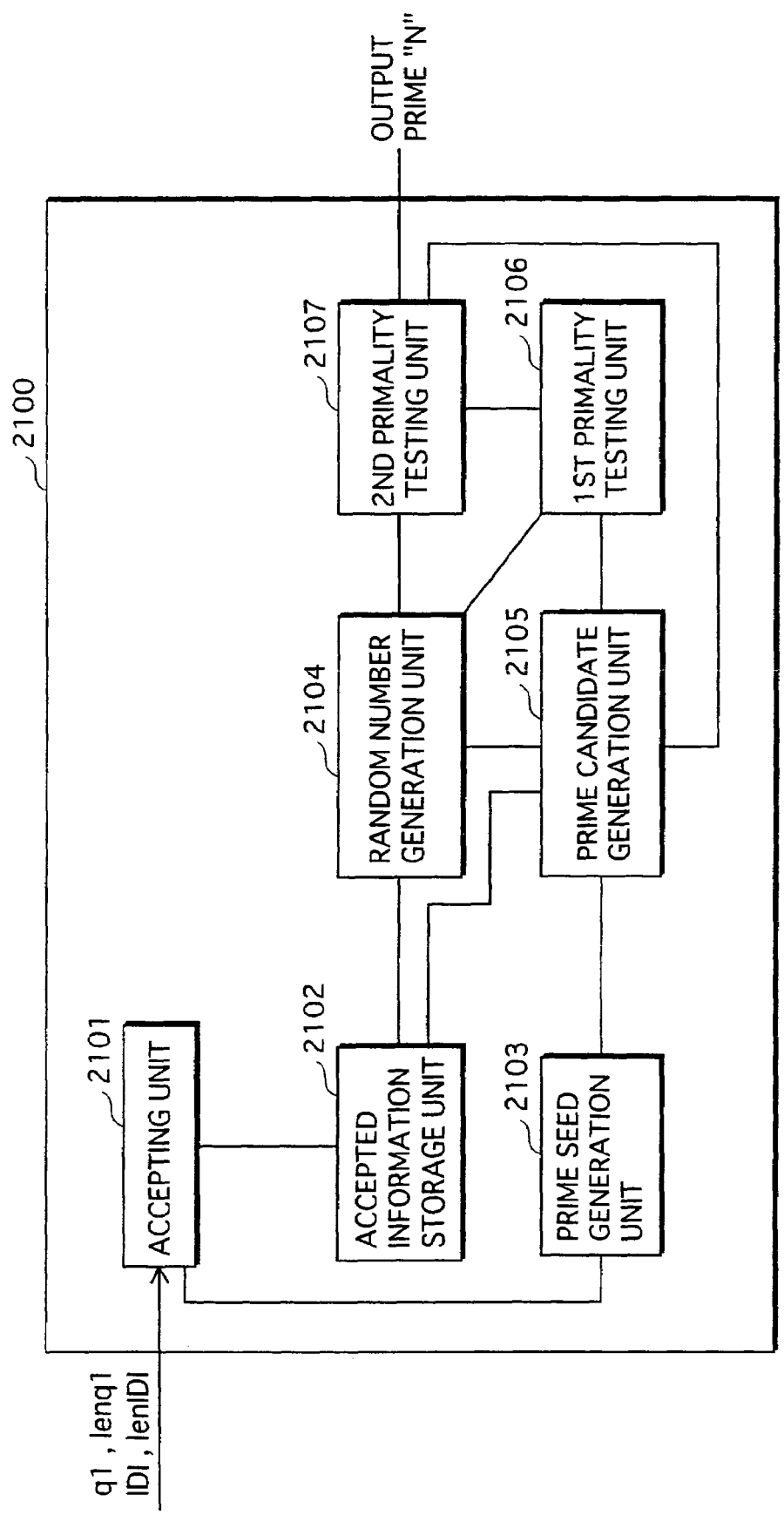
FIG. 38 is a block diagram illustrating a configuration of a prime generation apparatus 2100.

The 1st prime generation unit generates a 128-bit prime from an 8-bit prime in a manner similar to the conventional technique. The conventional technique is described in detail in Patent Reference 1 and Non-Patent Reference 3;

An example of the structure of the 2nd prime generation unit is illustrated in FIG. 38. The following description is given, assuming that the 2nd prime generation unit is a single prime generating apparatus 2100. When the prime "q1", the prime's bit size "lenq1" (here, 128 bits), the issue identifier information "IDI", and the bit size "lenIDI" are given, the prime generating apparatus 2100 outputs a prime "N" of (4×lenq1) bits. Note that the prime generating apparatus 2100 generates the prime "N" without using the 1st and 2nd verification values of the first embodiment.

The prime generating apparatus 2100, as shown in FIG. 38, comprises: an accepting unit 2101; an accepted information storage unit 2102; a prime seed generation unit 2103; a random number generation unit 2104; a prime candidate generation unit 2105; a 1st primality testing unit 2106; and a 2nd primality testing unit 2107.

The prime generating apparatus 2100 is, specifically speaking, a computer system composed of a microprocessor, ROM, RAM, a hard drive unit, a display unit, a keyboard, a mouse, and the like. A computer program is stored in the RAM or the hard drive unit. The microprocessor operates according to the computer program, and thereby the key issue audit server 2100 achieves the function.

<Accepted Information Storage Unit 2102>

The accepted information storage unit 2102 has an area to store the prime "q1", the bit size "lenq1" of the prime "q1", the issue identifier information "IDI", and the bit size "lenIDI" of the issue identifier information, all of which are given at the generation of the prime "N".

<Accepting Unit 2101>

The accepting unit 2101 accepts the prime "q1", the bit size "lenq1 (e.g. 128 bits)" of the prime "q1", the issue identifier information "IDI", and the bit size "lenIDI" of "IDI" from outside (e.g. the 1st prime generation unit shown above), and writes the accepted prime "q1", bit size "lenq1 (e.g. 128 bits)", issue identifier information "IDI", and bit size "lenIDI" of "IDI" to the accepted information storage unit 2102.

The accepting unit 2101 outputs the accepted, individual information to the prime seed generation unit 2103.

<Prime Seed Generation Unit 2103>

The prime seed generation unit 2103 performs the same operation as one performed by the prime generation unit 116 of the first embodiment when the control information is "Information B", and therefore, the description is omitted. Here, assume that a 256-bit prime "q2" is generated from a 128-bit prime "q1".

The prime seed generation unit 2103 outputs the generated prime "q2" to the prime candidate generation unit 2105.

<Random Number Generation Unit 2104>

Receiving a 1st generation direction from the prime candidate generation unit 2105, the random number generation unit 2104 reads the bit size "lenq1" of the prime "q1" and the bit sizes "lenIDI" of the issue identifier information "IDI" from the accepted information storage unit 2102.

The random number generation unit 2104 generates a random number "R1" of (2×lenq1−lenIDI−1) bits, using the read bit size "lenq1" and "lenIDI". Here, the first bit of the random number "RI" is 1.

The random number generation unit 2104 outputs the generated random number "R1" to the prime candidate generation unit 2105.

In addition, accepting a 2nd generation direction indicating the regeneration of a random number from either one of the 1st and 2nd primality testing units 2106 and 2107, the random number generation unit 2104 reads each bit size, and then performs the above operation.

<Prime Candidate Generation Unit 2105>

The prime candidate generation unit 2105 has a generated information storage area for storing a generated number.

Receiving the prime "q2" from the prime seed generation unit 2103, the prime candidate generation unit 2105 outputs the 1st generation direction to the random number generation unit 2104.

Receiving the random number "R1" from the random number generation unit 2104, the prime candidate generation unit 2105 reads the issue identifier information "IDI" stored in the accepted information storage unit 2102.

The prime candidate generation unit 2105 generates a number "R=IDI×R1" and a number "N=2×R×q2+1", using the prime "q2" received from the prime seed generation unit 2103, the issue identifier information "IDI" read from the accepted information storage unit 2102, and the random number "R1" received from the random number generation unit 2104.

The prime candidate generation unit 2105 reads the bit size "lenq1" of the prime "q1" from the accepted information storage unit 2102, and judges whether the bit size of the generated number "N" is "4×lenq1".

When determining that it is "4×lenq1", the prime candidate generation unit 2105 outputs the generated number "N" to the 1st primality testing unit 2106, and stores the generated number "R" in the generated information storage area.

When determining that it is not "4×lenq1", the prime candidate generation unit 2105 multiplies the random number "R1" received from the random number generation unit 2104 by 2, and makes the result "R1" with which the prime candidate generation unit 2105 conducts the above operation once again to generate the numbers "R" and "N".

The prime candidate generation unit 2105 repeats the above operation until the bit size of the number "N" becomes "4×lenq1".

<1st Primality Testing Unit 2106>

The 1st primality testing unit 2106 performs the same operation as one performed by the 1st primality testing unit 143 shown in the first embodiment, and therefore the description is left out here.

<2nd primality testing unit 2107>

The 2nd primality testing unit 2107 performs the same operation as one performed by the 2nd primality testing unit 144 shown in the first embodiment, and therefore the description is left out here.

Note that the 2nd primality testing unit 2107 outputs the generated number "N" as a prime "N" when determining that the generated number "N" is a prime.

<Operation of Prime Generating Apparatus 2100>

The operation of the prime generating apparatus 2100 is described next.

(Prime Generation Process)

Figure 39:
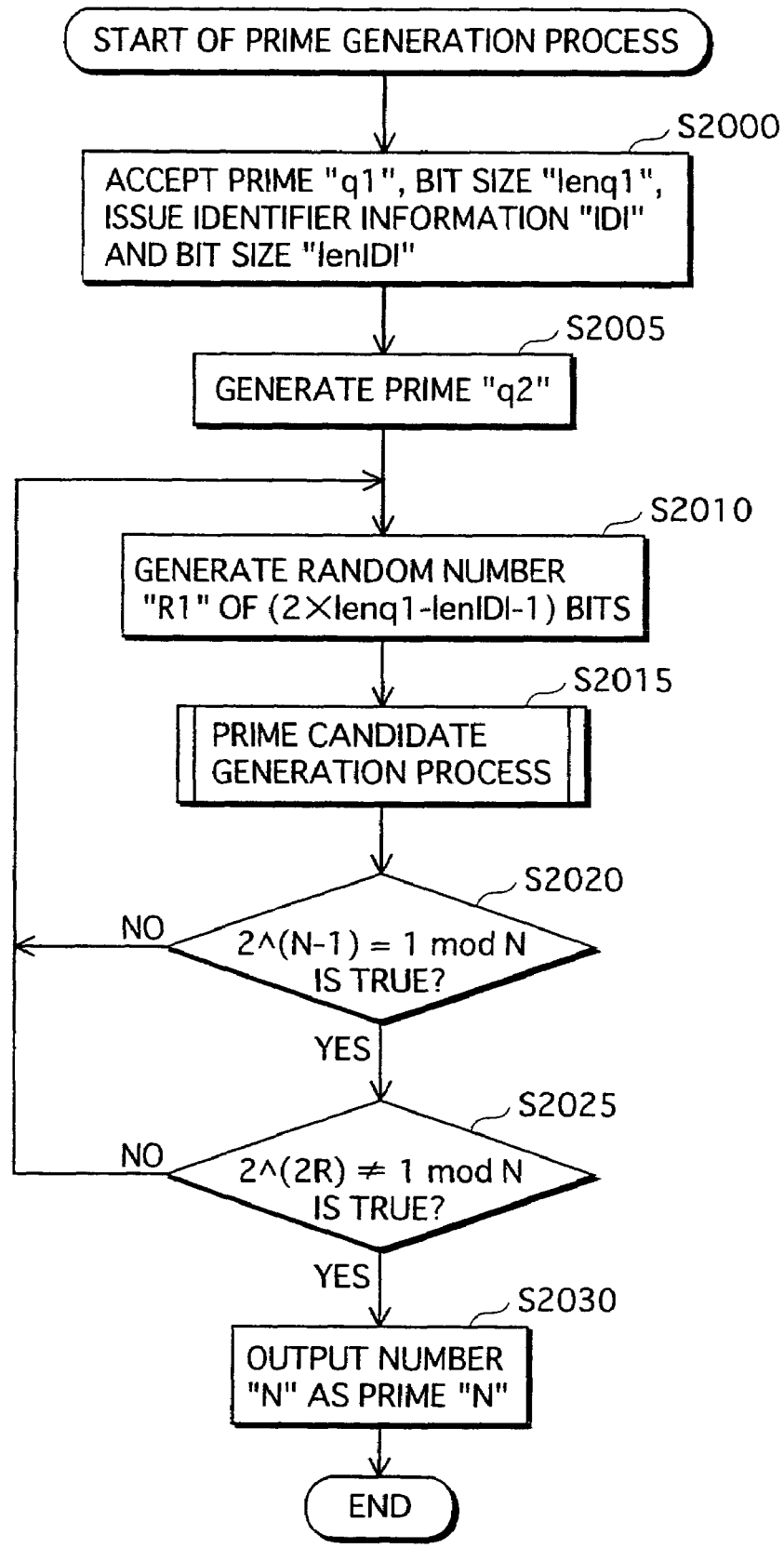
FIG. 39 is a flow diagram illustrating operation of a prime generation process.

Here is described the operation of the prime generation process conducted in the prime generating apparatus 2100, using a flow diagram illustrated in FIG. 39.

The prime generating apparatus 2100 accepts, in the accepting unit 2101, the prime "q1", the bit size "lenq1" of the prime "q1", the issue identifier information "IDI", and the bit size "lenIDI" of the issue identifier information, and writes the accepted individual information to the accepted information storage unit 2102 (Step S2000).

The prime generating apparatus 2100 generates, in the prime seed generation unit 2103, a prime "q2" using the individual information accepted in Step S2000 (Step S2005).

The prime generating apparatus 2100 generates, in the random number generation unit 2104, a random number "R1" of (2×lenq1−lenIDI−1) bits using the bit sizes "lenq1" and "lenIDI" accepted in Step S2000 (Step S2010). Here, the first bit of the random number "R1" is 1.

The prime generating apparatus 2100 generates the numbers "R" and "N" by performing, in the prime candidate generation unit 2105, the prime candidate generation process, using the issue identifier information "IDI" accepted in Step S2000, the prime "q2" generated in Step S2005, and the random number "R1" generated in Step S2010 (Step S2015). The prime generating apparatus 2100 judges, in the 1st primality testing unit 2106, whether the above-mentioned equation (Eq. 1) is true by using the number "N" generated in Step S2015 (Step S2020).

When determining that the equation (Eq. 1) is true ("YES" in Step S2020), the prime generating apparatus 2100 judges, in the. 2nd primality testing unit 2107, whether the above-mentioned equation (Eq. 2) is true by using the numbers "R" and "N" generated in Step S2015 (Step S2025).

When determining that the equation (Eq. 2) is true ("YES" in Step S2025), the prime generating apparatus 2100 outputs the number "N" as a prime "N", and terminates the process (Step S2030).

When determining that the equation (Eq. 1) is not true ("NO" in Step S2020) and that the equation (Eq. 2) is also not true ("NO" in Step S2025), the prime generating apparatus 2100 returns to Step S2010, and performs the process once again.

(Prime Candidate Generation Process)

Figure 40:
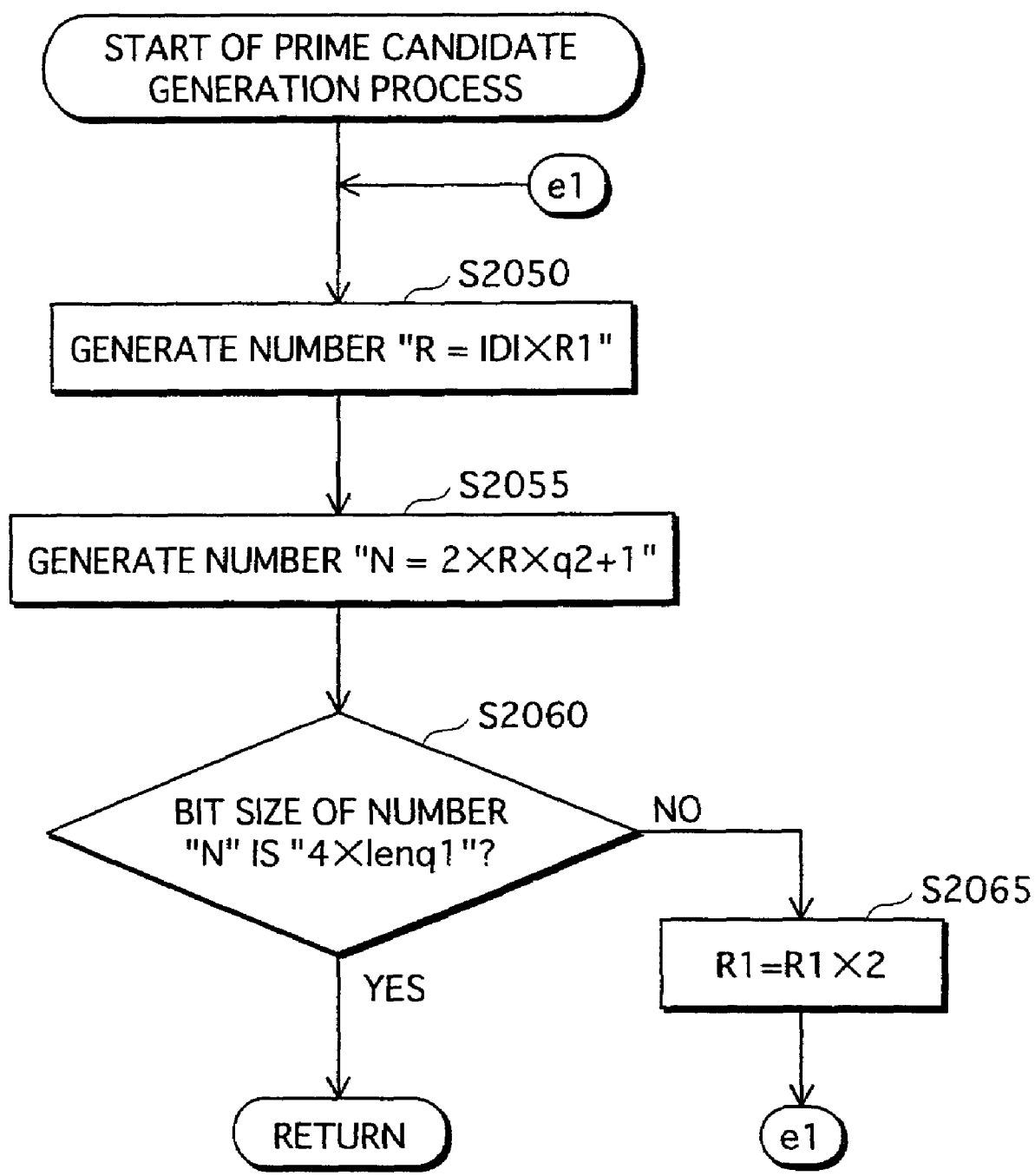
FIG. 40 is a flow diagram illustrating operation of a prime candidate generation process.

Here is described the prime candidate generation process conducted in Step S2015 of the prime generation process, using a flow diagram illustrated in FIG. 40.

The prime candidate generation unit 2105 generates the number "R", using the issue identifier information "IDI" accepted in Step S2000 of the prime generation process and the random number "R1" generated in Step S2010 (Step S2050). Here, the number "R" is found by "R=IDI×R1".

The prime candidate generation unit 2105 generates the number "N", using the prime "q2" generated in Step S2005 of the prime generation process and the number "R" generated in Step S2050 (Step S2055). Here, the number "N" is found by "N=2×R×q2+1".

The prime candidate generation unit 2105 judges whether the bit size of the generated number "N" is "4×lenq1" (Step S2060).

When determining that it is "4×lenq1" ("YES" in Step S2060), the process is finished. When determining that it is not "4×lenq1" ("NO" in Step S2060), the prime candidate generation unit 2105 multiplies the random number "R1" generated in Step S2010 of the prime generation process by 2, and makes the result "R1", and the process returns to Step S2050 (Step S2065).

(Additional Particulars)

The bit size of the prime which is the generated private key is here 512 bits, however, the present invention is not limited to this. It may be 1024 bits, or 2048 bits. In addition, the prime generated in the above 1st prime generation unit is also not confined to 128 bits.

(5) The above-mentioned prime seed generation unit 2103 may be formed as a single prime generating apparatus. The following describes the prime generating apparatus 2200 in such a case. When the prime "q", the bit size "lenq" of the prime "q" (here, 128 bits", the issue identifier information "IDI", and the bit size "lenIDI" of "IDI" are given, the prime generating apparatus 2200 outputs the prime "N" of (2×lenq) bits.

Figure 41:
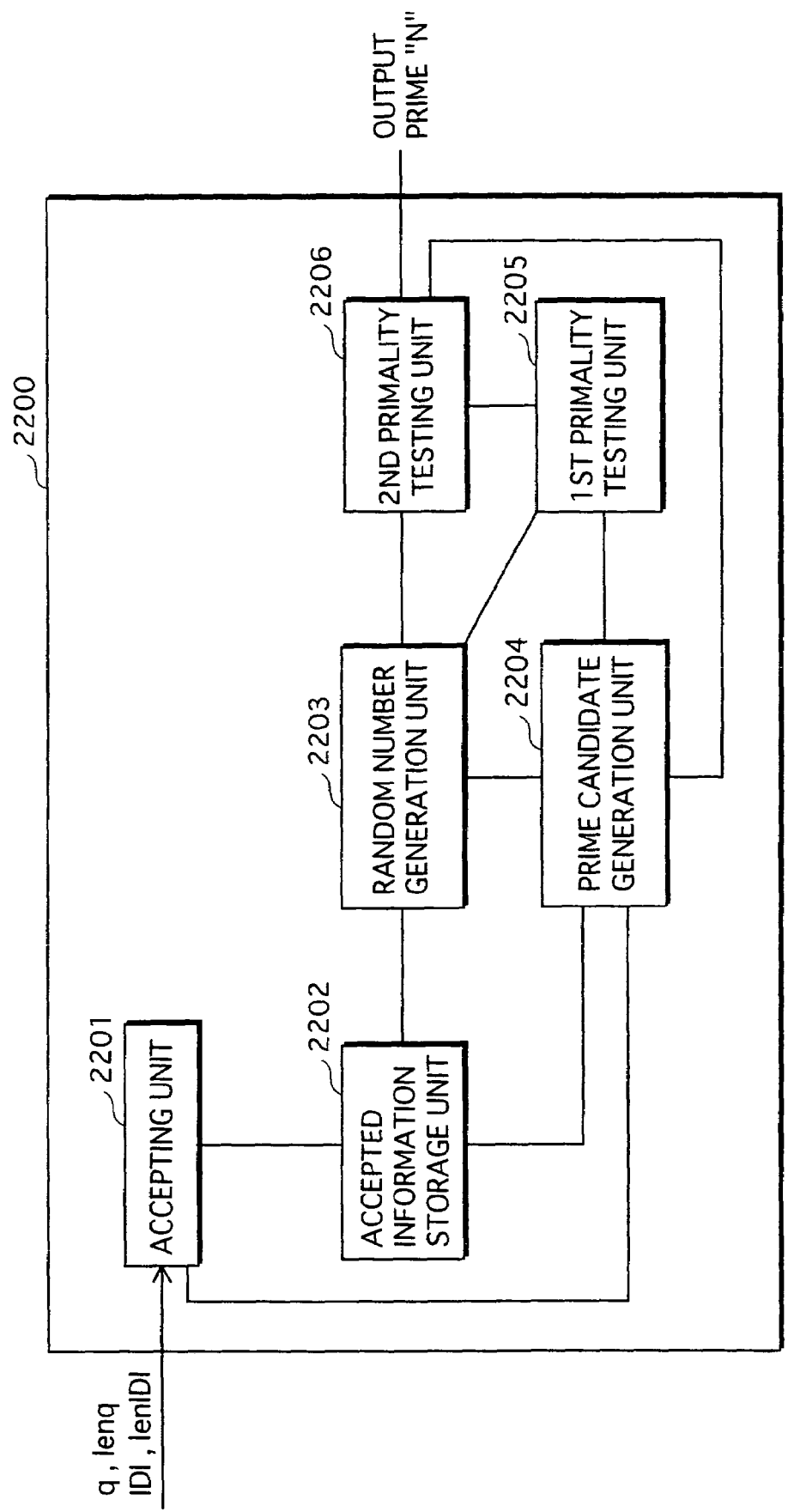
FIG. 41 is a block diagram illustrating a configuration of a prime generating apparatus 2200.

The prime generating apparatus 2200, as shown in FIG. 41, comprises: an accepting unit 2201; an accepted information storage unit 2202; a random number generation unit 2203; a prime candidate generation unit 2204; a 1st primality testing unit 2205; and a 2nd primality testing unit 2206.

The prime generating apparatus 2200 is, specifically speaking, a computer system composed of a microprocessor, ROM, RAM, a hard drive unit, a display unit, a keyboard, a mouse, and the like. A computer program is stored in the RAM or the hard drive unit. The microprocessor operates according to the computer program, and thereby the key issue audit server 2200 achieves the function.

<Accepted Information Storage Unit 2202>

The accepted information storage unit 2202 has an area to store the prime "q", the bit size "lenq" of the prime "q", the issue identifier information "IDI", and the bit size "lenIDI" of the issue identifier information, all of which are given at the generation of the prime "N".

<Accepting Unit 2201>

The accepting unit 2201 accepts the prime "q", the bit size "lenq" of the prime "q", the issue identifier information "IDI", and the issue identifier information's bit size "lenIDI" from outside (e.g., the 1st prime generation unit shown above), and writes the accepted prime "q", bit size "lenq", issue identifier information "IDI", and bit size "lenIDI" of "IDI" to the accepted information storage unit 2202.

The accepting unit 2201 outputs a start direction indicating to start the process to the prime candidate generation unit 2204.

<Random Number Generation Unit 2203>

Receiving a 1st generation direction indicating to generate a random number from the prime candidate generation unit 2204, the random number generation unit 2203 reads the bit size "lenq" of the prime "q" and the bit size "lenIDI" of "IDI" from the accepted information storage 2202.

The random number generation unit 2203 generates a random number "R1" of (lenq-lenIDI-1) bits, using the read bit sizes "lenq" and "lenIDI". Here, the first bit of the random number "R1" is 1. The method for generating a random number is described in detail in Non-Patent Reference 2.

The random number generation unit 2203 outputs the generated random number "R1" to the prime candidate generation unit 2204.

In addition, accepting a 2nd generation direction indicating to regenerate a random number from either one of the 1st and 2nd primality testing units 2205 and 2206, the random number generation unit 2203 reads each bit size, and then performs the above operation.

<Prime Candidate Generation Unit 2204>

The prime candidate generation unit 2204 has a function storage area to store in advance a function "f", which is an injection, and a generated information storage area to store a number generated by using the function "f".

Receiving a start direction from the accepting unit 2201, the prime candidate generation unit 2204 outputs the 1st generation direction to the random number generation unit 2203.

Receiving the random number "R1" from the random number generation unit 2203, the prime candidate generation unit 2204 reads the prime "q" and the issue identifier information "IDI" stored in the accepted information storage unit 2202.

The prime candidate generation unit 2204 generates a number "R=f(IDI∥R1)" and a number "N=2×R×q+1", using the function "f" stored in the function storage area, the read prime "q" and issue identifier information "IDI", and the random number "R1" received from the random number generation unit 2203.

The prime candidate generation unit 2204 judges whether the bit size of the generated number "N" is "2×lenq".

When determining that it is "2×lenq", the prime candidate generation unit 2204 outputs the generated number "N" to the 1st primality testing unit 2205, and stores the generated number "R" in the generated information storage area.

When determining that it is not "2×lenq", the prime candidate generation unit 2204 multiplies the random number "R1" received from the random number generation unit 2203 by 2, and makes the result "R1" with which the prime candidate generation unit 2204 conducts the above operation once again to generate the numbers "R" and "N" satisfying the above equations.

The prime candidate generation unit 2204 repeats the above operation until the bit size of the number "N" becomes "2×lenq".

<1st Primality Testing Unit 2205>

The 1st primality testing unit 2205 performs the same operation as one performed by the 1st primality testing unit 143 shown in the first embodiment, and therefore the description is left out here.

<2nd Primality Testing Unit 2206>

The 2nd primality testing unit 2206 performs the same operation as one performed by the 2nd primality testing unit 144 shown in the first embodiment, and therefore the description is left out here.

Note that the 2nd primality testing unit 2206 outputs the generated number "N" as a prime "N" when determining that the generated number "N" is a prime.

<Operation of Prime Generating Apparatus 2200>

The operation of the prime generating apparatus 2200 is described next.

(Prime Generation Process)

The prime generation process conducted in the prime generating apparatus 2200 is described here, focusing only on modified points, with the use of the flow diagram illustrated in FIG. 39.

The prime generating apparatus 2200 accepts, in Step S2000, the prime "q", the bit size "lenq" of the prime "q", the issue identifier information "IDI", and the bit size "lenIDI" of the issue identifier information according to user's operation, and writes the accepted individual information to the accepted information storage unit 2202.

After executing Step S2000 which is modified as above, the prime generating apparatus 2200 omits Step S2005, and executes Step S2010 modified as follows. The prime generating apparatus 2200 executes Step S2010 which is modified to generate the random number "R1" of (lenq-lenIDI-1) bits.

Since the following operational flow is the same as FIG. 39, the description is left out.

(Prime Candidate Generation Process)

The prime candidate generation process is described here, focusing only on modified points, with the use of the flow diagram illustrated in FIG. 40.

First, Step S2050 is modified so as to generate a number "R=f(IDI∥R1)".

Next, Step S2055 is modified so as to generate a number "N=2×R×q+1".

Since the following operational flow is the same as FIG. 40, the description is left out.

(6) The prime generation unit 116C of Modified Example 3 of the prime generation may be composed of: a 1st prime generation unit that generates a 256-bit prime from an 8-bit prime stored in advance; and a 2nd prime generation unit that generates a 512-bit prime from a 256-bit prime. Additionally, the 1st and 2nd prime generation units may be individual prime generating apparatuses.

The 1st prime generation unit generates a 256-bit prime from an 8-bit prime in a method similar to the conventional technique.

Figure 42:
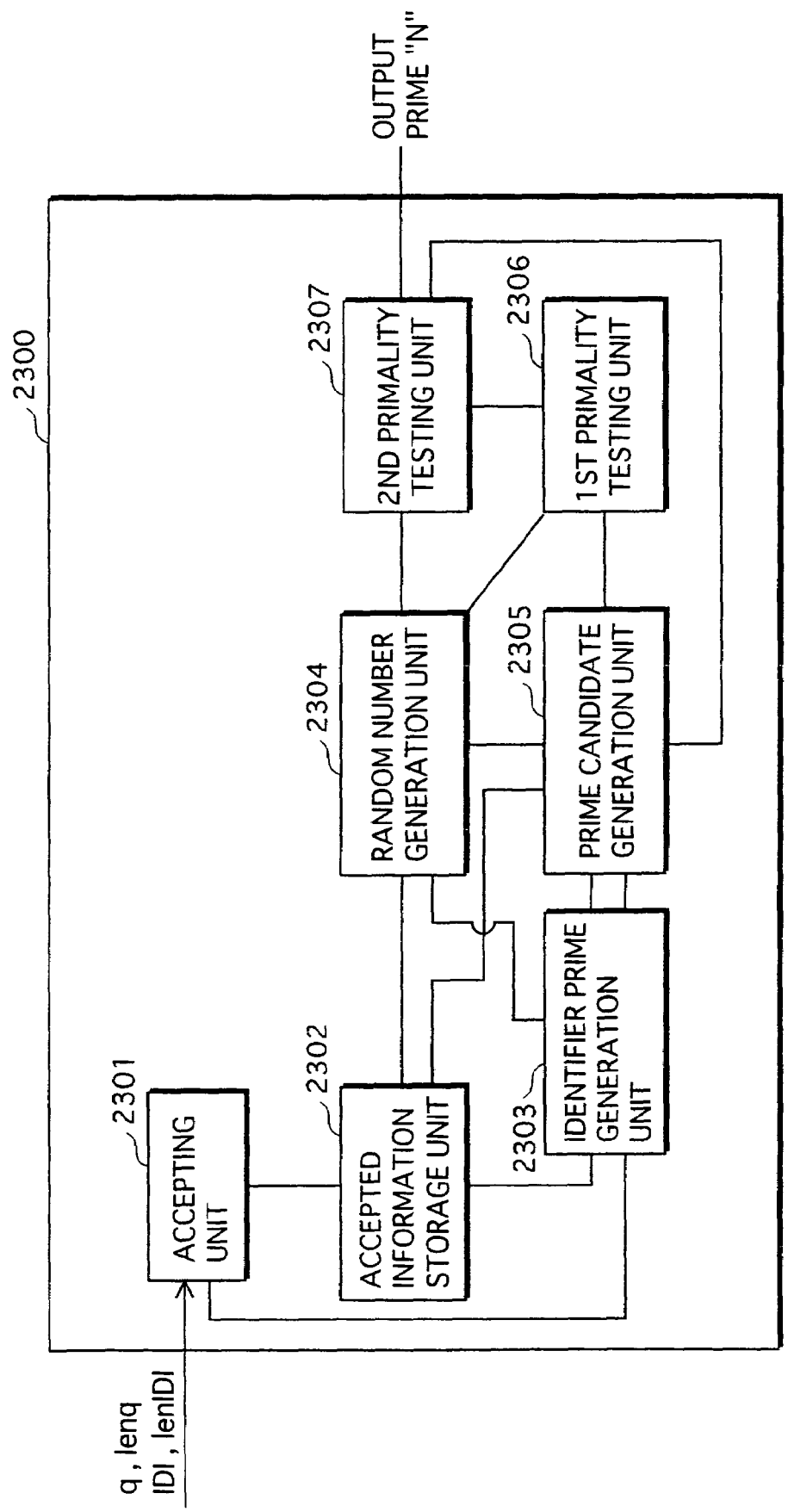
FIG. 42 is a block diagram illustrating a configuration of a prime generating apparatus 2300.

An example of the structure of the 2nd prime generation unit is illustrated in FIG. 42. The following description is given, assuming that the 2nd prime generation unit is a single prime generating apparatus 2300. When the prime "q", the prime's bit size "lenq" (here, 128 bits), the issue identifier information "IDI", and the bit size "lenIDI" are given, the prime generating apparatus 2300 outputs a prime "N" of (2×lenq) bits. Note that the prime generating apparatus 2300 generates the prime "N" without using the 1st and 2nd verification values of the first embodiment.

The prime generating apparatus 2300, as shown in FIG. 42, comprises: an accepting unit 2301; an accepted information storage unit 2302; an identifier prime generation unit 2303; a random number generation unit 2304; a prime candidate generation unit 2305; a 1st primality testing unit 2306; and a 2nd primality testing unit 2307.

The prime generating apparatus 2300 is, specifically speaking, a computer system composed of a microprocessor, ROM, RAM, a hard drive unit, a display unit, a keyboard, a mouse, and the like. A computer program is stored in the RAM or the hard drive unit. The microprocessor operates according to the computer program, and thereby the key issue audit server 2300 achieves the function.

<Accepted Information Storage Unit 2302>

The accepted information storage unit 2302 has an area to store the prime "q", the bit size "lenq" of the prime "q", the issue identifier information "IDI", and the bit size "lenIDI" of the issue identifier information, all of which are given at the generation of the prime "N".

<Accepting Unit 2301>

The accepting unit 2301 accepts the prime "q", the bit size "lenq" of the prime "q", the issue identifier information "IDI", and the bit size "lenIDI" of "IDI" from outside (e.g. the 1st prime generation unit), and writes the accepted prime "q", bit size "lenq", issue identifier information "IDI", and bit size "lenIDI" of the issue identifier information to the accepted information storage unit 2302.

The accepting unit 2301 outputs a start direction indicating to start the process to the identifier prime generation unit 2303.

<Identifier Prime Generation Unit 2303>

The identifier prime generation unit 2303 stores in advance a prime "qg" and the bit size "lenqg" of the prime.

The identifier prime generation unit 2303 stores in advance an injection function "f" and a prime generation function "gp" for generating a unique prime from the issue identifier information "IDI" and the prime "qg".

Receiving the start direction from the accepting unit 2301, the identifier prime generation unit 2303 reads the issue identifier information "IDI" from the accepted information storage unit 2302.

The identifier prime generation unit 2303 generates a prime "pIDI=gp(IDI, qg)" from the prime "qg" and the prime generation function "gp" stored in advance as well as the read issue identifier information "IDI". The method for generating the prime "pIDI", is the same as shown in Modified Example 3 of the prime generation, and therefore the description is left out.

The identifier prime generation unit 2303 outputs the generated prime "pIDI" to the prime candidate generation unit 2305.

<Random Number Generation Unit 2304>

Receiving a 1st generation direction from the prime candidate generation unit 2305, the random number generation unit 2304 reads the bit size "lenq" of the prime "q" from the accepted information storage unit 2302 and the bit size "lenqg" of the prime "qg" from the identifier prime generation unit 2303.

The random number generation unit 2304 generates a random number "R" of (lenq−2×lenqg−1) bits, using the read bit sizes "lenq" and "lenqg". Here, the first bit of the random number "R" is 1.

The random number generation unit 2304 outputs the generated random number "R" to the prime candidate generation unit 2305.

In addition, accepting a 2nd generation direction indicating regeneration of a random number from either one of the 1st and 2nd primality testing units 2306 and 2307, the random number generation unit 2304 reads each bit size, and then performs the above operation.

<Prime Candidate Generation Unit 2305>

Receiving the prime "pIDI" from the identification prime generation unit 2303, the prime candidate generation unit 2305 outputs the 1st generation direction to the random number generation unit 2304.

Receiving the random number "R" from the random number generation unit 2304, the prime candidate generation unit 2305 reads the prime "q" stored in the accepted information storage unit 2302.

The prime candidate generation unit 2305 generates "N=2×R×q×pIDI+1", using the prime "pIDI" received from the identifier prime generation unit 2303, the prime "q" read from the accepted information storage unit 2302, and the random number "R" received from the random number generation unit 2304.

The prime candidate generation unit 2305 reads the bit size "lenq" of the prime "q" from the accepted information storage unit 2302, and judges whether the bit size of the generated number "N" is "2×lenq".

When determining that it is "2×lenq", the prime candidate generation unit 2305 outputs the generated number "N" to the 1st primality testing unit 2306, and temporarily stores the random number "R".

When determining that it is not "2×lenq", the prime candidate generation unit 2305 multiplies the random number "R" received from the random number generation unit 2304 by 2, and makes the result "R", with which the prime candidate generation unit 2305 conducts the above operation once again to generate the number "N".

The prime candidate generation unit 2305 repeats the above operation until the bit size of the number "N" becomes "2×lenq".

<1st Primality Testing Unit 2306>

The 1st primality testing unit 2306 performs the same operation as one performed by the 1st primality testing unit 143 shown in the first embodiment, and therefore the description is left out here.

<2nd Primality Testing Unit 2307>

The 2nd primality testing unit 2307 performs the same operation as one performed by the 2nd primality testing unit 144 shown in the first embodiment, and therefore the description is left out here.

Note that the 2nd primality testing unit 2307 outputs the generated number "N" as a prime "N" when determining that the generated number "N" is a prime.

<Operation of Prime Generating Apparatus 2300>

The operation of the prime generating apparatus 2300 is described next.

(Prime Generation Process)

Here is described the prime generation process conducted in the prime generating apparatus 2300, using the flow diagram illustrated in FIG. 39.

The prime generating apparatus 2300 accepts, in Step S2000, the prime "q", the bit size "lenq" of the prime "q", the issue identifier information "IDI", and the bit size "lenIDI" of the issue identifier information according to user's operation, and writes the accepted individual information to the accepted information storage unit 2302.

The prime generating apparatus 2300 executes Step S2005 which is modified to generate the prime "pIDI".

The prime generating apparatus 2300 executes Step S2010 which is modified to generate a random number "R" of (lenq−2×lenqg−1) bits.

Since the following operational flow is the same as FIG. 39, the description is left out.

(Prime Candidate Generation Process)

The prime candidate generation process is described here, focusing only on modified points, with the use of the flow diagram illustrated in FIG. 40.

First, Step S2050 is omitted.

Next, Step S2055 is modified so as to generate a number "N=2×R×q×pIDI+1".

Since the following operational flow is the same as FIG. 40, the description is left out.

<Additional Particulars>

The bit size of the prime which is the generated private key is here 512 bits, however, the present invention is not limited to this. It may be 1024 bits, or 2048 bits. In addition, the prime generated in the above 1st prime generation unit is also not confined to 256 bits.

(7) The prime generation unit 116 of the first embodiment may be composed of: a 1st prime generation unit for generating a 256-bit prime from an 8-bit prime stored in advance; and a 2nd prime generation unit for generating a 512-bit prime from a 256-bit prime. Or alternatively, the 1st and 2nd prime generation units may be individual prime generating apparatuses.

The 1st prime generation unit generates a 128-bit prime from an 8-bit prime in a manner similar to the conventional technique, and generates a 256-bit prime from a 128-bit prime by employing the above-mentioned prime generating apparatus 2200.

Figure 43:
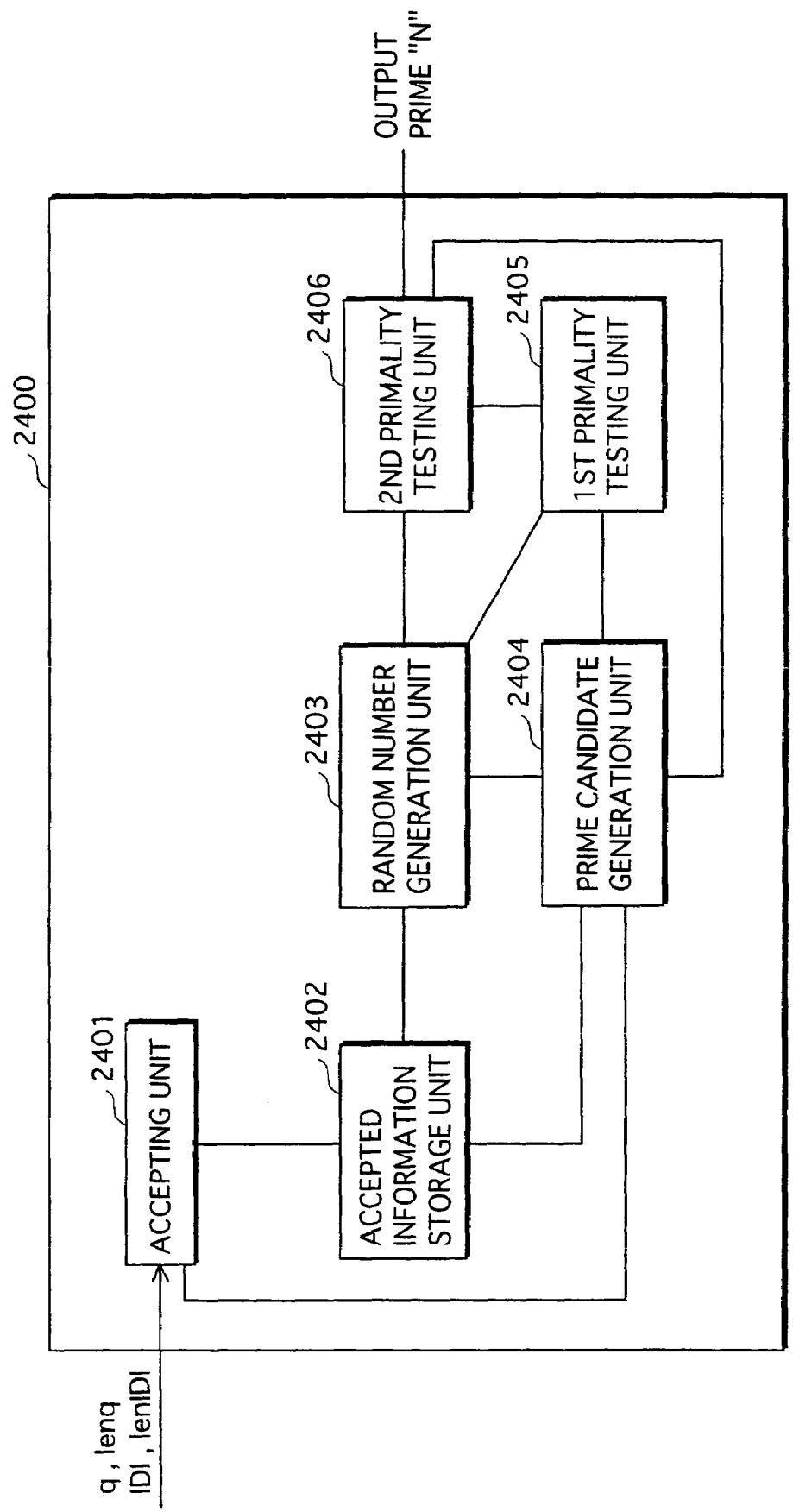
FIG. 43 is a block diagram illustrating a configuration of a prime generating apparatus 2400.

An example of the structure of the 2nd prime generation unit is illustrated in FIG. 43. The following description is given, assuming that the 2nd prime generation unit is a single prime generating apparatus 2400. When the prime "q", the bit size "lenq" (here, 256 bits) of the prime, the issue identifier information "IDI", and the bit size "lenIDI" are given, the prime generating apparatus 2400 outputs a prime "N" of (2×lenq) bits. Note that the prime generating apparatus 2400 generates the prime "N" without using the 1st and 2nd verification values of the first embodiment.

The prime generating apparatus 2400, as shown in FIG. 43, comprises: an accepting unit 2401; an accepted information storage unit 2402; a random number generation unit 2403; a prime candidate generation unit 2405; a 1st primality testing unit 2405; and a 2nd primality testing unit 2106.

The prime generating apparatus 2400 is, specifically speaking, a computer system composed of a microprocessor, ROM, RAM, a hard drive unit, a display unit, a keyboard, a mouse, and the like. A computer program is stored in the RAM or the hard drive unit. The microprocessor operates according to the computer program, and thereby the key issue audit server 2400 achieves the function.

<Accepted Information Storage Unit 2402>

The accepted information storage unit 2402 has an area to store the prime "q", the bit size "lenq" of the prime "q", the issue identifier information "IDI", and the bit size "lenIDI" of the issue identifier information, all of which are given at the generation of the prime "N".

<Accepting Unit 2401>

The accepting unit 2401 accepts the prime "q", the bit size "lenq" of the prime "q", the issue identifier information "IDI", and the bit size "lenIDI" of "IDI" from outside (e.g. the 1st prime generation unit shown above), and writes the accepted prime "q", bit size "lenq", issue identifier information "IDI", and bit size "lenIDI" to the accepted information storage unit 2402.

The accepting unit 2401 outputs a start direction indicating to start the process to the prime candidate generation unit 2404.

<Random Number Generation Unit 2403>

Receiving a 1st generation direction indicating generation of a random number from the prime candidate generation unit 2404, the random number generation unit 2403 reads the bit size "lenq" of the prime "q" and the bit size "lenIDI" of the issue identifier information "IDI" from the accepted information storage unit 2402.

The random number generation unit 2403 generates a random number "R1" of (lenq−lenIDI−1) bits, using the read bit size "lenq" and "lenIDI". Here, the first bit of the random number "R1" is 1.

The random number generation unit 2403 outputs the generated random number "R1" to the prime candidate generation unit 2404.

In addition, accepting a 2nd generation direction indicating regeneration of a random number from either one of the 1st and 2nd primality testing units 2405 and 2406, the random number generation unit 2403 reads each bit size, and then performs the above operation.

<Prime Candidate Generation Unit 2404>

The prime candidate generation unit 2404 has a generated information storage area to store a generated number.

Receiving a start direction from the accepting unit 2401, the prime candidate generation unit 2404 outputs the 1st generation direction to the random number generation unit 2403.

Receiving the random number "R1" from the random number generation unit 2403, the prime candidate generation unit 2404 reads the prime "q" and the issue identifier information "IDI" stored in the accepted information storage unit 2402.

The prime candidate generation unit 2404 generates a number "R=IDI×R1" and a number "N=2×R×q+1", using the read prime "q" and issue identifier information "IDI" as well as the random number "R1" received from the random number generation unit 2403.

The prime candidate generation unit 2404 judges whether the bit size of the generated number "N" is "2×lenq".

When determining that it is "2×lenq", the prime candidate generation unit 2404 outputs the generated number "N" to the 1st primality testing unit 2405, and stores the generated number "R" in the generated information storage area.

When determining that it is not "2×lenq", the prime candidate generation unit 2404 multiplies the random number "R1" received from the random number generation unit 2403 by 2, and makes the result "R1", with which the prime candidate generation unit 2404 conducts the above operation once again to generate the numbers "R" and "N".

The prime candidate generation unit 2404 repeats the above operation until the bit size of the number "N" becomes "2×lenq".

<1st Primality Testing Unit 2405>

The 1st primality testing unit 2405 performs the same operation as one performed by the 1st primality testing unit 143 shown in the first embodiment, and therefore the description is left out here.

<2nd Primality Testing Unit 2406>

The 2nd primality testing unit 2406 performs the same operation as one performed by the 2nd primality testing unit 144 shown in the first embodiment, and therefore the description is left out here.

Note that the 2nd primality testing unit 2406 outputs the generated number "N" as a prime "N" when determining that the generated number "N" is a prime.

<Operation of Prime Generating Apparatus 2400>

The operation of the prime generating apparatus 2400 is described next.

(Prime Generation Process)

The prime generation process conducted in the prime generating apparatus 2400 is described here, focusing only on modified points, with the use of the flow diagram illustrated in FIG. 39.

The prime generating apparatus 2400 accepts, in Step S2000, the prime "q", the bit size "lenq" of the prime "q", the issue identifier information "IDI"., and the bit size "lenIDI"

of the issue identifier information, and writes the accepted individual information to the accepted information storage unit 2402.

After executing Step S2000, which is modified as above, the prime generating apparatus 2400 omits Step S2005, and executes Step S2010 modified as follows. The prime generating apparatus 2400 executes Step S2010 that is modified to generate a random number "R1" of (lenq−lenIDI−1) bits.

Since the following operational flow is the same as FIG. 39, the description is left out.

(Prime Candidate Generation Process)

The prime candidate generation process is described here, focusing only on modified points, with the use of the flow diagram illustrated in FIG. 40.

First, Step S2050 is modified so as to generate a number "R=IDI×R1".

Next, Step S2055 is modified so as to generate a number "N=2×R×q+1".

Since the following operational flow is the same as FIG. 40, the description is left out.

(8) The prime generation unit 116 of the first embodiment of the prime generation may be composed of: a 1st prime generation unit that generates a 256-bit prime from an 8-bit prime stored in advance; and a 2nd prime generation unit that generates a 512-bit prime from a 256-bit prime. Additionally, the 1st and 2nd prime generation units may be individual prime generating apparatuses.

The 1st prime generation unit generates a 128-bit prime from an 8-bit prime in a manner similar to the conventional technique, and generates a 256-bit prime from a 128-bit prime by employing the above-mentioned prime generating apparatus 2200.

Figure 44:
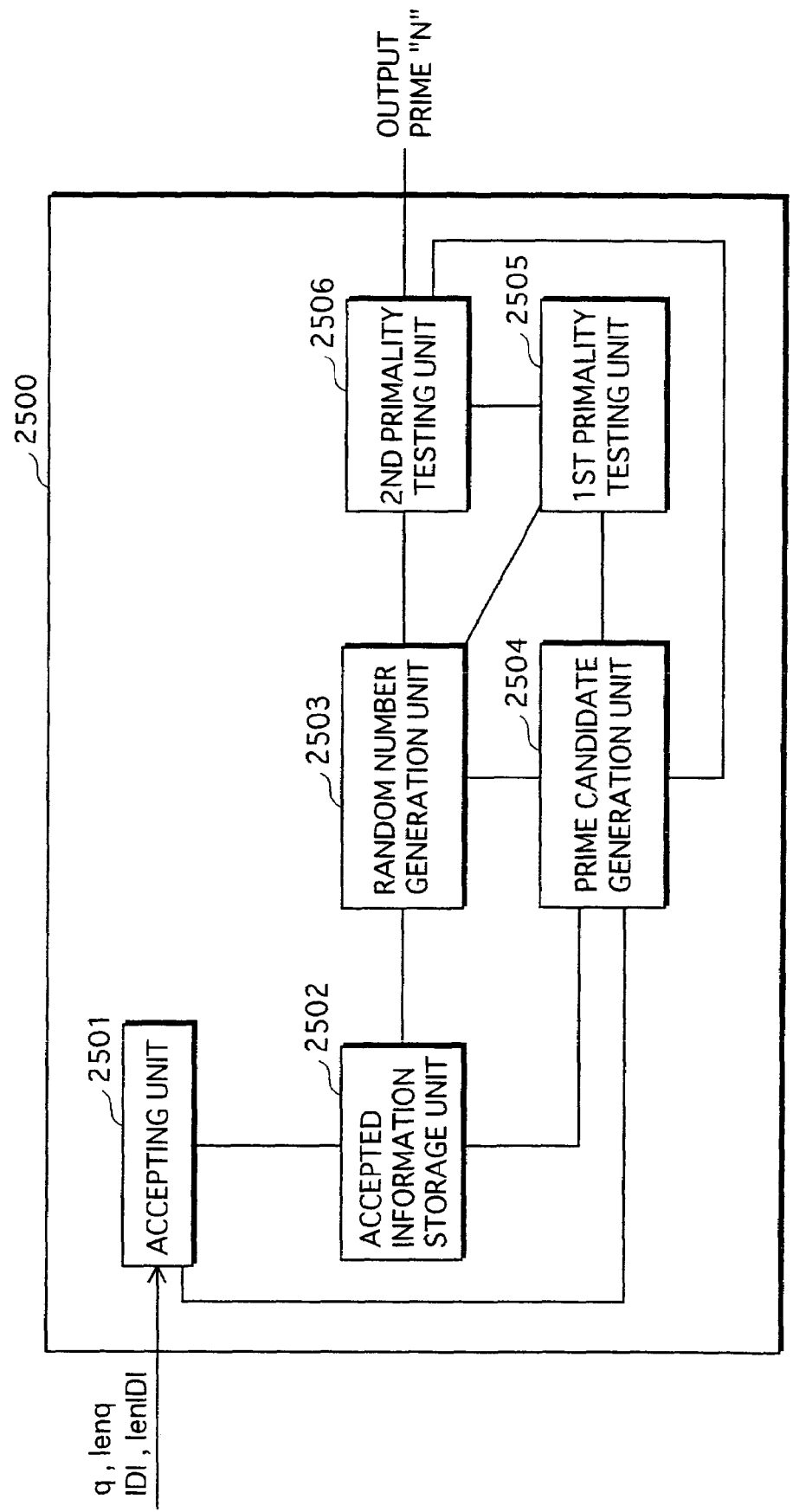
FIG. 44 is a block diagram illustrating a configuration of a prime generating apparatus 2500.

An example of the structure of the 2nd prime generation unit is illustrated in FIG. 44. The following description is given, assuming that the 2nd prime generation unit is a single prime generating apparatus 2500. When the prime "q", the bit size "lenq" (here, 256 bits) of the prime, the issue identifier information "IDI", the bit size "lenIDI", and the verification value "c" are given, the prime generating apparatus 2500 outputs a prime "N" of (2×lenq) bits.

The prime generating apparatus 2500, as shown in FIG. 44, comprises: an accepting unit 2501; an accepted information storage unit 2502; a random number generation unit 2503; a prime candidate generation unit 2504; a 1st primality testing unit 2505; and a 2nd primality testing unit 2506.

The prime generating apparatus 2500 is, specifically speaking, a computer system composed of a microprocessor, ROM, RAM, a hard drive unit, a display unit, a keyboard, a mouse, and the like. A computer program is stored in the RAM or the hard drive unit. The microprocessor operates according to the computer program, and thereby the key issue audit server 2500 achieves the function.

<Accepted Information Storage Unit 2502>

The accepted information storage unit 2502 has an area to store the prime "q" given at the generation of the prime "N", the bit size "lenq" of the prime "q", the issue identifier information "IDI", the bit size "lenIDI" of the issue identifier information, and the verification value "c".

<Accepting Unit 2501>

The accepting unit 2501 accepts the prime "q", the bit size "lenq" of the prime "q", the issue identifier information "IDI", the bit size "lenIDI" of the issue identifier information, and the verification value "c" from outside (e.g. the 1st prime generation unit shown above), and writes the accepted prime "q", bit size "lenq", issue identifier information "IDI", bit size "lenIDI" and verification value "c" to the accepted information storage unit 2502.

The accepting unit 2501 outputs a start direction indicating to start the process to the prime candidate generation unit 2504.

<Random Number Generation Unit 2503>

Receiving a 1st generation direction indicating generation of a random number from the prime candidate generation unit 2504, the random number generation unit 2503 reads the bit size "lenq" of the prime "q" and the bit size "lenIDI" of the issue identifier information from the accepted information storage unit 2502.

The random number generation unit 2503 generates a random number "R1" of (lenq−lenIDI−1) bits, using the read bit size "lenq" and "lenIDI". Here, the first bit of the random number "R1" is 1.

The random number generation unit 2503 outputs the generated random number "R1" to the prime candidate generation unit 2504.

In addition, accepting a 2nd generation direction indicating regeneration of a random number from either one of the 1st and 2nd primality testing units 2505 and 2506, the random number generation unit 2503 reads each bit size, and then performs the above operation.

Prime Candidate Generation Unit 2504>

The prime candidate generation unit 2504 has a generated information storage area to store a generated number.

Receiving a start direction from the accepting unit 2501, the prime candidate generation unit 2504 outputs the 1st generation direction to the random number generation unit 2503.

Receiving the random number "R1" from the random number generation unit 2503, the prime candidate generation unit 2504 reads the prime "q", the issue identifier information "IDI", and the verification value "c" stored in the accepted information storage unit 2502.

The prime candidate generation unit 2504 generates a number "R=IDI×R1" and a number "N=2×(R+w)×q+1", using the read prime "q", issue identifier information "IDI", and verification value "c" as well as the random number "R1" received from the random number generation unit 2503.

Here, "w" is a number satisfying "2×w×q+1=c mod IDI, 0≦w≦IDI". "w" is found by calculating "w=(c−1)×m mod IDI". "m" is a number satisfying "(2×q)×m=1 mod IDI".

The prime candidate generation unit 2504 judges whether the bit size of the generated number "N" is "2×lenq".

When determining that it is "2×lenq", the prime candidate generation unit 2504 outputs the generated number "N" to the 1st primality testing unit 2505, and stores the generated number "R" in the generated information storage area.

When determining that it is not "2×lenq", the prime candidate generation unit 2504 multiplies the random number "R1" received from the random number generation unit 2503 by 2, and makes the result "R1", with which the prime candidate generation unit 2504 conducts the above operation once again to generate the numbers "R" and "N".

The prime candidate generation unit 2504 repeats the above operation until the bit size of the number "N" becomes "2×lenq".

<1st Primality Testing Unit 2505>

The 1st primality testing unit 2505 performs the same operation as one performed by the 1st primality testing unit 143 shown in the first embodiment, and therefore the description is left out here.

<2nd Primality Testing Unit 2506>

The 2nd primality testing unit 2506 performs the same operation as one performed by the 2nd primality testing unit 144 shown in the first embodiment, and therefore the description is left out here.

Note that the 2nd primality testing unit 2506 outputs the generated number "N" as a prime "N" when determining that the generated number "N" is a prime.

<Operation of Prime Generating Apparatus 2500>

The operation of the prime generating apparatus 2500 is described next.

(Prime Generation Process)

The operation of the prime generation process conducted in the prime generating apparatus 2500 is described here, focusing only on modified points, with the use of the flow diagram illustrated in FIG. 39.

The prime generating apparatus 2500 accepts, in Step S2000, the prime "q", the bit size "lenq" of the prime "q", the issue identifier information "IDI", the bit size "lenIDI" of the issue identifier information, and the verification value "c", and writes the accepted individual information to the accepted information storage unit 2502.

After executing Step S2000 which is modified as above, the prime generating apparatus 2500 omits Step S2005, and executes Step S2010 modified as follows. The prime generating apparatus 2500 executes Step S2010 which is modified to generate a random number "R1" of (lenq−lenIDI−1) bits.

Since the following operational flow is the same as FIG. 39, the description is left out.

(Prime Candidate Generation Process)

The prime candidate generation process is described here, focusing only on modified points, with the use of the flow diagram illustrated in FIG. 40.

First, Step S2050 is modified so as to generate a number "R=IDI×R1".

Next, Step S2055 is modified so as to generate a number "N =2X(R+w)×q+1".

Since the following operational flow is the same as FIG. 40, the description is left out.

(9) In the above first embodiment, the prime generation unit 116 applies the injection function "f", and then, embeds the issue identifier information "IDI". However, the prime generation unit 116 may only apply the injection function "f", or may only perform embedding of the issue identifier information "IDI".

In the case where only the injection function is applied, the uniqueness of the generated prime is satisfied. Here, the injection function can be applied at any timing.

In the case where only the embedding of the issue identifier information "IDI" is performed, the validity of the generated key can be examined using "IDI" although the uniqueness of the generated prime is not satisfied. Note that, in the case of performing only the embedding of the issue identifier information "IDI", the application of the injection function is conducted when a 512-bit prime is generated from a 256-bit prime.

This is also the case with the second embodiment.

(10) In the above first and second embodiments, when the control information is "Information B", the prime generation unit 116 generates the number "R=f (IDI∥IR1)" by applying an injection function. However, the present invention is not confined to this.

For example, when the control information is "Information B", the prime generation unit 116 may generate a number "R=f(R1∥IDI)", a number "R=f(IDI)∥R1", or a number "R=R1∥f(IDI)".

Furthermore, without using the injection function, a number "R=(IDI∥R1)" or a number "R=R1∥IDI" may be generated.

Additionally, each bit composing the random number "R1" is embedded in the bit string of the issue identifier information "IDI", and the number "R" can be generated by applying the injection function "f" to the embedded result (hereinafter, referred to as "IDI_R1").

Figure 45:
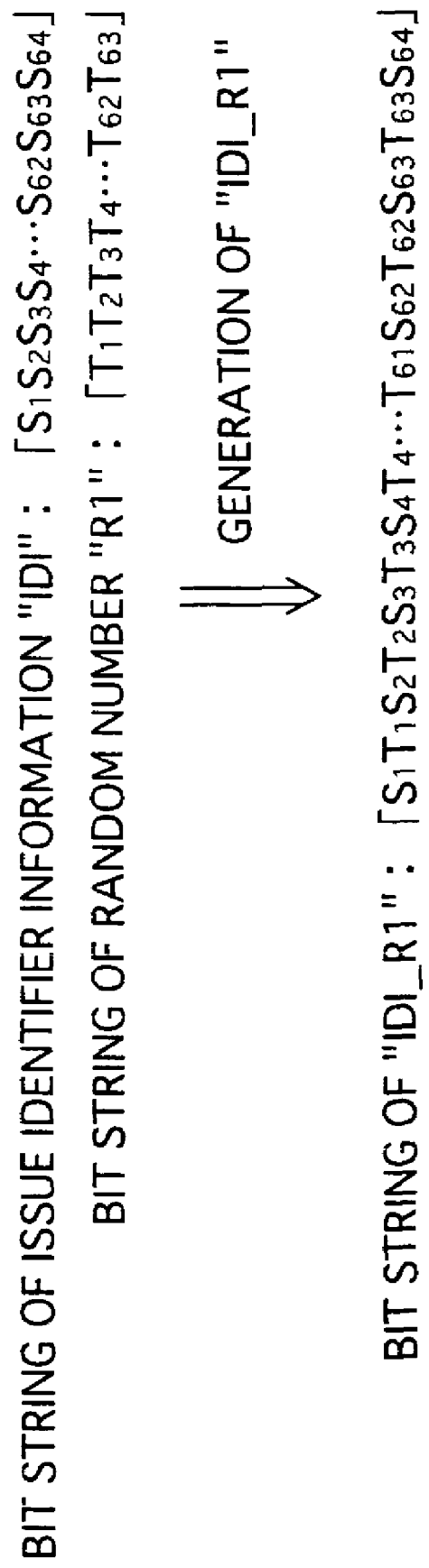
FIG. 45 shows an example of "IDI_R1" generated as a result of filling a bit string of issue identifier information "IDI" with each bit making up a random number "R1"

One such example is shown in FIG. 45. The issue identifier information "IDI" is, specifically speaking, 64 bits, as mentioned above, and has a bit string of "$S_1S_2S_3S_4\ldots S_{62}S_{63}S_{64}$". The random number "R1" is, to be more specific 63 bits, and the bit string is "$T_1T_2T_3T_4\ldots T_{61}T_{62}T_{63}$". Here, "$S_n$" and "$T_m$" are either "0" or "1". Note that "n" is a number no less than 1 and no more than 64, while "m" is a number no less than 1 and no more than 63. Here, the bit string of "IDI_R1" becomes "$S_1T_1S_2T_2S_3T_3S_4T_4\ldots T_{61}S_{62}T_{62}S_{63}T_{63}S_{64}$".

Note that, in this example, individual bits of the random number "R1" are embedded for each bit of the bit string of the issue identifier information "IDI"; however, the present invention is not limited to this. Instead, the number "IDI_R1" is generated by embedding individual bits of the random number "R1" for every some bits of the bit string of the issue identifier information "IDI". Here, "IDI_R1" is generated by joining all the bits, which are not embedded within the bit string of "IDI", together to the last bit of this bit string.

In addition, the number "IDI_R1" may be generated by embedding each bit of the issue identifier information "IDI" in the bit string of the random number "R1". For example, in the case of embedding individual bits with respect to each bit of the bit string of the random number "R1", the bit string of the number "IDI_R1" becomes "$T_1S_1T_2S_2T_3S_3T_4S_4\ldots T_{62}S_{62}T_{63}S_{63}S_{64}$".

The number "R" is generated by, first, generating the number "IDI R1" from the issue identifier information "IDI" and the random number "R1", and then applying the injection function "f" to the generated number "IDI_R1"; however, the present invention is not limited to this. The number "R" may be "R=IDI_R1".

(11) In the above first embodiment, when the control information "Information A", the prime generation unit 116 conducts the embedding of the issue identifier information "IDI"; however, the information to be embedded is not confined to "IDI"

For example, the information to be embedded may be a value using "g" that is a secret function known only by the key issuing server 100 and the certificate issuing server 200, and is a one-to-one function. Here, the value embedded instead of "IDI" is "g(IDI)".

This is also the case with the second embodiment.

(12) In the above first embodiment, a safe communication pathway is established between the key issuing server 100 and the terminal 300, and then the private and public keys are transmitted from the key issuing server 100 to the terminal 300; however, the present invention is not limited to this.

For example, the private and public keys may be transmitted from the key issuing server 100 to the terminal 300 via an input-output device at the manufacture of the terminal 300.

This is also the case with the second embodiment.

(13) In the above first and second embodiments, portable phones are used as a specific example of the terminals; however, the present invention is not limited to these.

Any terminal can be used if it is capable of receiving encrypted data via a network and decrypting the encrypted data.

For example, personal computers and PDA (Personal Digital Assistants) are examples of such.

(14) In the above first and second embodiments, the issue identifier information "IDI" is an odd number; however, when a verification value is not used for the prime generation, the issue identifier information "IDI" does not have to be an odd number.

Here, in the case where the prime is generated using the server identifier and an issue identifier "PID" which is generated, by a counter, in the order starting from 1, the identifier generation unit 115 is capable of readily generating a different prime each time by increasing "PID" by 1 every time when issuing (generating) a prime.

(15) In the first and second embodiments, the bit size of the prime, which is a private key to be generated, does not have to be 512 bits, and could be 1024 bits or 2048 bits. Here, as to the bit size (here, "lenN") of the prime that is a private key, the prime generation unit 116 generates a prime of (lenN/4) bits using the conventional prime generation technique; then, generates a prime of (lenN/2) bits by applying the injection function "f"; and finally, generates a prime "N" of "lenN" bits, in which the issue identifier information "IDI" has been embedded.

Note that, when only embedding of the issue identifier information "IDI" is performed, the prime generation unit generates the prime of (lenN/2) bits by the conventional prime generation technique, and, at the end, generates the prime "N" of "lenN" bits in which the issue identifier information "IDI" has been embedded.

In addition, when only the generation of a unique prime by the application of the injection function "f" is performed, the prime generation unit generates the prime of (lenN/2) bits by the conventional prime generation technique, and then generates the prime of (lenN) bits by the application of the injection function "f".

(16) The prime generation unit 116 of the first embodiment may be a single prime generating apparatus. Here, an integer number ten and the issue identifier information IDI may be input to the prime generating apparatus may input, and the prime generating apparatus then outputs a prime of ten bits.

Additionally, as described above, the prime generation unit 116 of the first embodiment may use, instead of the prime information generation unit 133, any one of the prime information generation units 133A, 133B, and 133C of Modified Examples 1, 2 and 3 of the prime generation.

In addition, when generating a 512-bit prime from an 8-bit prime, the prime generation unit 116 of the first embodiment may apply the injection function "f" only once without embedding the issue identifier information "IDI". Here, receiving the certificate issue request information and the public key, the certificate issuing server 200 issues the public key certificate "Cert" without examining the validity.

(17) The method for including the issue identifier information in a prime is not confined to the above embodiments. For example, a prime-whose low-order lenIDI bits are IDI may be generated and issued.

(18) The number of the key issuing server is not limited to three, although at least one key issuing server is required. Here, each key issuing server uses the same prime generation technique.

(19) Conditional equation used by the 2nd primality testing unit 144 of the first embodiment for judging a prime is not limited to (Eq.2) shown above.

Using a conditional equation "GCD(2^(2R)−1, N)=1", the 2nd primality testing unit 144 judges whether the number "N" received from the 1st primality testing unit 143 satisfies the conditional equation. When the 2nd primality testing unit 144 determines that it satisfies the conditional equation, the number "N" is taken as a prime "N".

(20) In the first embodiment, the key issuing server 100 distributes the private key and public key certificate to the terminal 300; however, the present invention is not confined to this. The key issuing server 100 may distribute only the private key to the terminal 300. Here, the key issuing server 100 publishes the public key certificate to third parties. Alternatively, the key issuing server 100 publishes the public key to third parties.

(21) In the first embodiment, the prime generation unit 116 manages, at the output counter 136, the number of primes having been output to the key judgment unit 117; however, the present invention is not limited to this.

The key judgment unit 117 may count the number of received primes. The following shows an example of such a case.

Receiving an order to start prime generation from the identifier generation unit 115, the prime generation unit 116 generates a prime "p1", and outputs the generated prime "p1" to the key judgment unit 117. Receiving a request for the next prime from the key judgment unit 117, the prime generation unit 116 generates a prime "p2", and outputs the generated prime "p2" to the key judgment unit 117. Note that the generation of the primes "p1" and "p2" is the same as in the first embodiment, and therefore the description is left out here.

Receiving a prime from the prime generation unit 116, the key judgment unit 117, using a counter (the initial value is "0"), increases the value of the counter by 1. Then, the key judgment unit 117 judges whether the result is 1. When determining that it is 1, the key judgment unit 117 requests the prime generation unit 116 for the next prime. When determining that it is not 1, the key judgment unit 117 judges whether the primes "p1" and "p2" match each other. The following operation is the same as in the first embodiment, and therefore the description is left out here.

(22) In the above first and second embodiments, the bit size of the issue identifier information "IDI" is 64 bits; however, the present invention is not limited to this. The issue identifier information can take any bit size as long as it is smaller than (lenq−1).

Additionally, in Modified Example 3 of the prime generation, the bit size of the prime "qg" is 64 bits; however, the present invention is not confined to this. Any prime can be used as the prime "qg" if the bit size "lenqg" satisfies "(2× lenqg)<(lenq−1)".

Here, the bit size of the issue identifier information should be smaller than that of the prime "qg".

(23) At the issue public key determination unit 214 of the certificate issuing server 200, the judgment of whether the public key "PK=(n, e)" has been generated using the issue identifier information "IDI" is achieved by verifying whether "n−(c11×c12)" is divisible by "IDI". Here is a specific example of the verification method.

Figure 46:
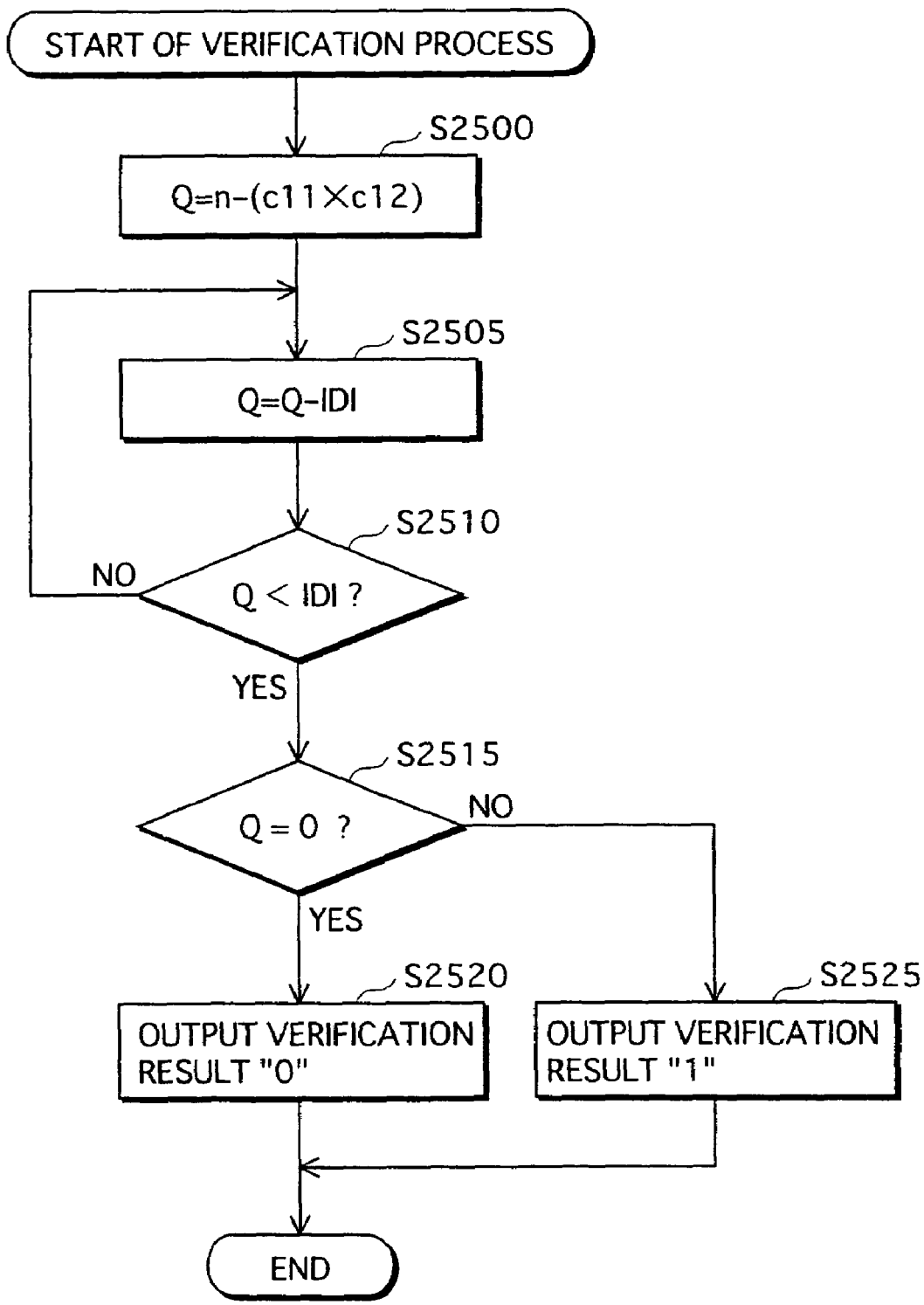
FIG. 46 is a flow diagram illustrating operation of a verification process.

A specific operational flow of the verification method is described here, using a flow diagram shown in FIG. 46.

The issue public key determination unit 214 makes the number n−(c11×c12)" "Q" (Step S2500).

Next, the issue public key determination unit 214 calculates "Q-IDI", and makes the calculated result "Q" once again (Step S2505).

The issue public key determination unit 214 judges whether the number "Q" is smaller than the issue identifier information "IDI" (Step S2510).

When determining that it is smaller ("YES" in Step S2510), the issue public key determination unit 214 judges whether the number "Q" is "0" (Step S2515).

When determining that it is "0" ("YES" in Step S2515), the issue public key determination unit 214 outputs the verification result "0" (Step S2520). When determining that it is not "0" ("NO" in step S2515), the issue public key determination unit 214 outputs the verification result "1" (Step S2525).

When determining that the number "Q" is no less than the issue identifier information "IDI" ("NO" in Step S2510), the process returns to Step S2505.

According to the operation, it is capable of determining whether the public key "PK=(n, e)" has been generated using the issue identifier information "IDI".

After the verification process described above is performed in Step S670 shown in FIG. 18, the issue public key determination unit 214 determines that the public key "PK" has been generated using the issue identifier information "IDI" when the output verification result is "0". On the other hand, when the verification result is "1", the issue public key determination unit 214 determines that the public key "PK" has been generated without using the issue identifier information "IDI".

(24) When the number "N" generated by the prime candidate generation unit 142 does not satisfy "lenN=2×lenq", it is said above that "R1=2×R1". A specific example of the computation is shown next.

When the generated number "N" does not satisfy "lenN=2×lenq", the prime candidate generation unit 142 shifts the bit string of the number "R1" by one bit to the left. Here, the last bit is set to "0". Herewith, "R1=2×R1" can be established.

(25) In the first and second embodiments, the number "N" is calculated as "N=2×(R+w)×q+1"; however, the present invention is not confined to this. "N" may be calculated as "N=2×R×q+c".

This is because "N=2×(R+w)×q+1" can be modified as follows by using the above-mentioned conditional equations of "w" and "m"–"w=(c−1)×m mod IDI" and "(2×q)×m=1 mod IDI".

$$2 \times (R+w) \times q + 1 = 2 \times R \times q + 2 \times w \times q + 1$$
$$= 2 \times R \times q + 2 \times (c-1) \times m \times q + 1$$
$$= 2 \times R \times q + 2 \times (c-1) \times (1/2q) \times q + 1$$
$$= 2 \times R \times q + (c-1) + 1$$
$$= 2 \times R \times q + c.$$

Herewith, it can be seen that "N=2×R×q+c" can be used, instead of "N=2×(R+w)×q+1".

Note that "c" is a verification value, and the verification value "c" becomes "c11" when the value of the output counter is "1", and becomes "c12" when the value of the counter is "2" or more. For example, the certificate issuing server 200 of the first embodiment judges whether "N−c11×c12" is divisible by "IDI", and thereby the validity of the generated public key is examined.

(26) A prime verification apparatus for verifying the validity of the prime generated by the key issuing server may be added to the key issuing system 1 of the first embodiment.

The operations of the prime verification apparatus and the key issuing server 100 in this case is described next.

The prime verification apparatus stores in advance a verification-value table, as in the case of the certificate issuing server.

After generating the prime "p1" at the prime generation unit 116, the key issuing server 100 outputs the generated prime "p1", the issue identifier information "IDI" and the server identifier to the prime verification apparatus.

Receiving the prime "p1", issue identifier information "IDI", and server identifier from the key issuing server 100, the prime verification apparatus reads a 1st verification value "c11" corresponding to the received server identifier, calculates "p1−c11" using the read 1st verification value "c11", and judges whether the calculation result is divisible by "IDI". When determining that it is divisible, the prime verification apparatus outputs information permitting the use of the prime "p1" to the key issuing server 100. When determining that it is not divisible, the prime verification apparatus outputs information prohibiting the use of the prime "p1" to the key issuing server 100.

Receiving information prohibiting the use of "p1" from the prime verification apparatus, the prime generation unit 116 of the key issuing server 100 generates the prime "p1" once again, and repeats the above operation.

Receiving information permitting the use of the prime "p1" from the prime verification apparatus, the prime generation unit 116 of the key issuing server 100 outputs the generated prime "p1" to the key judgment unit 117 and generates a prime "p2". The prime generation unit 116 outputs the generated prime "p2", the issue identifier information "IDI", and the server identifier to the prime verification apparatus.

Receiving the prime "p2", issue identifier information "IDI", and server identifier from the key issuing server 100, the prime verification apparatus reads a 2nd verification value "c12" corresponding to the received server identifier, calculates "p2−c12" using the read 2nd verification value "c12", and judges whether the calculation result is divisible by "IDI". When determining that it is divisible, the prime verification apparatus outputs information permitting the use of the prime "p2" to the key issuing server 100. When determining that it is not divisible, the prime verification apparatus outputs information prohibiting the use of the prime "p2" to the key issuing server 100.

Receiving the information prohibiting the use of the prime "p2" from the prime verification apparatus, the prime generation unit 116 of the key issuing server 100 generates a prime "p2" once again, and repeats the above operation.

Receiving the information permitting the use of the prime "p2" from the prime verification apparatus, the prime generation unit 116 of the key issuing server 100 outputs the generated prime "p2" and a judgment start order to the key judgment unit 117.

The following operation of the key issuing server 100 is the same as in the first embodiment, and therefore the description is left out here.

Note that, when receiving a regeneration order from the key judgment unit 117, the prime generation unit 116 generates a prime "p2" once again, and repeats the above operation.

(27) In the first and second embodiments, the 1st and 2nd verification values are assigned for each key issuing server; however, the present invention is not limited to this.

The 1st and 2nd verification values are assigned for each terminal, and a table made up of terminal identifiers and the 1st and 2nd verification values assigned for each terminal may be managed by the key issuing server and the certificate issuing server.

The key issuing server generates primes "p1" and "p2" using the 1st and 2nd verification values corresponding to a terminal having requested a key issue, and generates public and private keys using the generated "p1" and "p2". When requesting a public key certificate, the key issuing server transmits the public key, issue identifier information, server identifier, and terminal identifier to the certificate issuing server.

The certificate issuing server reads the 1st and 2nd verification values corresponding to the received terminal identifier, and verifies the validity of the public key using the read verification value, as well as the received public key and issue identifier information.

By assigning two verification values for each terminal, the validity of a public key assigned for each terminal can be verified while the uniqueness of the public key is maintained.

In addition, by using the prime verification apparatus described above, each generated prime may be verified whether it is a valid prime.

Note that the prime verification apparatus should have a table including terminal identifiers and 1st and 2nd verification values assigned for each terminal.

(28) In the first and second embodiments, the terminal and key issuing server are respective apparatuses; however, the terminal may conduct key issuing.

In this case, for example, the terminal includes, in addition to the structure shown in the first embodiment: the identifier repository; identifier generation unit; prime generation unit; key judgment unit; key generation unit; and public key repository that are described in the description of the structure of the key issuing server 100.

The terminal generates, using the identifier generation unit, issue identifier information "IDI=TID||1" from the terminal identifier and the number "1", and stores the generated issue identifier information in the identifier repository.

The terminal generates public and private keys using the prime generation unit, key judgment unit, and key generation unit, and stores the generated public key in the public key repository while storing the generated private key in the private key repository.

In addition, the terminal transmits the issue identifier information, public key, terminal identifier, and certificate issue request information to the certificate issuing server, and receives a public key certificate from the certificate issuing server.

Alternatively, the terminal may be an IC card. In this case, the IC card generates and stores keys. Note that the generation and storage of the issue identifier information may be handled by the IC card. In this case, the communication between the IC card and the certificate issuing server is performed by loading the IC card onto the apparatus network-connected to the certificate issuing server.

(29) A serial number is used as an example of the terminal identifier; however, the present invention is not confined to this.

The terminal identifier may be biometric information showing user's biological characteristics. Such biometric information includes, for example: fingerprint information indicating characteristics of the user's fingerprints; voiceprint information indicating characteristics of the user's voiceprint; iris information indicating characteristics of the user's irises; profile information indicating characteristics of the profile of the user's face; DNA information indicating characteristics of the user's DNA; and the combination of these.

In addition, part of the terminal identifier may be biometric information.

Furthermore, the terminal identifier may be issued by a management server managing the terminal, and given via network communication from the management server. Or, a terminal identifier issued by the management server may be given via a storage medium such as a SD card.

(30) The present invention may be a method of accomplishing the above described unauthorized contents detection system. The present invention may be a computer program that achieves the method by a computer, or may be a digital signal representing the computer program.

The present invention may also be achieved by a computer-readable recording medium, such as a flexible disk, a hard disk, a CD-ROM (Compact Disk Read Only Memory), MO (Magneto-Optical) disk, a DVD, a DVD-ROM (Digital Versatile Disk Read Only Memory), a DVD-RAM (Digital Versatile Disk Random Access Memory), a BD (Blu-ray Disk), or a semiconductor memory, on which the above-mentioned computer program or digital signal is recorded. The present invention may also be the computer program or the digital signal recorded on such a storage medium.

The present invention may also be the computer program or digital signal to be transmitted via networks, as represented by telecommunications, wire/wireless communications, and the Internet, or via data broadcasting.

The present invention may also be a computer system having a microprocessor and memory, wherein the memory stores the computer program and the microprocessor operates according to the computer program.

The computer program or digital signal may be recorded on the above storage medium and transferred to an independent computer system, or alternatively, may be transferred to an independent computer system via the above network. Then, the independent computer system may execute the computer program or digital signal.

(31) The present invention includes a structure in which two or more of the above embodiments and modifications are combined.

Each server and terminal making up of the present invention can be manufactured and sold operationally, continuously and repeatedly in electric equipment manufacturing industries. In addition, each server and terminal making up of the present invention is applicable operationally, continuously and repeatedly in service industries using the Internet.

The invention claimed is:

1. A key issuing server apparatus for calculating a prime candidate N larger than a known prime q and testing primality of the calculated prime candidate N and for issuing a public key and a private key of an RSA encryption system for a terminal, the key issuing server apparatus comprising:

an information storage unit storing the known prime q, management information that is an odd number and corresponds to a prime to be generated, and a predetermined verification value;

a random number generation unit operable to generate a random number;

a candidate calculation unit operable to (i) read the prime q, the management information, and the verification value, (ii) calculate a multiplication value R by multiplying the management information by the random number, and (iii) calculate the prime candidate N, according to N=2×(the multiplication value R+w)×the prime q+1, using w satisfying 2×w×the prime q+1=the verification value (mod the management information);

a primality testing unit operable to test primality of the calculated prime candidate N;

an output unit operable to output the calculated prime candidate N as a prime N when the primality of the calculated prime candidate N is determined; and a key output unit operable to output the private key and the public key of the RSA encryption system to the terminal, the private key and the public key being generated using the prime N output by the output unit.

2. The key issuing server apparatus of claim 1, wherein the verification value stored in the information storage unit is 1, and wherein the candidate calculation unit calculates the prime candidate N according to N =2×the multiplication value R×the prime q+1.

3. The key issuing server apparatus of claim 1, wherein the primality testing unit includes:
   a 1st judging subunit operable to judge whether the prime candidate N satisfies $2^{N-1}=1$ mod N; and
   a 2nd judging subunit operable to perform, when the judgment of the 1st judging subunit is affirmative, one of (i) a judgment of whether the prime candidate N and the multiplication value R satisfy $2^{2R} \neq 1$ mod N and (ii) a judgment of whether the prime candidate N and the multiplication value R satisfy $GCD(2^{2R}-1, N)=1$, and to determine the primality of the prime candidate N when the judgment performed by the 2nd judging subunit is affirmative.

4. The key issuing server apparatus of claim 1,
   wherein the information storage unit further stores a known prime g and a unique issue identifier, and
   wherein the key issuing server apparatus further comprises:
   a prime generation unit operable to generate a prime gp by applying a prime generation function for generating a unique prime to the prime g and the unique issue identifier, and output the generated prime gp; and
   a writing unit operable to write the generated prime gp to the information storage unit as the management information.

5. The key issuing server apparatus of claim 4, wherein the prime generation unit (i) generates a combination of the unique issue identifier and a variable c that is one of 0 and a positive integer, (ii) calculates a prime candidate =2×the prime g×f(the combination)+1, and (iii) tests primality of the calculated prime candidate, and outputs the calculated prime candidate as the prime gp when the primality of the calculated prime candidate is determined.

6. The key issuing server apparatus of claim 5, wherein, when the primality of the calculated prime candidate is not determined, the prime generation unit (i) adds a value of 1 to the variable c, (ii) generates a 2nd combination of the unique issue identifier and the variable c having the value of 1 added thereto, (iii) calculates a 2nd prime candidate=2×the prime g×f(the 2nd combination)+1, and (iv) tests primality of the 2nd calculated prime candidate, and outputs the 2nd calculated prime candidate as the prime gp when the primality of the 2nd calculated prime candidate is determined.

7. The key issuing server apparatus of claim 1, further comprising an iteration control unit operable to control the random number generation unit, the candidate calculation unit, and the primality testing unit to iterate the generation of the random number, the calculation of the prime candidate N, and the primality testing, until the primality of the calculated prime candidate N is determined by the primality testing unit.

8. The key issuing server apparatus of claim 7, further comprising:
   a preparative prime storage unit storing a known prime p;
   a preparative random number calculation unit operable to calculate a random number R';
   a preparative candidate calculation unit operable to calculate a prime candidate N', according to N'=2×the random number R'×the prime p+1, using the prime p and the calculated random number R';
   a preparative primality testing unit operable to test primality of the calculated prime candidate N';
   a preparative writing unit operable to write the calculated prime candidate N' to the information storage unit as the prime q when the primality of the calculated prime candidate N' is determined; and
   a preparative iteration control unit operable to control the preparative random number calculation unit, the preparative candidate calculation unit, and the preparative primality testing unit to iterate the calculation of the random number R', the calculation of the prime candidate N', and the primality testing, until the primality of the calculated prime candidate N' is determined by the preparative primality testing unit.

9. The key issuing server apparatus of claim 7 further comprising a key generating apparatus for generating the public key and the private key of the RSA encryption system, the key generating apparatus including:
   a public key generation unit operable to generate the public key using the prime N output by the output unit; and
   a private key generation unit operable to generate the private key using the prime N output by the output unit.

10. The key issuing server apparatus of claim 9,
    wherein the public key generation unit (i) directs the iteration control unit to newly obtain a prime N', (ii) calculates a number n, according to n=the prime N×the prime N', using the prime N and the newly obtained prime N', and (iii) generates a random number e,
    wherein a combination of the calculated number n and the generated random number e is the public key,
    wherein the private key generation unit calculates d satisfying e×d=1 mod L,
    wherein L is a least common multiple of the prime N−1 and the prime N'−1, and
    wherein the calculated d is the private key.

11. The key issuing server apparatus of claim 9,
    wherein the information storage unit further stores a different verification value from the verification value,
    wherein the public key generation unit directs the iteration control unit to newly obtain a prime N',
    wherein the candidate calculation unit calculates a prime candidate N', as the prime N', according to N'=2×the multiplication value R×the prime q+the different verification value,
    wherein the public key generation unit calculates a number n, according to n=the prime N×the prime N', using the prime N and the newly obtained prime N', and generates a random number e,
    wherein a combination of the calculated number n and the generated random number e is the public key,
    wherein the private key generation unit calculates d satisfying e×d=1 mod L,
    wherein L is a least common multiple of the prime N−1 and the prime N'−1, and
    wherein the calculated d is the private key.

12. The key issuing server apparatus of claim 9, further comprising:
    an identifier obtaining unit operable to obtain a terminal identifier uniquely identifying the terminal;
    a management information generation unit operable to generate the management information including the obtained terminal identifier; and
    a writing unit operable to write the generated management information to the information storage unit.

13. The key issuing server apparatus of claim 12, further comprising a server identifier storage unit prestoring a server identifier uniquely identifying the key issuing server apparatus,
    wherein the management information generation unit further reads the server identifier from the server identifier storage unit, and generates the management information further including the read server identifier.

14. A key verification server apparatus for verifying a prime N output by a key issuing server apparatus for calculating a prime candidate N larger than a known prime q, testing primality of the calculated prime candidate N, and generating and issuing a public key and a private key of an RSA encryption system for a terminal, the key issuing server apparatus including an information storage unit storing the known prime q, management information that is an odd number and corresponds to a prime to be generated, and a predetermined verification value, a random number generation unit operable to generate a random number, a candidate calculation unit operable to (i) read the prime q, the management information, and the verification value, (ii) calculate a multiplication value R by multiplying the management information by the random number, and (iii) calculate the prime candidate N, according to N=2×(the multiplication value R+w)×the prime q+1, using w satisfying 2×w×the prime q+1=the verification value (mod the management information), a primality testing unit operable to test primality of the calculated prime candidate N, an output unit operable to output the calculated prime candidate N as the prime N when the primality of the calculated prime candidate N is determined, and a key output unit operable to output the private key and the public key of the RSA encryption system to the terminal, the private key and the public key being generated using the prime N output by the output unit, the key verification server apparatus comprising:
  a prime-verification-apparatus information storage unit storing the management information and the verification value;
  a subtraction unit operable to obtain a prime subtraction value by subtracting the verification value from the prime N;
  a judgment unit operable to judge whether the obtained prime subtraction value is divisible by the management information; and
  a control unit operable to permit use of the prime N when the judgment by the judgment unit is affirmative, and prohibit the use of the prime N when the judgment by the judgment unit is negative.

15. The key verification server apparatus of claim 14,
wherein the key issuing server apparatus stores the verification value which is 1, and calculates the prime candidate N, according to N=2×the multiplication value R×the prime q+1,
wherein the verification value stored in the prime-verification-apparatus information storage unit is 1, and
wherein the subtraction unit obtains the prime subtraction value by subtracting 1 from the prime N.

16. The key verification server apparatus of claim 14,
wherein the key issuing server apparatus further (i) stores a known prime g and a unique issue identifier, (ii) generates a prime gp by applying a prime generation function for generating a unique prime using the prime g and the unique issue identifier, (iii) outputs the generated prime gp, and (iv) writes the generated prime gp to the information storage unit as the management information,
wherein the prime-verification-apparatus information storage unit further stores the prime g and the unique issue identifier, and
wherein the key verification server apparatus further comprises:
  a prime generation unit operable to generate the prime gp by applying the prime generation function for generating the unique prime using the prime g and the unique issue identifier, and output the generated prime gp; and
  a writing unit operable to write the generated prime gp to the prime-verification-apparatus information storage unit as the management information.

17. The key verification server apparatus of claim 16,
wherein the key issuing server apparatus (i) generates a combination of the unique issue identifier and a variable c that is one of 0 and a positive integer, (ii) calculates a prime candidate=2×the prime g×f(the combination)+1, (iii) tests primality of the calculated prime candidate, and (iv) outputs the calculated prime candidate as the prime gp when the primality is determined, and
wherein the prime generation unit (i) generates the combination of the unique issue identifier and the variable c, (ii) calculates the prime candidate=2×the prime g×f(the combination)+1, and (iii) tests primality of the calculated prime candidate, and outputs the calculated prime candidate as the prime gp when the primality is determined.

18. The key verification server apparatus of claim 17,
wherein, when the primality of the calculated prime candidate is not determined, the key issuing server apparatus (i) adds a value of 1 to the variable c, (ii) generates a 2nd combination of the unique issue identifier and the variable c having the value of 1 added thereto, (iii) calculates a 2nd prime candidate=2×the prime g×f(the 2nd combination) +1, and (iv) tests primality of the 2nd calculated prime candidate and outputs the 2nd calculated prime candidate as the prime gp when the primality of the 2nd calculated prime candidate is determined, and
wherein, when the primality of the calculated prime candidate is not determined, the prime generation unit (i) adds the value of 1 to the variable c, (ii) generates the 2nd combination of the unique issue identifier and the variable c having the value of 1 added thereto, and (iii) tests primality of the 2nd calculated prime candidate and outputs the 2nd calculated prime candidate as the prime gp when the primality of the 2nd calculated prime candidate is determined.

19. The key verification server apparatus of claim 14,
wherein the key issuing server apparatus further comprises a key generating apparatus for generating the public key and the private key of the RSA encryption system, and
wherein the key verification server apparatus further comprises
  an obtaining unit operable to obtain the public key; and
  a verifying unit operable to verify validity of the public key obtained by the obtaining unit.

20. The key verification server apparatus of claim 19,
wherein the key issuing server apparatus (i) newly obtains a prime N', (ii) calculates a number n, according to n=the prime N×the prime N', using the prime N and the newly obtained prime N', (iii) generates a random number e, and (iv) calculates d satisfying e×d=1 mod L, where L is a least common multiple of the prime N−1 and the prime N'−1, and a combination of the calculated number n and the generated random number e is the public key while the calculated d is the private key,
wherein the obtaining unit obtains the combination of the number n and the random number e as the public key, and
wherein the verifying unit includes:
  a subtraction subunit operable to obtain a public-key subtraction value by subtracting a square value of the verification value from the calculated number n;
  a judgment subunit operable to judge whether the obtained prime subtraction value is divisible by the management information; and
  a control subunit operable to permit output of the public key when the judgment by the judgment subunit is affirmative, and prohibit the output of the public key when the judgment by the judgment subunit is negative.

21. The key verification server apparatus of claim 19, wherein the key issuing server apparatus further (i) stores a different verification value from the verification value, (ii) newly obtains a prime N' by calculating a prime candidate N' as the prime N', according to N'=2×the multiplication value R×the prime q+the different verification value, (iii) calculates a number n, according to n=the prime N ×the prime N', using the prime N and the newly obtained prime N' and generates a random number e, and (iv) calculates d satisfying e×d=1 mod L, where L is a least common multiple of the prime N −1 and the prime N'−1, and a combination of the calculated number n and the generated random number e is the public key while the calculated d is the private key, wherein the prime-verification-apparatus information storage unit stores the different verification value, wherein the obtaining unit obtains the combination of the number n and the random number e as the public key, and wherein the verifying unit includes:
a subtraction subunit operable to obtain a multiplication value by multiplying the verification value and the different verification value and to obtain a public key subtraction value by subtracting the multiplication value from the calculated number n;
a judgment subunit operable to judge whether the obtained prime subtraction value is divisible by the management information; and
a control subunit operable to permit output of the public key when the judgment by the judgment subunit is affirmative, and prohibit the output of the public key when the judgment by the judgment subunit is negative.

22. The key verification server apparatus of claim 19, wherein the management information stored in the prime-verification-apparatus information storage unit includes a terminal identifier uniquely identifying the terminal, and wherein the judgment unit judges whether the obtained prime subtraction value is divisible by the management information including the terminal identifier.

23. The key verification server apparatus of claim 22, wherein the management information stored in the prime-verification-apparatus information storage unit includes a server identifier uniquely identifying the key issuing server apparatus, and wherein the judgment unit judges whether the obtained prime subtraction value is divisible by the management information including the server identifier.

24. The key verification server apparatus of claim 19 further comprising a public-key-certificate issuing server apparatus, the public-key-certificate issuing server including:
a certificate generation unit operable to generate, when the verifying unit determines that the public key is valid, signature data by applying a digital signature to public key information including at least the public key, and to generate a public key certificate including at least the signature data and the public key; and
a certificate output unit operable to output the generated public key certificate.

25. A key issuing system comprising a terminal and a key issuing server apparatus for generating and issuing a private key and a public key of an RSA encryption system for the terminal, wherein the key issuing server apparatus includes:
an information storage unit storing a known prime q, management information corresponding to a prime to be generated, and a predetermined verification value;
a random number generation unit operable to generate a random number;
a candidate calculation unit operable to (i) read the prime q, the management information, and the verification value, (ii) calculate a multiplication value R by multiplying the management information by the random number, and (iii) calculate a prime candidate N, according to N=2×the multiplication value R×the prime q+the verification value;
a primality testing unit operable to test primality of the calculated prime candidate N;
an output unit operable to output the calculated prime candidate N as a prime N when the primality of the calculated prime candidate N is determined;
an iteration control unit operable to control the random number generation unit, the candidate calculation unit, and the primality testing unit to iterate the generation of the random number, the calculation of the prime candidate N, and the primality testing, until the primality of the calculated prime candidate N is determined by the primality testing unit;
a public key generation unit operable to generate the public key of the RSA encryption system using the prime N output by the output unit;
a private key generation unit operable to generate the private key of the RSA encryption system using the prime N output by the output unit; and
a key output unit operable to output the generated private key and the public key to the terminal, and wherein the terminal obtains and stores the private key, and uses the stored private key.

26. The key issuing system of claim 25, wherein the key issuing server apparatus (i) newly obtains a prime N', (ii) calculates a number n, according to n=the prime N×the prime N', using the prime N and the newly obtained prime N' and generates a random number e, and (iii) calculates d satisfying e×d =1 mod L, where L is a least common multiple of the prime N−1 and the prime N'−1, and a combination of the calculated number n and the generated random number e is the public key while the calculated d is the private key, wherein the key issuing system further comprises a key verification server apparatus including:
an obtaining unit operable to obtain the combination of the number n and the random number e as the public key; and
a verification unit operable to verify validity of the obtained public key, and wherein the verifying unit includes:
a subtraction subunit operable to obtain a public-key subtraction value by subtracting a square value of the verification value from the calculated number n;
a judgment subunit operable to judge whether the obtained prime subtraction value is divisible by the management information; and
a control subunit operable to permit output of the public key when the judgment by the judgment subunit is affirmative, and prohibit the output of the public key when the judgment by the judgment subunit is negative.

27. A prime calculation method used in a key issuing server apparatus that (i) includes an information storage unit storing a known prime q, management information that is an odd number and corresponds to a prime to be generated, and a predetermined verification value, and (ii) calculates a prime candidate N, as a prime N, larger than the known prime q and performs primality testing on the calculated prime candidate N, the prime calculation method comprising:

a random number generation step of generating a random number via the key issuing server apparatus;

a candidate calculation step of (i) reading the prime q, the management information, and the verification value, (ii) calculating a multiplication value R by multiplying the management information by the random number, and (iii) calculating the prime candidate N, according to according to N=2×(the multiplication value R+w)×the prime q+1, using w satisfying 2×w×the prime q+1=the verification value (mod the management information);

a primality testing step of testing primality of the calculated prime candidate N;

an output step of outputting the calculated prime candidate N as prime N when the primality of the calculated prime candidate N is determined; and a key output step of outputting the private key and the public key of an RSA encryption system to the terminal, the private key and the public key being generated using the prime N output by the output step.

28. A computer-readable recording medium having a prime-calculation computer program recorded thereon, the prime-calculation computer program being used on a key issuing server apparatus that (i) includes an information storage unit storing a known prime q, management information that is an odd number and corresponds to a prime to be generated, and a predetermined verification value, and (ii) calculates a prime candidate N, as a prime N, larger than the known prime q and performs primality testing on the calculated prime candidate N, the prime-calculation computer program causing the key issuing server apparatus to execute a method comprising:

a random number generation step of generating a random number;

a candidate calculation step of (i) reading the prime q, the management information, and the verification value, (ii) calculating a multiplication value R by multiplying the management information by the random number, and (iii) calculating the prime candidate N, according to according to N=2×(the multiplication value R+w)×the prime q+1, using w satisfying 2×w×the prime q+1=the verification value (mod the management information);

a primality testing step of testing primality of the calculated prime candidate N;

an output step of outputting the calculated prime candidate N as the prime N when the primality of the calculated prime candidate N is determined; and a key output step of outputting the private key and the public key of an RSA encryption system to the terminal, the private key and the public key being generated using the prime N output by the output step.

29. A prime verification method used in a key verification server apparatus that (i) verifies a prime N output from a key issuing server apparatus for calculating a prime candidate N larger than a known prime q, testing primality of the calculated prime candidate N, and generating and issuing a public key and a private key of an RSA encryption system for a terminal, the key issuing server apparatus including an information storage unit storing the known prime q, management information that is an odd number and corresponds to a prime to be generated, and a predetermined verification value, a random number generation unit operable to generate a random number, a candidate calculation unit operable to (a) read the prime q, the management information, and the verification value, (b) calculate a multiplication value R by multiplying the management information by the random number, and (c) calculate the prime candidate N, according to N=2×(the multiplication value R+w)×the prime q+1, using w satisfying 2×w×the prime q+1=the verification value (mod the management information), a primality testing unit operable to test primality of the calculated prime candidate N, an output unit operable to output the calculated prime candidate N as the prime N when the primality of the calculated prime candidate N is determined, and a key output unit operable to output the private key and the public key of the RSA encryption system to the terminal, the private key and the public key being generated using the prime N output by the output unit, and (ii) includes an information storage unit storing the management information and the verification value, the prime verification method comprising:

a subtraction step of obtaining a prime subtraction value by subtracting the verification from the prime N;

a judgment step of judging whether the obtained prime subtraction value is divisible by the management information; and a control step of permitting use of the prime N when the judgment by the judgment step is affirmative, and prohibiting the use of the prime N when the judgment by the judgment step is negative.

30. A computer-readable recording medium having a prime-verification computer program recorded thereon, the prime-verification computer program being used on a key verification server apparatus that (i) verifies a prime N output from a key issuing server apparatus for calculating a prime candidate N larger than a known prime q, testing primality of the calculated prime candidate N, and generating and issuing a public key and a private key of an RSA encryption system for a terminal, the key issuing server apparatus including an information storage unit storing the known prime q, management information that is an odd number and corresponds to a prime to be generated, and a predetermined verification value, a random number generation unit operable to generate a random number, a candidate calculation unit operable to (a) read the prime q, the management information, and the verification value, (b) calculate a multiplication value R by multiplying the management information by the random number, and (c) calculate the prime candidate N, according to N=2×(the multiplication value R+w)×the prime q+1, using w satisfying 2×w×the prime q+1=the verification value (mod the management information), a primality testing unit operable to test primality of the calculated prime candidate N, an output unit operable to output the calculated prime candidate N as a prime N when the primality of the calculated prime candidate N is determined, and a key output unit operable to output the private key and the public key of the RSA encryption system to the terminal, the private key and the public key being generated using the prime N output by the output unit, and (ii) includes an information storage unit storing the management information and the verification value, the prime-verification computer program causing the key verification server apparatus to execute a method comprising:

a subtraction step of obtaining a prime subtraction value by subtracting the verification from the prime N;

a judgment step of judging whether the obtained prime subtraction value is divisible by the management information; and a control step of permitting use of the prime N when the judgment by the judgment step is affirmative, and prohibiting the use of the prime N when the judgment by the judgment step is negative.

* * * * *